United States Patent
Wang et al.

(10) Patent No.: US 7,141,172 B2
(45) Date of Patent: Nov. 28, 2006

(54) VERSATILE SIMULATED MOVING BED SYSTEMS

(75) Inventors: Nien-Hwa Linda Wang, West Lafayett, IN (US); Chim Yong Chin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 181 days.

(21) Appl. No.: 10/416,826

(22) PCT Filed: Sep. 27, 2002

(86) PCT No.: PCT/US02/30786

§ 371 (c)(1),
(2), (4) Date: Mar. 1, 2004

(87) PCT Pub. No.: WO03/026772

PCT Pub. Date: Apr. 3, 2003

(65) Prior Publication Data

US 2004/0129137 A1    Jul. 8, 2004

Related U.S. Application Data

(60) Provisional application No. 60/333,725, filed on Nov. 27, 2001, provisional application No. 60/325,688, filed on Sep. 27, 2001.

(51) Int. Cl.
*B01D 15/08* (2006.01)

(52) U.S. Cl. .................................. 210/659; 210/198.2
(58) Field of Classification Search ................ 210/635, 210/656, 659, 198.2; 127/46.2
See application file for complete search history.

(56) References Cited

U.S. PATENT DOCUMENTS 2,985,589 A    5/1961    Broughton et al.

(Continued)

FOREIGN PATENT DOCUMENTS

WO    WO/99/33540    7/1999

(Continued)

OTHER PUBLICATIONS

D.J. Wu: "Design of Simulated Moving Bed Chromatograph for Amino Acid Separations"; Industrial Engineering and Chemical Research; (1998) vol. 37, pp. 4023-4035.

(Continued)

*Primary Examiner*—Ernest G. Therkorn
(74) *Attorney, Agent, or Firm*—Clark G. Sullivan; King & Spalding LLP

(57) ABSTRACT

Distributed valve simulated moving beds are described in which junctions located between successive columns interrupt the flow of process fluid between columns, and either transmit the process fluid through a zone bypass to a succeeding column within the same zone or, if the junction is located between zones, direct the process fluid to an input/output line that is dedicated to the particular zone that immediately follows the junction. At each step of the SMB's operation, the distribution of flows in each junction is modulated to accomplish movement of ports consistent with the SMB's design. Further described are simulated moving beds that contain one or more decoupled on-line regeneration zones. The regeneration zone is decoupled from the separation zones in the sense that it observes a step time (a "regeneration interval") that is different than the step time observed by the separation zones of the SMB. Because the regeneration zone is "on-line," the SMB need not be stopped to remove columns for regeneration. Because the regeneration zone is decoupled from the separation zones, the column can stay in the regeneration zone as long as needed to accomplish the regeneration, regardless of the step time observed by the SMB.

15 Claims, 65 Drawing Sheets

U.S. PATENT DOCUMENTS

| | | |
|---|---|---|
| 3,040,777 A | 6/1962 | Carson et al. |
| 3,192,954 A | 7/1965 | Gerhold et al. |
| 3,422,848 A | 1/1969 | Liebman et al. |
| 3,706,812 A | 12/1972 | de Rosset et al. |
| 4,157,267 A | 6/1979 | Odawara et al. |
| 4,379,051 A | 4/1983 | Hiesinger et al. |
| 4,412,866 A | 11/1983 | Schoenrock et al. |
| 4,434,051 A | 2/1984 | Golem |
| 4,522,726 A | 6/1985 | Berry et al. |
| 4,808,317 A | 2/1989 | Berry et al. |
| 5,069,883 A | 12/1991 | Matonte |
| 5,102,553 A | 4/1992 | Kearney et al. |
| 5,198,120 A | 3/1993 | Masuda et al. |
| 5,456,825 A | 10/1995 | Negawa et al. |
| 5,470,464 A | 11/1995 | Priegnitz |
| 5,478,475 A | 12/1995 | Morita et al. |
| 5,556,546 A | 9/1996 | Tanimura et al. |
| 5,565,104 A | 10/1996 | Priegnitz |
| 5,635,072 A | 6/1997 | Moran |
| 5,676,826 A | 10/1997 | Rossiter et al. |
| 5,705,061 A | 1/1998 | Moran |
| 5,770,088 A | 6/1998 | Ikeda et al. |
| 6,004,518 A | 12/1999 | Green |
| 6,136,198 A | 10/2000 | Adam et al. |
| 6,214,125 B1 * | 4/2001 | Hyoky et al. ............... 127/46.1 |
| 6,224,776 B1 | 5/2001 | Heikkila et al. |
| 6,325,940 B1 * | 12/2001 | Ikeda ......................... 210/659 |
| 6,328,895 B1 | 12/2001 | Masuda et al. |
| 6,409,922 B1 * | 6/2002 | Kaneko et al. ............. 210/659 |
| 6,482,268 B1 * | 11/2002 | Hyoky et al. ............... 127/46.1 |
| 6,537,451 B1 * | 3/2003 | Hotier ..................... 210/198.2 |

FOREIGN PATENT DOCUMENTS

| | | |
|---|---|---|
| WO | WO/01/33210 A1 | 5/2001 |
| WO | WO 01/87451 | 11/2001 |
| WO | WO 01/87452 | 11/2001 |

OTHER PUBLICATIONS

Valco Instruments Catalog XP002232115, Houston, TX USA URL:http://www.vici.com//catalog/122-123.

International Search Report issued by the European Patent Office as the International Search Authority for International Patent Application No. PCT/US02/30786.

* cited by examiner a)

b)

c)

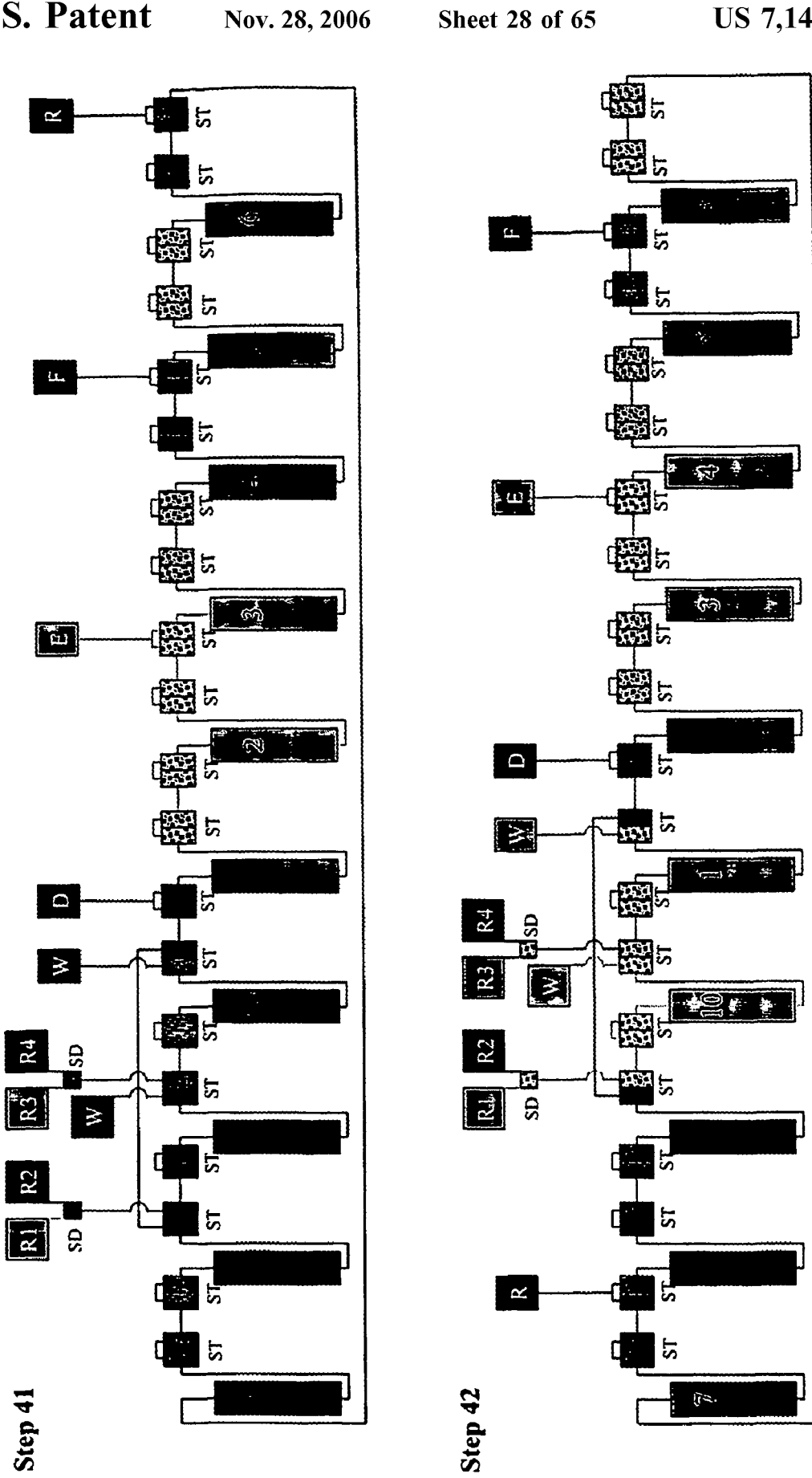
Figure 26: Continued.

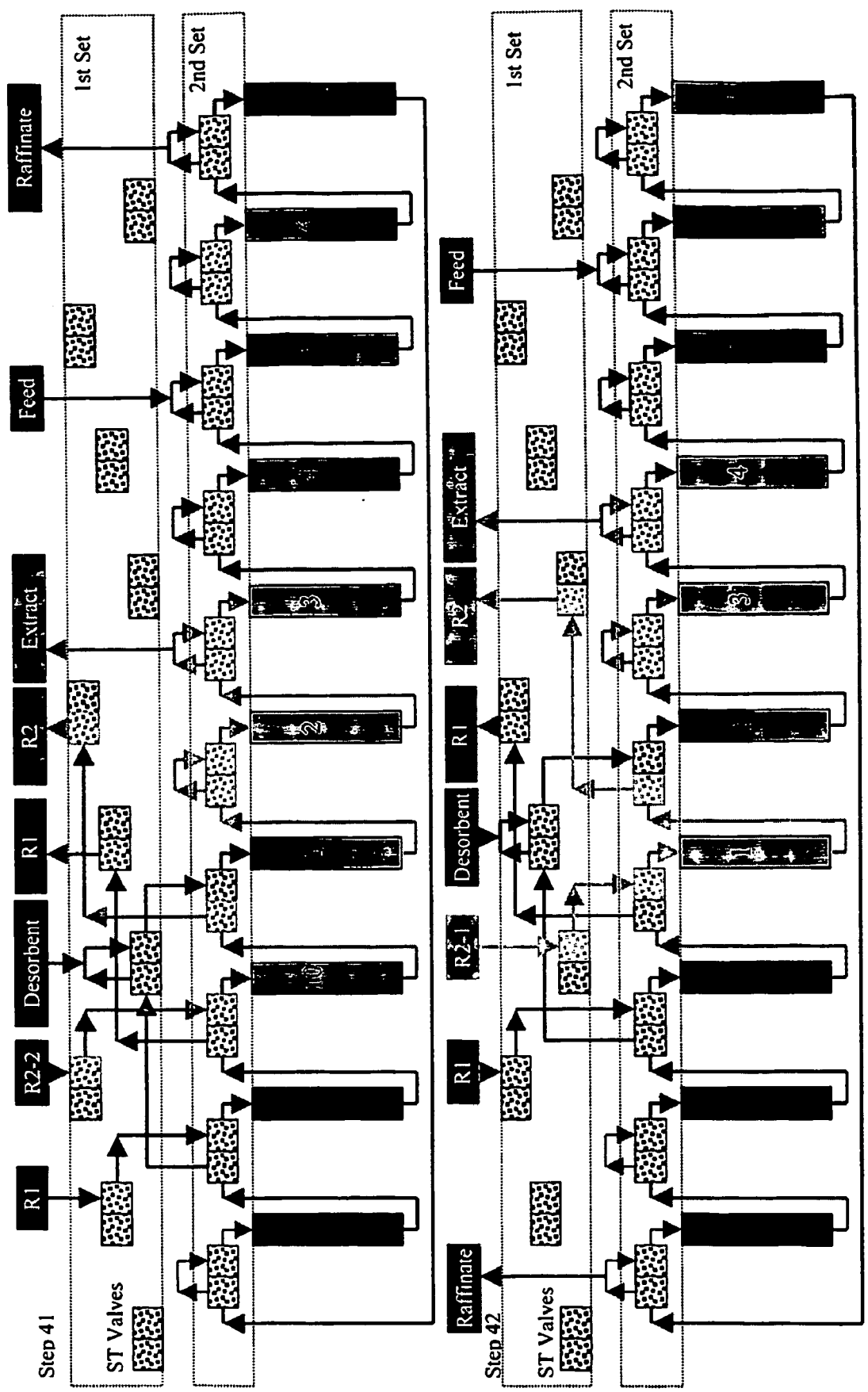
Figure 28: Continued.

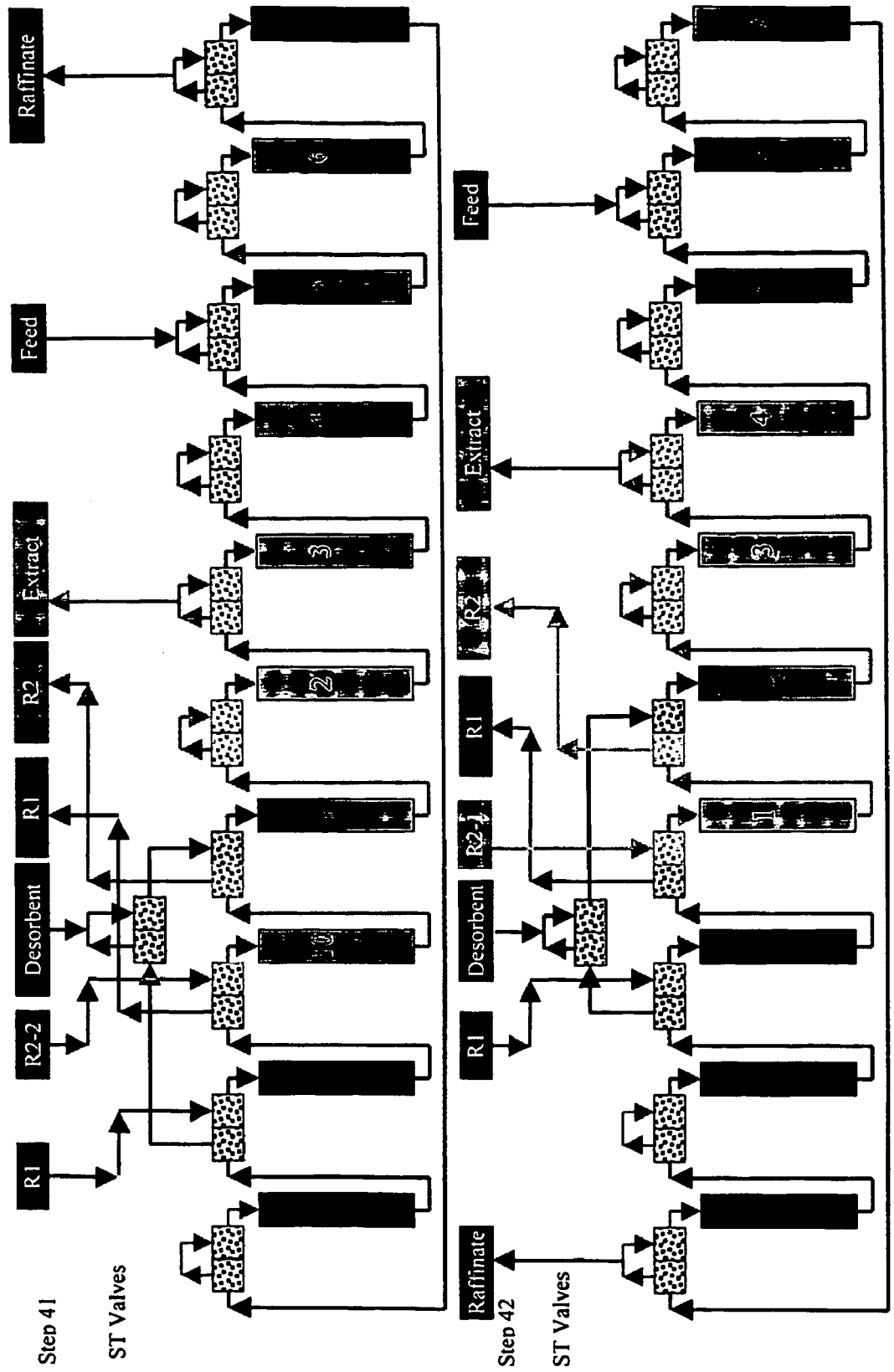
Figure 30: Continued.

a)

b)

| Valves \ Port Number | 2 | 4 | 6 | 8 | 10 | 12 | 14 | 16 |
|---|---|---|---|---|---|---|---|---|
| 1 | D | B IV | R | B III | F | B II | E | B I |
| 2 | B I | D | B IV | R | B III | F | B II | E |
| 3 | E | B I | D | B IV | R | B III | F | B II |
| 4 | B II | E | B I | D | B IV | R | B III | F |
| 5 | F | B II | E | B I | D | B IV | R | B III |
| 6 | B III | F | B II | E | B I | D | B IV | R |
| 7 | R | B III | F | B II | E | B I | D | B IV |
| 8 | B IV | R | B III | F | B II | E | B I | D |

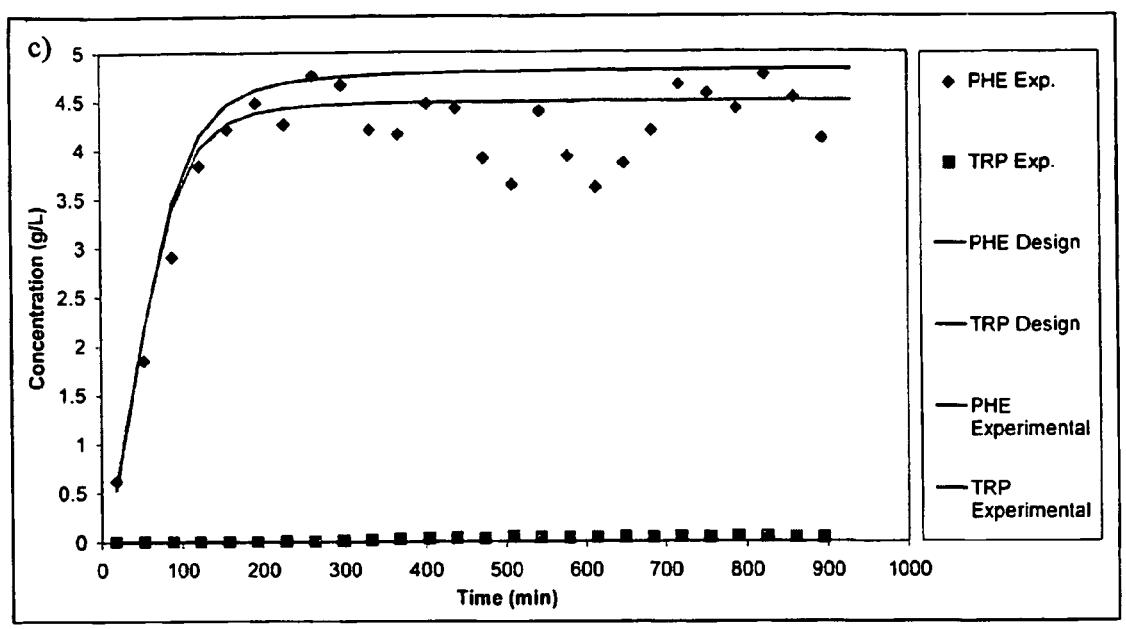
Figure 38: Continued.

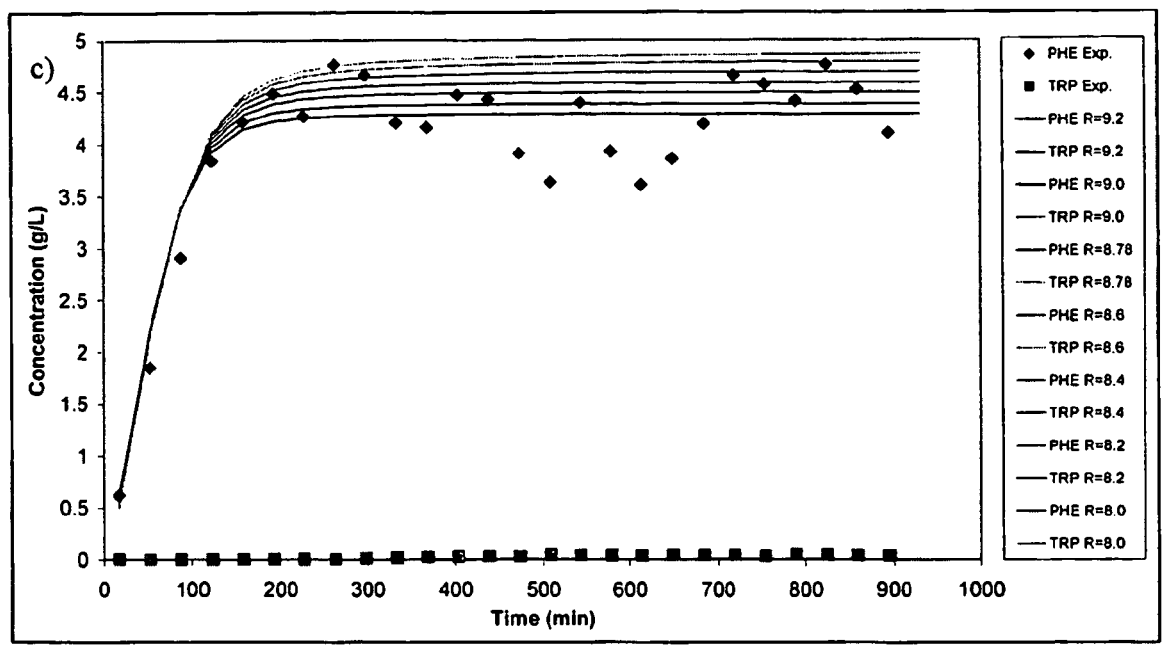
Figure 40: Continued.

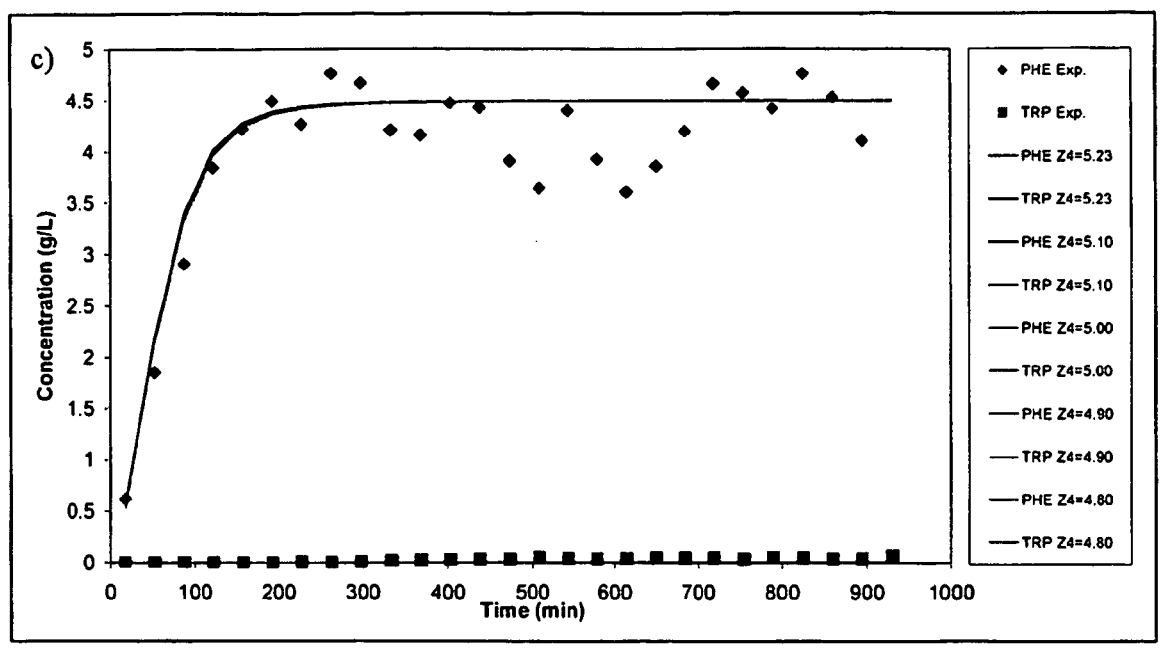
Figure 41: Continued.

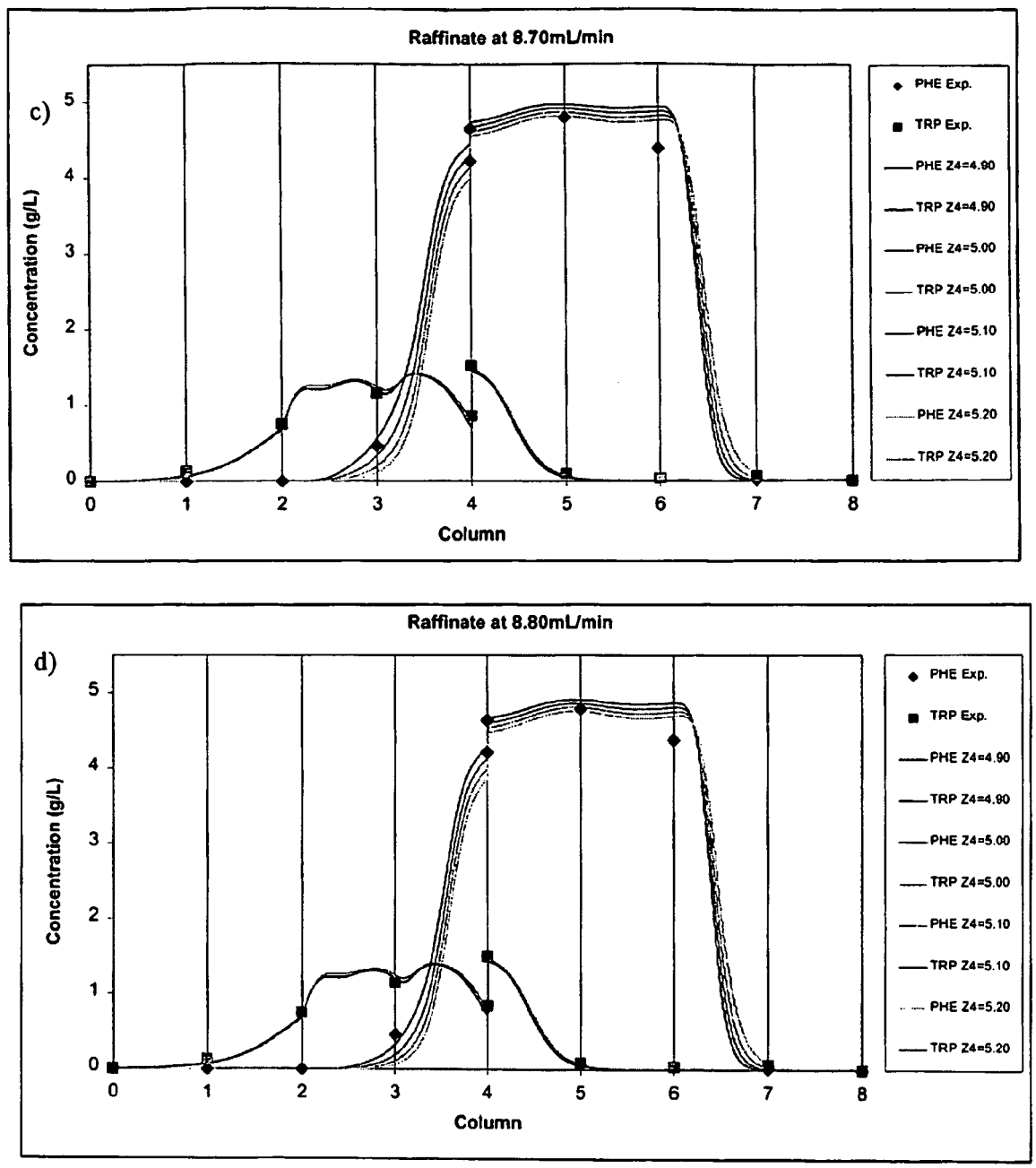
Figure 42: Continued.

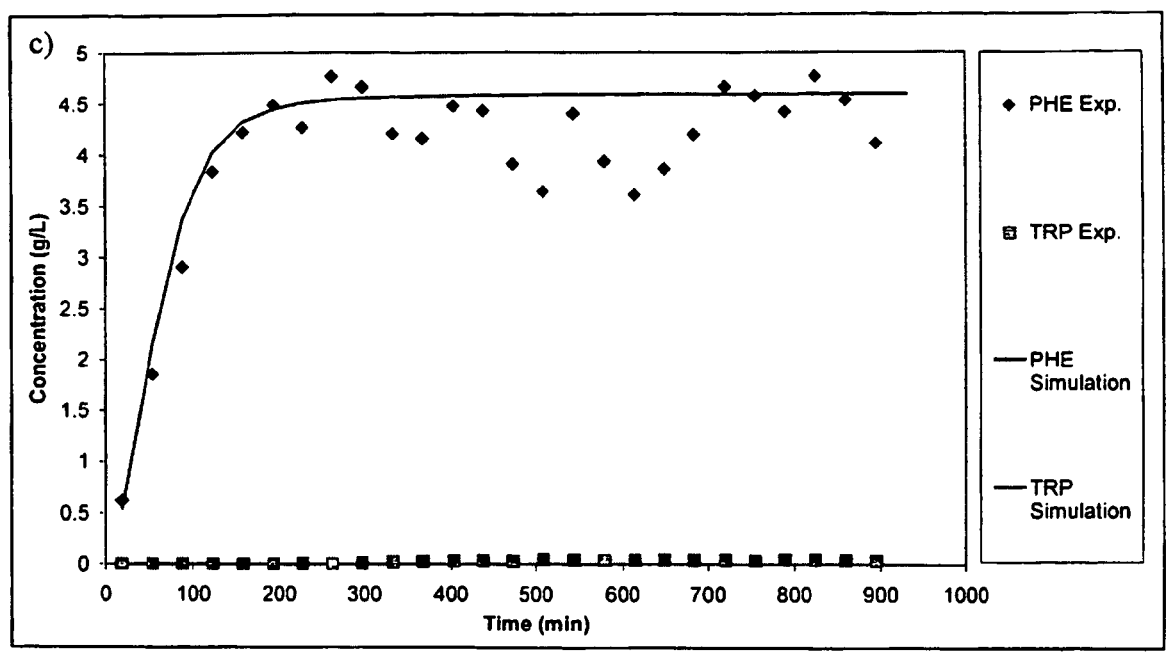
Figure 43: Continued.

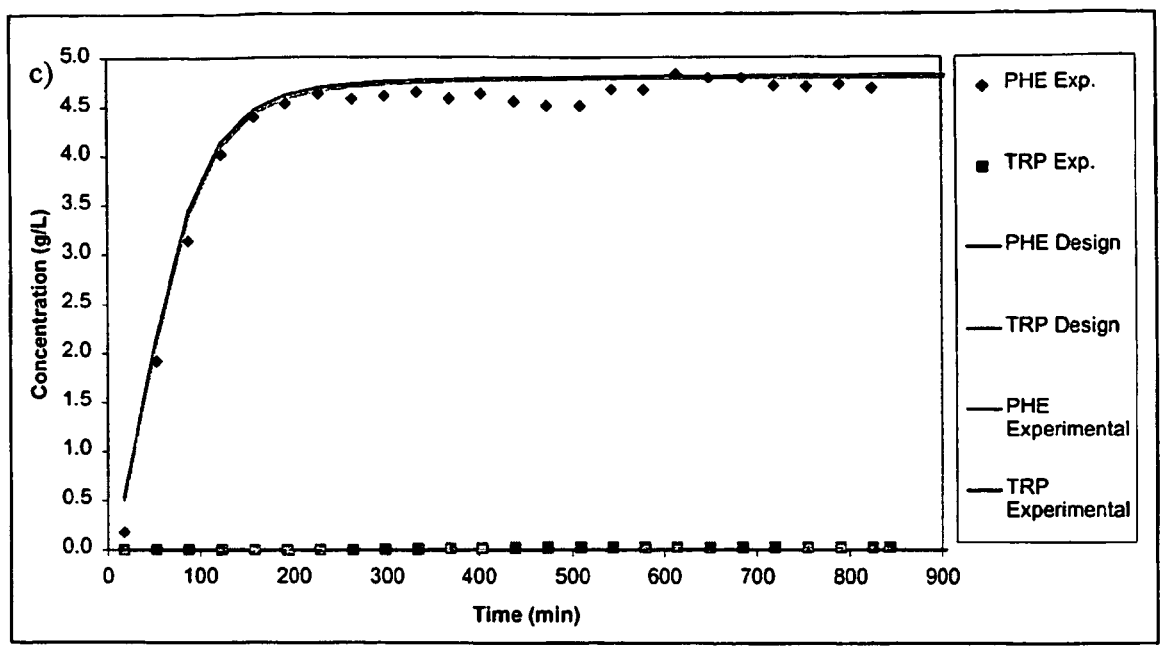
Figure 44: Continued.

Step 5
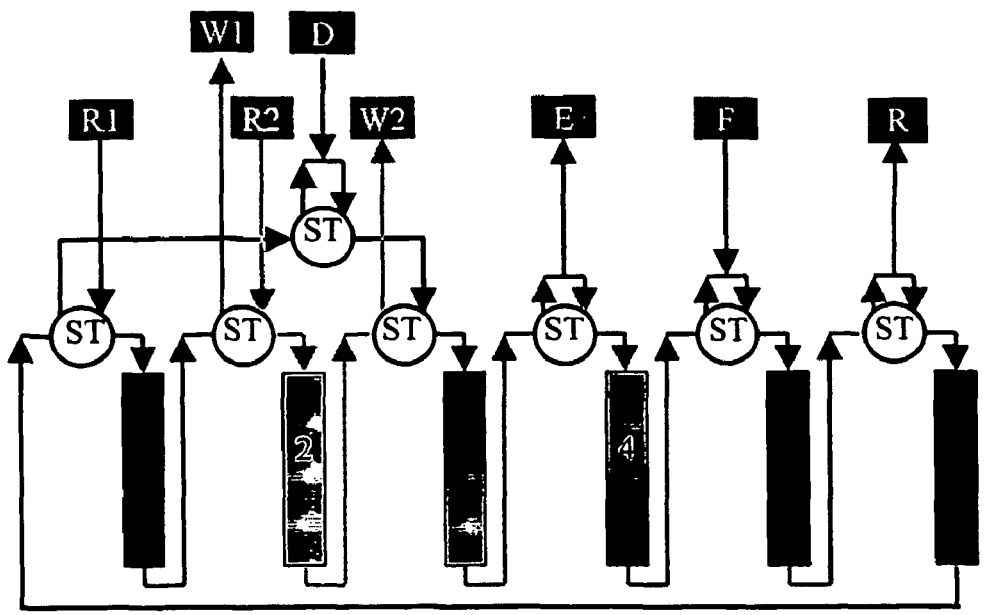
Step 6
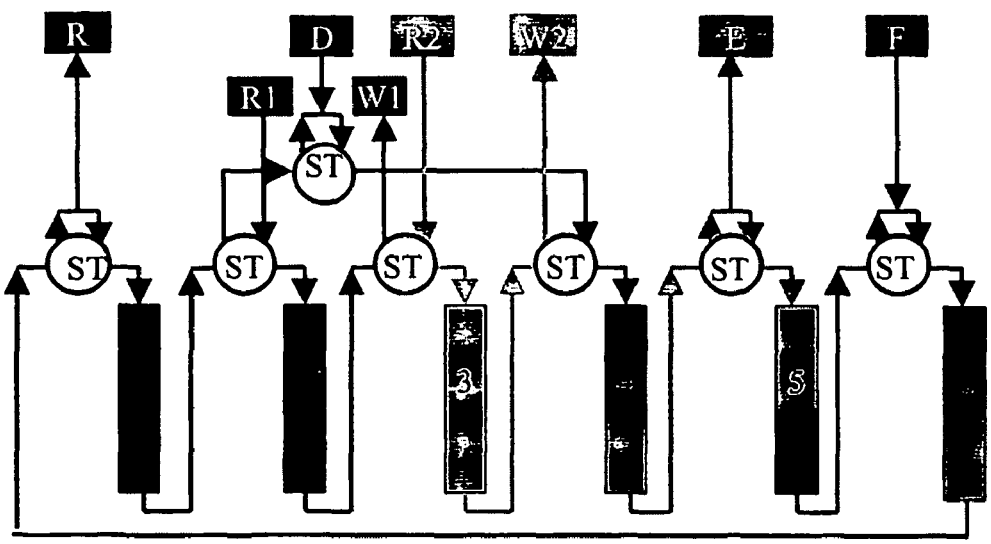
Figure 47: Continued.

a)

b)

VERSATILE SIMULATED MOVING BED SYSTEMS

REFERENCE TO PRIOR APPLICATIONS

This application claims priority to U.S. Provisional Patent Application No. 60/325,688, filed Sep. 27, 2001, and U.S. Provisional Patent Application No. 60/333,725, filed Nov. 27, 2001.

FIELD OF THE INVENTION

This invention relates to the separation of components in fluid streams using distributed valve simulated moving bed technology, and to simulated moving beds that contain on-line decoupled regeneration zones.

BACKGROUND

Simulated moving beds have lately been the method of choice for separating highly demanding and expensive products such as pharmaceuticals, biochemicals and fragrances. The technology has moved from its roots in the petrochemical industry to sugar separations, and is now making successful inroads into the drug industry. Guest (1997); Juza (1999); Juza (2000). This technology has received particular attention for separating enantiomers with minute differences in adsorbent selectivity. Miller, et al. (1999).

Chronologically, the first commercial simulated moving bed is credited to Broughton and Gerhold of Universal Oil Products (UOP) (Des Plaines, Ill.), whose 1961 U.S. Pat. No. 2,985,589 describes the idea of moving ports on fixed beds and an accompanying rotary valve to distribute stream flows among the fixed beds. The Simulated Moving Bed, referred to herein as "SMB," was presented as a distillation type column with downcomers and partitions with lines leading to the rotary valve. The simulated moving bed contained a check valve to control the direction of flow and a variable speed recycle pump to move process fluid through the system. UOP has since obtained various patents that introduce a number of slightly different rotary valve designs. See, e.g., Carson et al., U.S. Pat. No. 3,040,777, Gerhold et al., U.S. Pat. No. 3,192,954, and Liebman et al., U.S. Pat. No. 3,422,848.

In 1972, de Rosset and Neuzil, both of UOP, obtained U.S. Pat. No. 3,706,812 which became the basis of current practicing lab and pilot scale SMB systems. The downcomer sections disclosed in Broughton's earlier patent were replaced with columns linked together through tees connected to rotary valves, as shown in FIG. 1. The disclosed system incorporated a check valve between each column and its tee to maintain correct directional flow. The '812 patent also disclosed the use of solenoid valves to move the ports through the columns.

While the SMB design disclosed in the '812 patent is generally considered a much improved system over Broughton's earlier design, is suffered from a number of significant drawbacks relating to cross-contamination. In particular, because the unused transit lines between the tees and the rotary valve admix into the inline flow through the tee, at a later switching time the desorbent is flushed into and contaminates the raffinate, and feed is flushed into and contaminates the extract. Similarly, the system relies upon a variable-speed pump that often disrupts separation profiles with its non-instantaneous response time and inherent mixing nature. Moreover, this system cannot be expanded or modified to fit different configurations; it cannot perform online decoupled regeneration; it does not accommodate variable zone lengths; and it does not accommodate open loop systems.

The valves employed in an SMB are critical to the expandability and flexibility of a simulated moving bed under design. SMB systems can generally be characterized by the types of valves employed in the SMB, and how the valves are arranged. The two types of valves used to switch the ports in an SMB are multi-position rotary valves and on-off valves. On-off valves include solenoid, gate, ball, plug, diaphragm (weir), butterfly and other types.

Rotary valve SMBs can generally be characterized either as centralized or distributed rotary valve systems. Centralized rotary valve systems usually rely upon a single specially designed rotary valve to distribute streams among the various columns and to implement column switching. The two rotary valves shown in FIGS. 1 and 2 are examples of specially designed rotary valves for centralized systems. The two valves are marketed by Universal Oil Product (UOP) and Advanced Separation Technology (AST). Centralized rotary valve systems suffer from the disadvantage that they only work in systems that are designed for synchronous switching. In addition, while the designs minimize cross-contamination, valves designed for centralized rotary valve systems must be specially built to work with a particular zone/column configuration and thus lack flexibility for use in varied applications.

Distributed rotary valve systems rely upon multiple rotary valves interposed between columns. These valves, such as the SD valve discussed in greater detail below, are usually generic and adaptable to many SMB designs. Rotary valves contain a rotating piece and a static piece, respectively called the rotor and the stator. The rotor rotates on a single axis and aligns the various ports on the two pieces. The most common type of rotary-valve employs a single inlet with multiple outlets. Alternatively, the ports can be interchanged to obtain a single outlet with multiple inlets. The valve acts to select a single stream from a number of dead ended streams and directs it to the valve outlet, or vice-versa. This flowpath, shown in FIG. 3a, is called the SD for Select-Dead-end. FIG. 3 contains a series of figures obtained from the internet web-site of Valco Instruments Co. Inc. (Houston, Tex.).

A number of other flowpaths are available based on Valco rotary valves. The Select-Common-outlet (SC) flowpath shown in FIG. 3b allows the non-selected streams to share a common outlet instead of being dead ended as in an SD valve. In the Select-Flow-through (SF) flowpath, shown in FIG. 3c, the non-selected streams are allowed to flow out through individual outlets instead of a common outlet. In the Select-Trapping (ST) flowpath shown in FIG. 3d, there exists a single outlet and a single inlet. The ST flowpath acts to interrupt the flowpath of a stream. Flow from the inlet goes through one of a selected pair of ports and is returned into the valve via an external loop into the selected port's mate before finally leaving the valve through the outlet. As shown in FIG. 3d, the non-selected streams can be trapped in external loops while the selected loop allows flow from the inlet to the outlet. The flowpath in a Select-Trapping/Flow-through (STF) valve, as shown in FIG. 3e, is a combination of the ST and SF flowpaths. The STF valve is similar to the SF valve except that the non-selected streams are allowed to flow out through their own ports.

Advanced Separation Technologies (AST) (Whippany, N.J.) has a number of SMB rotary valve systems that essentially employ separate pieces of valves at each end of the columns. See, e.g., Berry et al., U.S. Pat. Nos. 4,522,726 and 4,808,317. These systems evolved into the commercial CSEP systems which use the ISEP valve. The ISEP design is described by Rossiter and Riley in U.S. Pat. No. 5,676,826 (1997). As shown in FIG. 2, the ISEP design employs four constant speed pumps with two inlet pumps (feed and desorbent), an outlet (raffinate) pump and one recycle pump (Zone II).

The lower portion of the ISEP valve rotates together with the columns to achieve port switching, as shown in FIG. 2. This design avoids admixing in the tees that occurred in UOP's design, and is flexible in terms of port and zone configurations. Moreover, the design has high purity and low dead volume and is relatively simple to control. However, the system suffers from a number of drawbacks, including its high cost and the need to rotate the columns in operation. Additionally, configurations supported by the ISEP valve are limited, and because the ISEP valve employs synchronous switching it cannot be used for variable zone length and online decoupled regeneration operation. Other rotary valve systems are described by Matonte in U.S. Pat. No. 5,069,883, and Morita and Ohno in U.S. Pat. No. 5,478,475.

Multiple rotary valve systems use generic rotary valves such as the SD type (FIG. 3a) that are widely available and generally less expensive than their proprietary counterparts, though they typically have higher dead volume and more complex controls. There are two basic systems using multiple rotary valves, the one SD rotary valve per stream system (1SD1S) and the one SD rotary valve per column system (1SD1C).

The 1SD1S system in its simplest form consists of a single SD valve dedicated to each stream, as shown in FIG. 4. Priegnitz disclosed the system in U.S. Pat. No. 5,470,464. The 1SD1S design is popular for its low cost, simplicity and wide availability of parts. The SD valve is available commercially and because Valco's SD valves have up to 26 ports, which correspond to 26 columns, provides considerable flexibility. Nevertheless, while the design is efficient, it suffers from several significant drawbacks. In particular, the admixing of the stagnant lines at every manifold causes significant contamination of the inlet and outlet streams. Moreover, the design employs a variable speed pump for recycling the process stream.

A variant of the 1SD1S interrupts the raffinate and extract streams with a second SD rotary valve and incorporates additional on-off valves between the columns to create a Two SD Rotary Valve per Stream (2SD1S) system. This modification, as shown in FIG. 5, eliminates the need for a variable speed recycle pump, and instead only relies on constant speed pumps. This system is described by Negawa and Shoji in U.S. Pat. No. 5,456,825, and by Ikeda et al. in U.S. Pat. No. 5,770,088.

Priegnitz describes in U.S. Pat. No. 5,565,104 another variant of the basic 1SD1S where an STF (FIG. 3e) valve is added, as shown in FIG. 6. The STF valve allows a constant speed recycle pump to be used as in the 2SD1S system without the additional on-off valves. Storti, et al. (1992) used a slight variant of this system to withdraw an additional stream.

In the one SD Rotary Valve per Column design (1SD1C) a single SD valve is dedicated to each column. The SD valve selects the stream for its column, as seen in FIG. 7. U.S. Filter reportedly uses this design in their ADSEP SMB system, and Wu, et al (1998) reports having successfully used an ADSEP system in an amino acid separation. This system has several advantages over the 1SD1S system including: the capacity to perform variable step time operations; the ability to employ multiple desorbents within a zone; the ability to add additional columns to the system; and higher purity products due to lower volumes of admixing. The 1SD1C design suffers, however, from the fact that it requires a variable speed recycle pump and is limited to closed-loop binary separations.

A Four Two-way Valves per Column system (4-2W1C), as shown in FIG. 8, can be thought of as a replacement of each rotary valve on the 1SD1C design with a set of four two-way on-off valves. The system was first detailed by de Rosset and Neuzil in U.S. Pat. No. 3,706,812. It is often referred to as the "Sorbex" design in the literature, even though Sorbex is the trademark used by UOP for all their SMB technologies including the single rotary valve design. Novasep reportedly uses this system in their units. United States patents that disclose schemes containing "Sorbex" diagrams include Odawara et al., (U.S. Pat. No. 4,157,267), Yoritomi et al., (U.S. Pat. No. 4,379,051) and Schoenrock et al., (U.S. Pat. No. 4,412,866). "Sorbex" based SMB systems have also been mentioned in the literature by Beste, et al. (2000); Cavoy, et al. (1997) pp. 49–57; Ching, et al., (1993) pp. 1343–1351; Juza, M., (1999); Kawase, et al. (1996); Nagamatsu, et al. (1999); Navarro, et al. (1997); Pais, et al. (1997); and Pais, et al., (1998).

A variable speed recycle pump is required in the basic 4-2W1C system. Check valves, not shown on FIG. 8, are sometimes used to maintain correct directional flow. The 4-2W1C system is inherently flexible in terms of column number and zone configuration and can easily be modified to handle multi-solvent and multicomponent systems (Tanimura and Tamura (U.S. Pat. No. 5,556,546)). On the other hand, on-off valves inherently have cross-contamination and the large number of valves employed in a on-off-based system requires complex controls. The cross-contamination is more acutely felt with smaller scale systems.

Another on-off valve system, the Six Two-Way Valves per Column (6-2W1C) system, as shown in FIG. 9, removes the need for a variable speed pump. The constant speed recycle pump is placed in zone IV to minimize contamination. In a "Two Three-way Valves per Column" design (2-3W1C), the two pairs of two-way on-off valves in a 4-2W1C design are replaced by two three-way on-off valves to create the 2-3W1C system shown in FIG. 10. The 2-3W1C system and variants thereof can be found in United States patents from Golem (U.S. Pat. No. 4,434,051), Moran (U.S. Pat. Nos. 5,635,072 and 5,705,061) and Green (U.S. Pat. No. 6,004,518), all of UOP. The inventors claim high purity in their system. However, the basic requirement of a transit line to the inline flow from the on-off valve remains, thus requiring a specialized flushing procedure which reduces yield, or a redesign of the on-off valve to merge with the tee, which defeats the purpose of using the lower cost generic valves.

Regeneration of Column Packing Material

Practical industrial considerations in the operation of simulated moving beds typically require column packing material to be regenerated periodically. In theory, regeneration can be accomplished using a stronger solvent, a temperature swing, a pH swing, or a pressure swing for supercritical and gas chromatography operations. Simple SMB gradient configurations have been published by Abel, et al., (2002); for solvent gradient SMB, Migliorini, et al., (2001), for temperature gradient SMB, and Mazzoti, et al., (1997), for a pressure gradient SMB. In addition, Antis, et al., (2001), recently reviewed gradient SMB in the literature.

Unfortunately, most SMB designs today are unable to handle periodic regeneration effectively. One way to inte grate periodic regeneration into the SMB operation is to manually remove the column to be regenerated, and to replace the column with a fresh column. The removed column is attached to a separate system (offline) to be regenerated. Because the separate system is decoupled from the simulated moving bed, the length of time required to regenerate the column is not a significant factor. However, this method requires the SMB system to pause while in operation, which results in unwanted spreading of the bands, and the labor-intensive operation is unattractive at best. See Xie et al., (2002).

Another way to accomplish column regeneration has been to use multiple columns in an additional regeneration zone to the conventional four zones, which allows sufficient time for the columns to be regenerated. The regeneration zone step time is then coupled to that of the regular SMB operation step time. Because the length of time required to regenerate a column typically greatly exceeds the step time observed by the simulated moving bed, these systems typically require a large number of online columns in the regeneration zone. The large number of columns reduces the average throughput per bed volume of the system and can rarely offset the benefit of coupling the regeneration step to the SMB separation steps.

Variable Zone Length/Step Time Operations

Recently, U.S. Pat. No. 6,136,198 reported a new system, known as the Varicol process, which is based on a non-synchronous shift of inlet and outlet ports, such that the zone length and/or step time of the SMB varies during operation. They reported a mathematical model which predicts experimental results quite well for the chiral separation of the 1,2,3,4-tetrahydro-1-napthol racemate for SMB and Varicol processes, and asserted that the performance of the Varicol process could exceed the performance of traditional SMB systems due to the flexibility offered by decoupling and varying the column switching times. The Varicol system is reported to offer a new dimension to SMB processing options. However, its potential use is severely hindered by the need for valve systems that can accommodate such a process.

It is also possible to maximize yield and purity, and to minimize solvent consumption, by varying the inputs, outputs and zone flowrates according to a prescribed method, basically by using variable speed pumps. Such a method is disclosed in U.S. Pat. No. 5,102,553.

Summary and Comparison of Existing Systems

FIG. 11 divides existing SMB systems by valve types and arrangements. Table 1 compares the existing systems.

TABLE 1

Comparison of Existing SMB Systems.

| Company | UOP/ Single Rotary Valve | AST/ Knauer | UOP | Daicel/ Purdue | US Filter | UOP Novasep |
|---|---|---|---|---|---|---|
| System | UOP | 1SEP | 1SDIS | 2SDIS | 1SDIC | 4-2WIC/2-3WIC |
| Pumps* | 4C + 1V | 3C/4C | 4C + 1V | 3C/4C | 4C + 1V | 4C + 1V/3C/5C |
| Pressure | Trade Secret | <1400 psi | <500 psi | <500 psi | <300 psi | <5000 psi |
| Columns | Stationary | Rotate | Stationary | Stationary | Stationary | Stationary |
| Column Expansion | No | No | No | No | Yes | Yes |
| Multiple Zones Flexibility | Trade Secret | Good | Limited | Limited | Limited | Excellent |
| Number of Solutes | Binary | Multiple Solutes Possible | Binary | Multiple Solutes Possible | Binary | Multiple Solutes Possible |
| Admixing | Trade Secret | None | Substantial | Substantial | Some | Substantial |
| Cross Mixing | Trade Secret | None | None | Some | Some | Substantial |
| Open Loop | Trade Secret | Yes | No | Yes | No | Yes |
| Zone Bypass | No | Yes | No | Yes | No | Potential |
| Parallel SMB | No | Yes | No | Potential | No | Potential |
| Variable Step Times | No | No | Potential | Potential | Potential | Yes |
| Multiple SMB Schemes | No | No | No | No | No | No |
| Multiple Desorbents Within 1 Zone | No | No | No | No | Potential | Potential |
| Online Decoupled Regeneration | No | No | No | No | No | No |
| Valving Cost | Very High | Very High | Low | Low | Medium | Low |
| Number of Actuators | 1 (Simple) | 1 (Simple) | Depends on # of streams- usually 4 (Simple) | 2 × # of streams + # of columns usually 14–18 (Complex) | Depends on # of columns- usually 8–12 (Complex) | (2 or 4) × # of columns- usually 16–48 (Very Complex) |
| Unsteady-State Capacity | No | No | No | No | No | 4-2WIC/ 2-3WIC potential |

*C refers to Constant Speed Pump and V to Variable Speed Pump

OBJECTS OF THE INVENTION

It is a principal object of the present invention to provide distributed valve SMBs adaptable to a wide range of SMB configurations, including moving port chromatography, and having improved configurational flexibility, operational flexibility and operating performance.

Another object is to provide simulated moving beds that employ independent column switching, and the concomitant ability to administer variable zone length separations and online decoupled regeneration.

Yet another object is to provide online decoupled regeneration schemes using various gradient techniques.

It is another object of the present invention to provide simulated moving beds in which contamination is minimized without sacrificing flexibility.

Still another object of the invention is to provide simulated moving beds that accomplish open loop and closed loop separations, and that accommodate zone bypass operations.

Still further objects of the present invention are to provide simulated moving beds capable of being digitally controlled that allow online adjustment of the system for contingencies and fluctuations.

Yet another object is to provide simulated moving beds that are capable of handling multiple solvents per zone. Such capability would be useful, for example, in a washing procedure where a buffer such as water is used between an acid wash and the desorbent.

Another object is to provide simulated moving beds in which the extra dead volume of the system, that is, the flow volume that is not within the beds, is also minimized, to minimize undesirable band broadening.

Still another objective is to provide SMB systems capable of handling a wide range of pressures and temperatures while remaining competitively priced.

Yet another object of the invention is to provide simulated moving beds with valves that are electrically actuated, digitally controlled, responsive, and contribute minimal dead volume.

SUMMARY OF THE INVENTION

Distributed valve simulated moving beds have been developed that display a remarkable level of versatility and performance when compared to SMBs of the prior art. The distributed valves form a series of junctions that separate successive columns in an SMB and control the flow of process fluid between the columns. These junctions impart tremendous versatility to the SMB design by interrupting the flow of process fluid between columns, and either transmitting the process fluid through a zone bypass to a succeeding column within the same zone or, if the junction is located between zones, directing the process fluid to an input/output line that is dedicated to the particular zone that immediately follows the junction. Thus, in a 2-2-2-2 four zone closed loop binary SMB, the junction would be dedicated to a desorbent input/output line if the junction preceded zone I; an extract input/output line if the junction preceded zone II; a feed input/output line if the junction preceded zone III; and a raffinate input/output line if the junction preceded zone IV. At each step of the SMB's operation, the distribution of flows in each junction is modulated to accomplish movement of ports consistent with the SMB's design.

In one embodiment of the SMBs of the present invention, each of the junctions comprises two opposed SD rotary valves. By interposing the two opposed SD rotary valves in each junction, plumbing the valves together using the zone bypass and input/output lines, and properly aligning the ports of the opposed valves to operate in tandem, one is able to switch the function of each junction with each step simply by rotating both valves an identical distance to a succeeding port. This design is referred to herein as a Two SD Rotary Valves per Column (2SD1C) design, and provides the unexpected advantage of integrating the column flexibility of the 1SD1C design and the zone flexibility of the 1SD1S into one system.

In another embodiment of the SMBs of the present invention, each of the junctions comprises one ST rotary valve. This design is known as the One ST Rotary Valve per Column (1ST1C) design, and can be arrived at from the 2SD1C design simply by replacing the zone bypass and input/output lines developed for the 2SD1C system with the ST rotary valve flow paths. By suitably coordinating the various process lines in the SMB and ST valve, the ST rotary valve can be substituted for the two SD rotary valves in the 2SD1C system to obtain an SMB with identical benefits seen from the 2SD1C design, but with even fewer valves and operational complexities.

In yet another embodiment the present invention provides simulated moving beds that contain one or more decoupled on-line regeneration zones. The regeneration zone is decoupled from the separation zones in the sense that it observes a step time (a "regeneration interval") that is different than the step time observed by the separation zones of the SMB. Because the regeneration zone is "on-line," the SMB need not be stopped to remove columns for regeneration. Rather, the SMB is capable of automatically moving columns back and forth between the SMB separation zones and the regeneration zone during a column switch in the SMBs' operation. Because the regeneration zone is decoupled from the separation zones, the column can stay in the regeneration zone as long as needed to accomplish the regeneration, regardless of the step time observed by the SMB. Various designs are shown that can accommodate multiple columns per regeneration zone, multiple regenerants per regeneration zone, or multiple regeneration zones per SMB.

In a preferred embodiment the present invention accomplishes the decoupling by providing two valve operations within each junction that operate at different step intervals. The first of the valve operations accomplishes the traditional progression of junction functions through the SMB, at the appropriate step time, by modulating the zone bypass and input/output lines within each junction. The second of the valve operations accomplishes the decoupled regeneration by introducing regenerant to the regeneration zone, withdrawing regenerant waste from the regeneration zone, and facilitating the bypass of process fluid from the column immediately preceding the regeneration zone to the column immediately succeeding the regeneration zone. By coordinating the first and second valve operations, one can replace columns in the regeneration zone with columns from the SMB at selected intervals that are independent of the step time observed by the SMB.

An elementary system for accomplishing the on-line decoupled regeneration schemed is referred to as the Eleven Two-way Valves per Column design discussed more fully elsewhere herein. However, it has been found particularly useful to integrate the 2SD1C and 1ST1C junctions of the present invention into the SMB design in one of the following design types.

A Four SD Rotary Valves per Column design in which 2 pairs of opposed SD rotary valves serve two mutually exclusive functions (serving either the regeneration zone exclusively or the separation zone exclusively);

A Two ST Rotary Valves in Series per Column design in which two ST rotary valves similarly serve two mutually exclusive functions;

A Two ST Rotary Valves in Parallel per Column design in which the functions of the valves are integrated at the terminal junction of the regeneration zone, but which otherwise also perform two mutually exclusive functions; and A One ST Rotary Valve per Column plus One ST Rotary Valve for Regeneration Zone design which is similar to the parallel design but which consolidates the regenerant rotary valves into one valve and a suitably plumbed distribution manifold.

BRIEF DESCRIPTION OF THE FIGURES

FIG. 34a is a picture of an ST valve with microelectric actuator. FIG. 34b is a side view of the ST valve. FIG. 34c is a schematic of the microelectric actuator.

FIG. 35 depicts port arrangements for the Versatile SMB binary experiments, in which FIG. 35a shows the port arrangement for valve 1, and FIG. 35b is a table of port arrangments for all eight valves on Versatile SMB. (D=Desorbent, E=Extract, F=Feed, R=Raffinate, B I, B II, B III, B IV=Column bypass for Zone I, II, III, IV).

DISCUSSION

Figure 1:
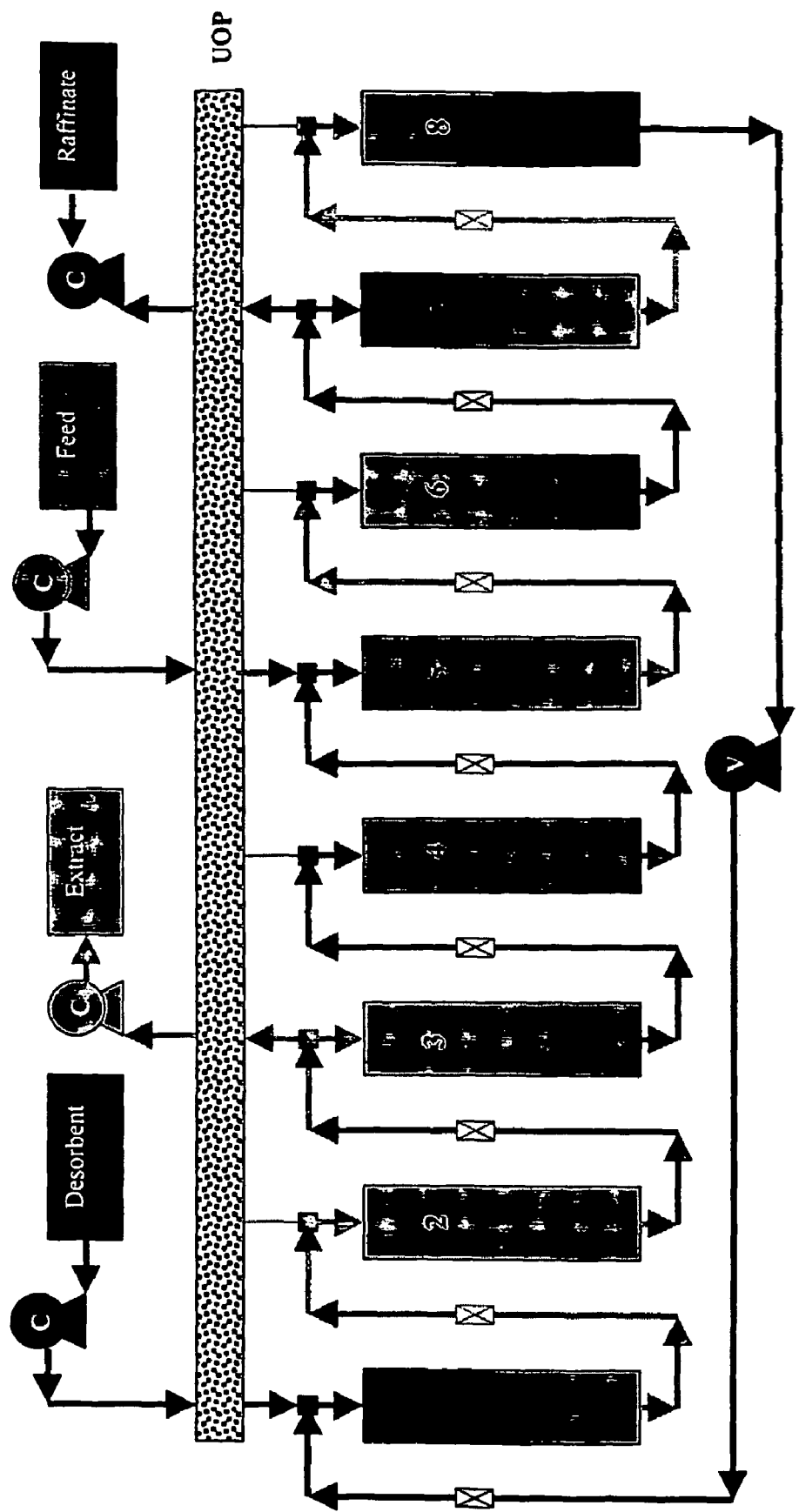
FIG. 1 represents UOP's single proprietary rotary valve system for a four zone, 2-2-2-2 column configuration binary SMB system. As shown, the system uses one variable speed recycle pump, two inlet and two outlet constant speed pumps.
Figure 2:
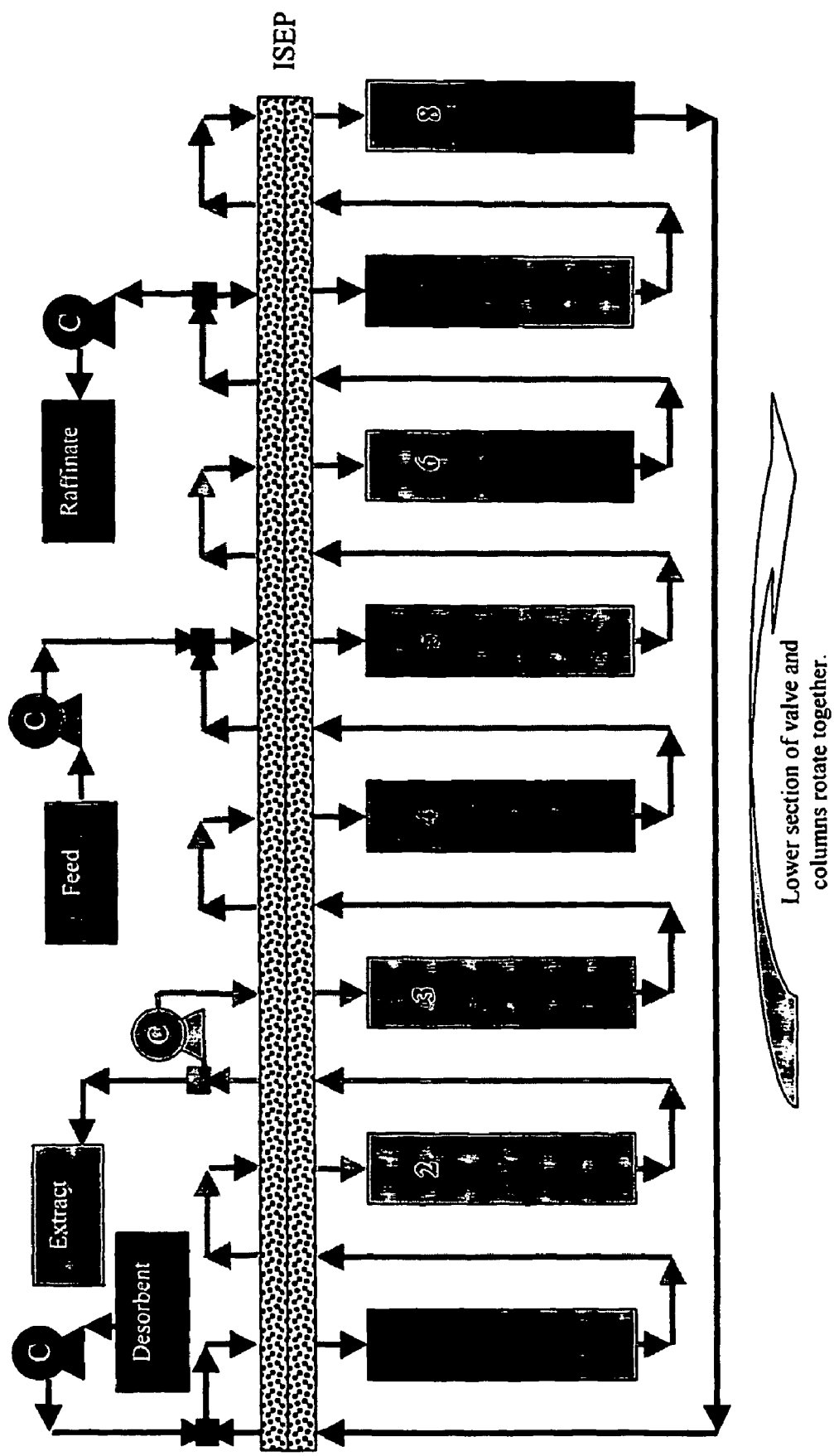
FIG. 2 depicts Advanced Separation Technologies' ISEP rotary valve SMB system for a conventional four zone, 2-2-2-2 column configuration binary SMB system. The lower section of the valve and the columns rotate together to achieve switching.

Before discussing in detail the various embodiments of the invention, it will be understood that the term "simulated moving bed" or SMB refers to any design of successive columns designed to confine a band of product moving through the columns within a particular zone by the periodic movement of columns or inputs and outputs to the system, including conventional, carousel, and stacked designs. The term thus includes open and closed loop separation systems, three zone open SMBs, four zone closed SMBs, five zone SMBs with recycle, none zone parallel SMBs, one zone moving port chromatography SMBs, etc., for the separation of two or more components in a feed stream. SMBs within the ambit of this invention further include those designs described in the background of this document, and unsteady state (transient) SMB processes disclosed, for example, in U.S. Pat. Nos. 5,198,120 and 6,328,895. It will further be understood that the term column is meant to encompass the equivalent structure in stacked SMB configurations.

Distributed Valve SMBs Having Coordinated Zone Bypass Lines and Input/Output Lines As discussed above, it has unexpectedly been discovered that the versatility and efficiency of distributed valve simulated moving beds can be improved by the use of inter-column junctions that selectively distribute the process stream from a column to a zone bypass line or an input/output line that receives and/or withdraws process fluid. In a preferred embodiment, one of such junctions is associated with each column, and the junctions are plumbed identically so that each column can assume the role of any other column throughout the step-wise operation of the SMB.

Therefore, in a principal embodiment the invention provides a distributed valve simulated moving bed comprising:
a) a series of sequential SMB columns; and
b) a series of sequential junctions interposed between said SMB columns; wherein:
a) said sequential junctions comprise one or more zone bypass lines plumbed to deliver a process stream to a succeeding column without interruption;
b) said sequential junctions further comprise one or more open or closed input/output lines plumbed to receive a process stream from a preceding column and to deliver a modified process stream to a succeeding column;
c) one but only one of said zone bypass lines and input/output lines is active during a particular step in each of the junctions;
d) the zone bypass line or input/output line that is active in a selected junction corresponds to the location of the junction in the SMB during a particular step.

Both zone bypass and "input/output" lines refer to lines that convey process fluid between successive columns. Whereas a zone bypass line simply transmits the same process fluid from one column to the next, an input/output line receives an output stream from a preceeding column and modifies that output stream before delivering it to a succeeding column. Such modifications include:

The direct addition of process fluid (such as feed, desorbent, or regenerant) to an unbroken (referred to herein as "closed") line, or the direct withdrawal of process fluid (such as in raffinate, extract, waste, or bypass) from an unbroken line, in a manner resembling a T-junction;

The indirect addition of process fluid (such as feed, desorbent, or regenerant) to a broken (referred to herein as "open") line, or the indirect withdrawal of process fluid (such as in raffinate, extract, waste, or bypass) from a broken line, through two sublines. In the first subline the complete process stream input to the junction is withdrawn; in the second subline the complete process stream output from the junction is introduced. Between the two sublines, the process stream can be modified by the addition of external inputs, modified by the withdrawal of fluid, or completely replaced by an external input. External inputs refer to input streams from completely outside the SMB (such as feed and desorbent), or to input streams from other segments of the SMB (such as recycle streams); and As discussed below in the context of moving port chromatography, the complete withdrawal of process fluid as eluent from the line, and the return of nothing to the line for delivery to a succeeding column.

The invention can be practiced with any valve arrangement that accomplishes the foregoing objectives, but preferred designs include the two SD rotary valves per column design and the one ST rotary valve per column design as discussed in greater detail below.

Two SD Rotary Valves per Column

The elegance of the present invention can perhaps best be illustrated first with reference to a system in which each of the junctions between columns comprises two opposed SD rotary valves in sequence, referred to herein as a Two SD Rotary Valves per Column (2SD1C) system. The 2SD1C system is illustrated generally in FIGS. 14 and 15, in which FIG. 12 represents a 2-2-2-2 four zone closed loop SMB with two columns per zone, and FIG. 13 illustrates the plumbing configuration of each of the inter-column junctions shown in FIG. 12.

Figure 12:
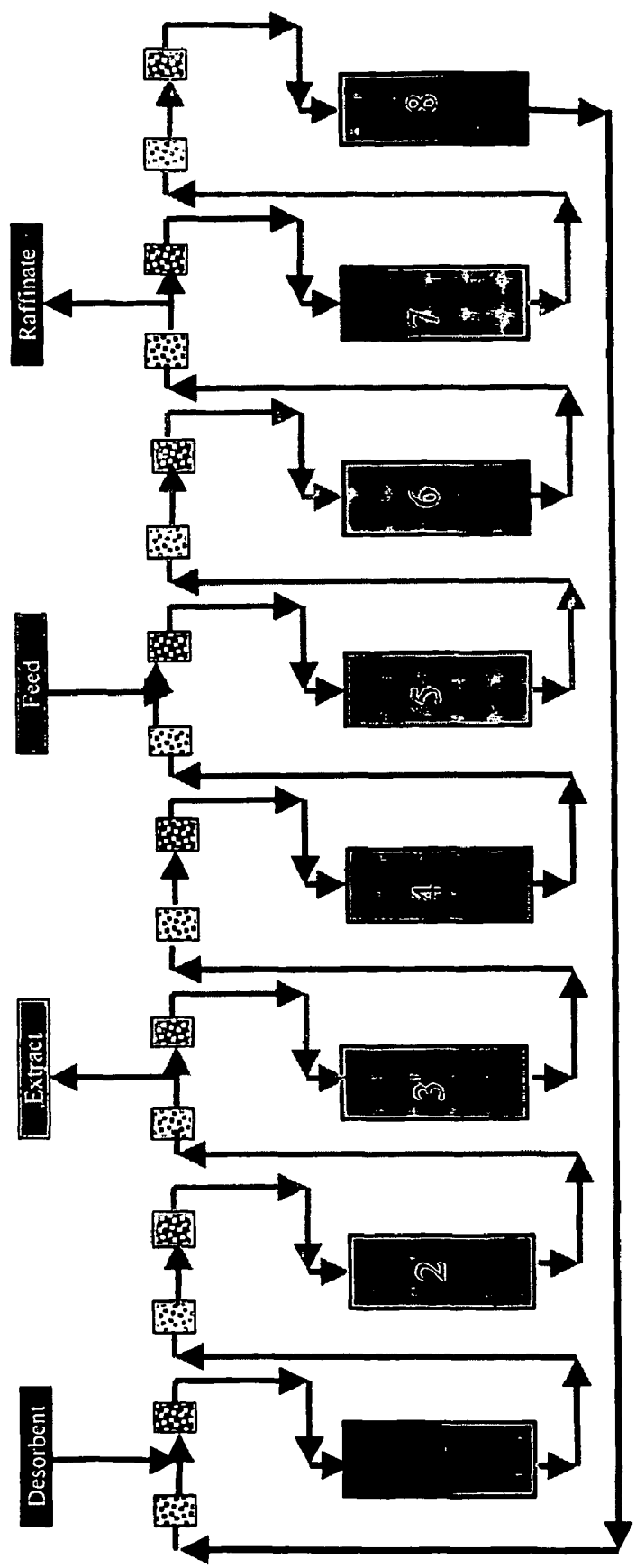
FIG. 12 is a schematic of four zone 2-2-2-2 closed loop SMB for binary separation.
Figure 13:
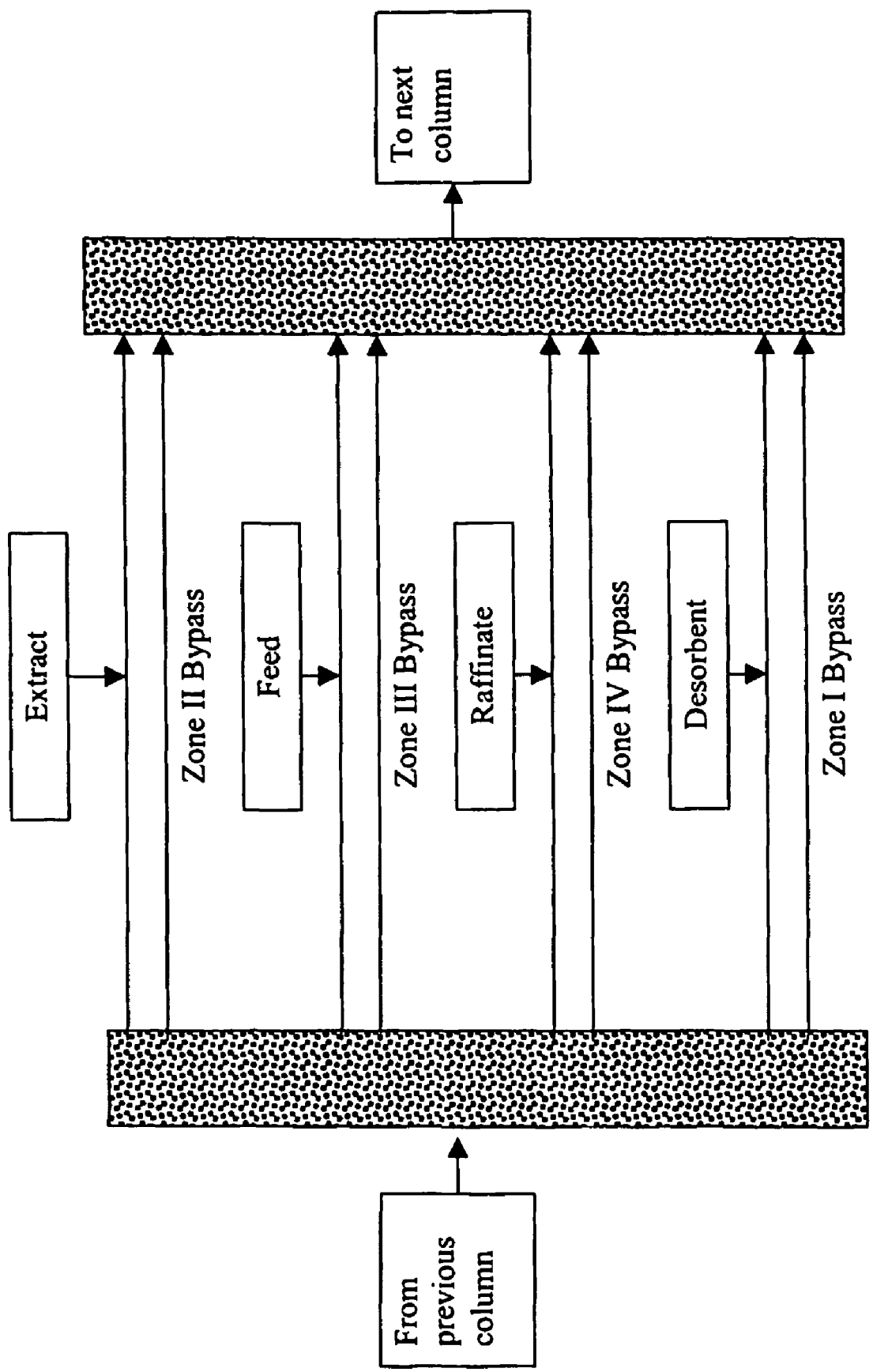
FIG. 13 depicts port arrangement on a pair of SD rotary valves for the four zone binary SMB shown in FIG. 12 using the 2SD1C system.

As shown in FIGS. 12 and 13, the 2SD1C design interposes two opposed SD rotary valves directly between each pair of successive columns that interrupt the flow of process fluid. The first valve receives process fluid from a prior column and the second valve transmits process fluid to a succeeding column. The multiple outlets of the first valve are aligned with and mated to the multiple inlets of the second valve to create a number of processing opportunities. In particular, it is these multiple lines connecting the two SD valves that deliver the versatility of this system, because it is in this area of intermediate lines between SD valves that internal bypass streams can be integrated, or that external process streams can be introduced to or withdrawn from the SMB.

As can be seen from FIG. 13, the junctions employed in the SMB of FIG. 12 comprise eight process lines, each corresponding to a connection made between the eight successive columns of FIG. 12. Thus, there are four zone bypass lines corresponding to the four inter-zone junctions in the SMB. There are four input/output lines, corresponding in turn to the inter-zone connections made by the four input/output junctions, corresponding to lines for the input of desorbent and feed and the withdrawal of extract and raffinate. In operation, a series of manifolds or t-junctions distributes the input and output streams of the SMB (i.e. extract, feed, raffinate, and desorbent in a conventional 4 zone SMB) among the various junctions and input/output lines. A suitable pumping and interconnection scheme for the input and output streams is illustrated in greater detail with reference to the one ST rotary valve per column system described later in this document.

Each of the valves comprises eight ports altogether mated by zone bypass and input/output lines, but only one pair of these ports is open for transmitting process fluid between columns at any one time during operation of the SMB. By aligning the ports to correspond to the location of the junction in the SMB, one can ensure that the extract input/output line is active at the entrance to zone I of the SMB; that the zone I bypass line is active between columns 1 and 2, and so forth. Column switching is generally accomplished simply by rotating both valves one step in the same direction to the following line at the appropriate step time. In the junction shown in FIG. 13, column switching is accomplished by rotating the valve ports downward with each step. Of course it will be recognized that in certain applications it may be desirable to rotate just one of the SD valve in an asynchronous switching mode.

Of course, the foregoing valve design can be modified to accommodate nearly any SMB configuration. For example, extra columns could be accommodated in one or more zones simply by increasing the number of bypass lines associated with such zone in each junction. Similarly, additional separation zones could be accommodated by adding an input/output line to each junction that corresponds to the function of the particular zone. Similarly, the valve plumbing could be modified to accommodate a zone bypass feature employed in various SMB designs. In addition, the valve plumbing could be modified to accommodate an open loop system in which the entire output of a column is removed from the SMB during operation, or the entire input to a column is derived from an external source. In this case a process line would not physically connect the two valves. Rather, the input/output line would comprise two distinct lines corresponding to ports aligned between the valves.

Figure 14:
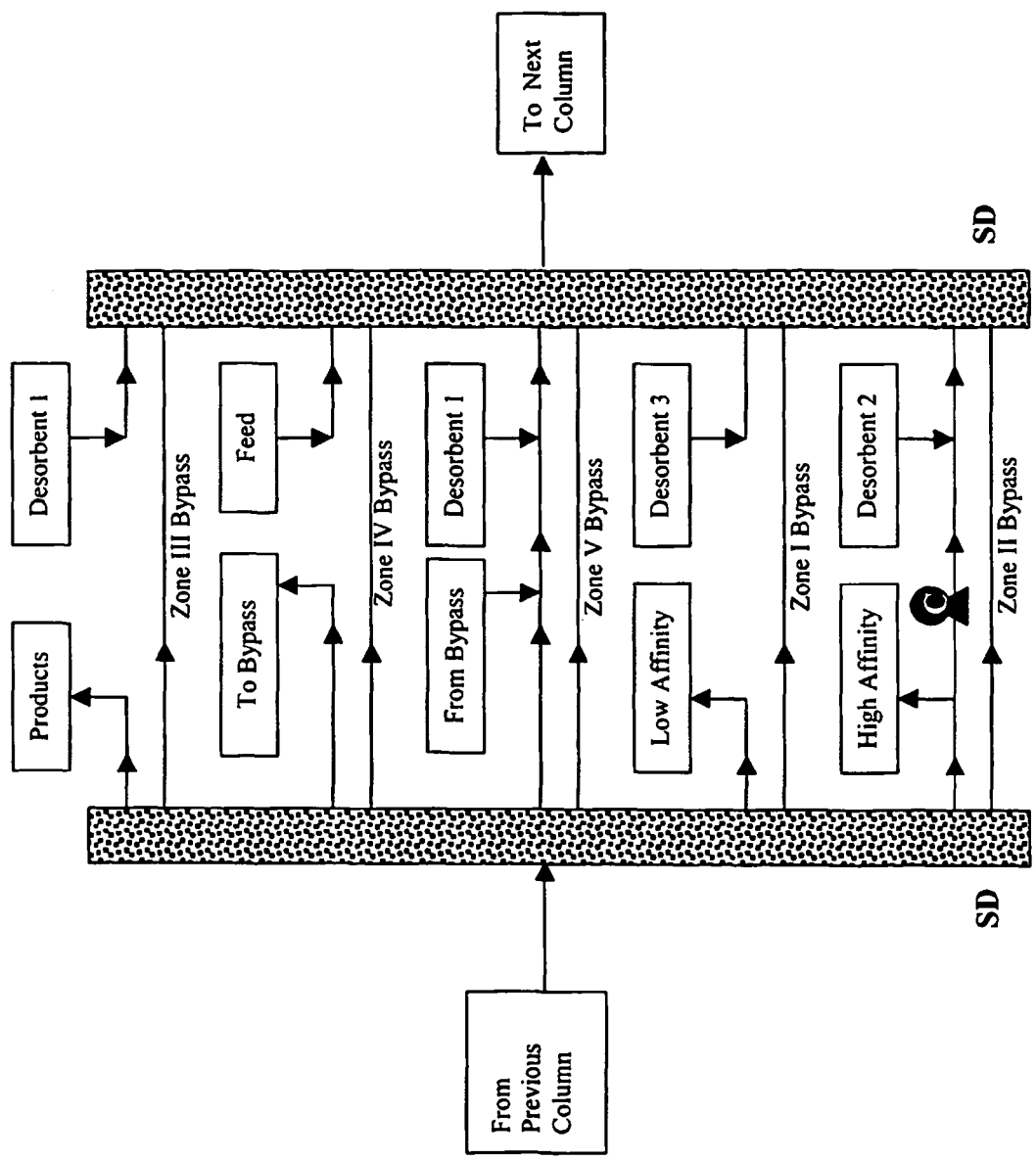
FIG. 14 depicts port arrangement on a pair of SD rotary valves for the five-zone ternary SMB shown in FIG. 16 using the 2SD1C system. Bypass refers to the flow that is conducted from the end of column 6 into column 9 of FIG. 16, and that joins with the output from column 8 and the Desorbent 1 input.
Figure 16:
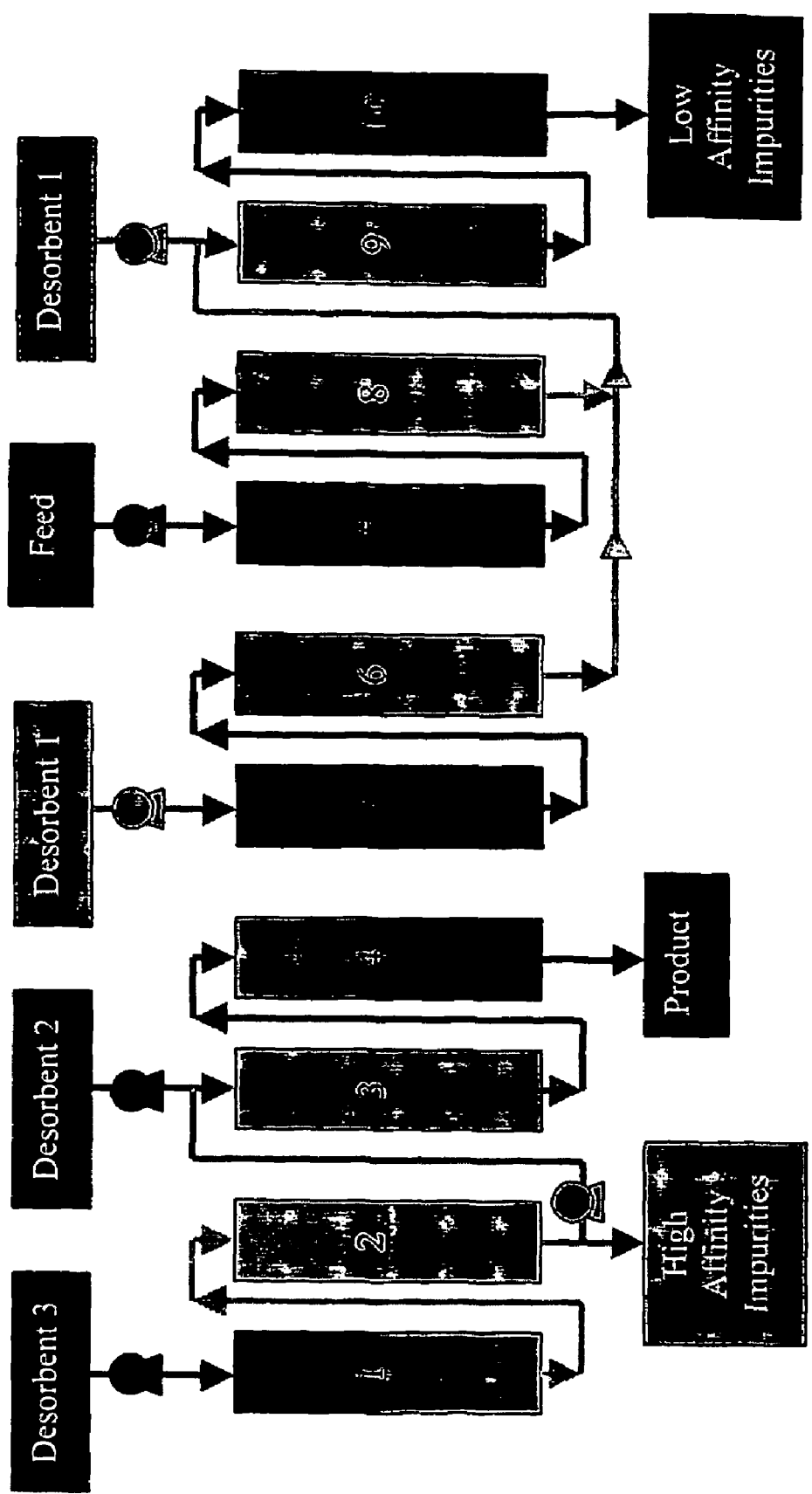
FIG. 16 is a schematic of a five zone SMB for ternary separation. Column configuration is 2-2-2-2-2. Six pumps are needed to control this open-loop system. (Desorbent strength: Desorbent 3>Desorbent 2>Desorbent 1).
Figure 18:
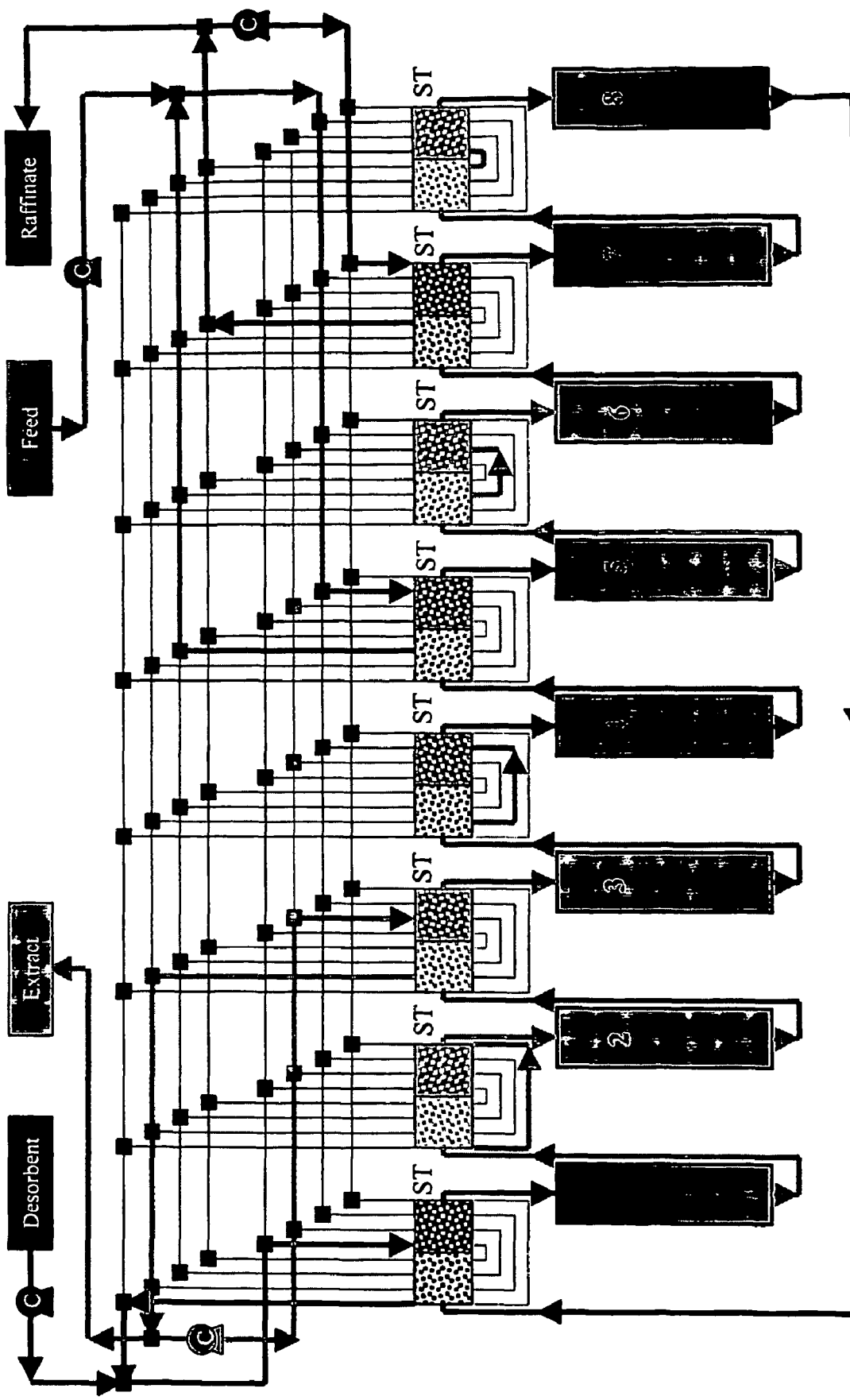
FIG. 18 depicts a One ST Rotary Valve per Column design for a conventional four zone, 2-2-2-2 column configuration binary SMB system. Four constant speed pumps are used with two pumps acting as recycle pumps in zone II and IV. Each ST valve selects the right manifold for its column.

The implementation of several of these options is described in greater detail in FIGS. 16 and 14, wherein FIG. 18 portrays a five zone SMB used in a ternary separation with three different solvents, and FIG. 14 portrays the ten process line arrangements of the opposed SD rotary valves used in the junctions. Because the SMB contains five zones and two columns per zone, the junction comprises a total of five bypass lines (one bypass line per intra-zone junction). Similarly, the junction contains five input/output lines corresponding to each of the five inter-zone junctions.

The function and plumbing of the input/output lines varies from zone to zone. For example:

The Products/Desorbent 1 input/output line withdraws the entire product from column 4 from the system, and delivers desorbent 1 exclusively to column 5. This input/output line is termed an "open line" herein because there is a break in the physical connection between the aligned ports.

The Bypass Outlet/Feed input/output line removes the entire output of column six for delivery as bypass fluid to column 9, and delivers feed exclusively to column 7. This input/output line is also of the "open" type.

The Bypass Inlet/Desorbent 1 input/output line receives desorbent 1 input and bypass fluid and transmits process fluid from column 8 to column 9 mixed with the desorbent 1 input and bypass fluid. This input/output line is "closed" because there is a physical connection between the opposing ports of the two SD rotary valves.

The Raffinate/Desorbent 1 input/output line is of the open loop configuration. The entire output from column 10 is withdrawn from the system as low affinity impurities in this line, and the entire input to column 1 provided by this line is derived from desorbent 3 input.

The Extract/Desorbent 2 input/output line is of the closed loop configuration. The line is plumbed to allow high affinity impurities to be withdrawn from the system, for desorbent 2 to be input, and for process fluid to be transmitted between columns 2 and 3.

It is of course understood that the example in FIG. 16 can be further extended to improve the system's efficiency and throughput; by replacing the desorbent 1 inlet before column 9 with a zone bypass; by adding a buffer zone after the low impurities outlet port at the end of column 10; and, by recycling the outlet of the buffer zone to add to desorbent 1 at the start of column 5.

The 2SD1C system offers a number of advantages. For example, the 2SD1C system's mutually exclusive manifolds preclude contamination from admixing or the sharing of lines. In addition, the 2SD1C design does not require flushing and, as seen in FIG. 14, it is fully capable of administering the various requirements of a multi-solvent and multi-component system. Moreover, 2SD1C has innate column expandability, can be used with various constant speed pump configurations, and has variable step time capability.

A particularly attractive design is known as the open loop "moving port" design, which effectively operates as a batch SMB separation similar to column chromatography. In its simplest form, at the initiation of a batch separation, a slug of product to be resolved is introduced to the first column of an SMB charged with eluent, followed by eluent introduction to the first column. An eluent withdrawal port is active at a junction between succeeding columns. By periodically moving the eluent inlet and outlet one column forward, at an appropriate step time, one is able to confine the band of desired-product within a single zone. When the band of desired product reaches the last column in the SMB, it is collected as resolved product. Because the eluent is withdrawn much closer to the eluent introduction port than in conventional chromatography, the open loop moving port design is capable of operating at a much lower pressure drop between the first column and the last column, as well as preventing bandwidth separation and product loss or purity reduction. Moreover, throughput per bed volume is increased compared to conventional batch chromatography.

Thus, in the 2SD1C design, each of the opposed valves would accommodate at least the following lines: (1) an open eluent inlet input/output line in which the process stream from the preceding column consists of nothing and the modified process stream delivered to the succeeding column consists entirely of eluent, (2) an open eluent outlet input/output line in which the process stream from the preceding column consists entirely of eluent and the modified process stream delivered to the succeeding column consists of nothing, and (3) a number of bypass lines equal to the number of columns minus 1 (assuming no line sharing). The opposed valves located immediately before the first column could further be plumbed to accommodate an open feed input/outlet line, or the feed and eluent input could be metered separately to the opposed valves though a manifold that allows feed to be introduced through the eluent inlet input/output line. Similarly, the opposed valves located after the last column could further be plumbed to accommodate an open product input/output line, or the product and eluent output could be metered separately from the opposed valves through a manifold that allows product and eluent to be withdrawn through the same eluent outlet input/output line.

In a preferred embodiment the two opposed valves accommodate one or more dead end lines that, when engaged between two successive columns, prevent the flow of process fluid between the columns. These dead end lines would be engaged when the junction is present either after the active eluent withdrawal junction, or before the active eluent inlet junction. Similarly, the junction preceding the first column could be plumbed to restrict back-flow of process fluid, and the junction following the last column could be plumbed to prevent premature eluent withdrawal. Typically, the introduction junction immediately preceding the first column is not plumbed to receive process stream from a preceding column, and the withdrawal junction immediately following the last column, is not plumbed to deliver process stream to a succeeding column.

One ST Rotary Valve per Column

Figure 17:
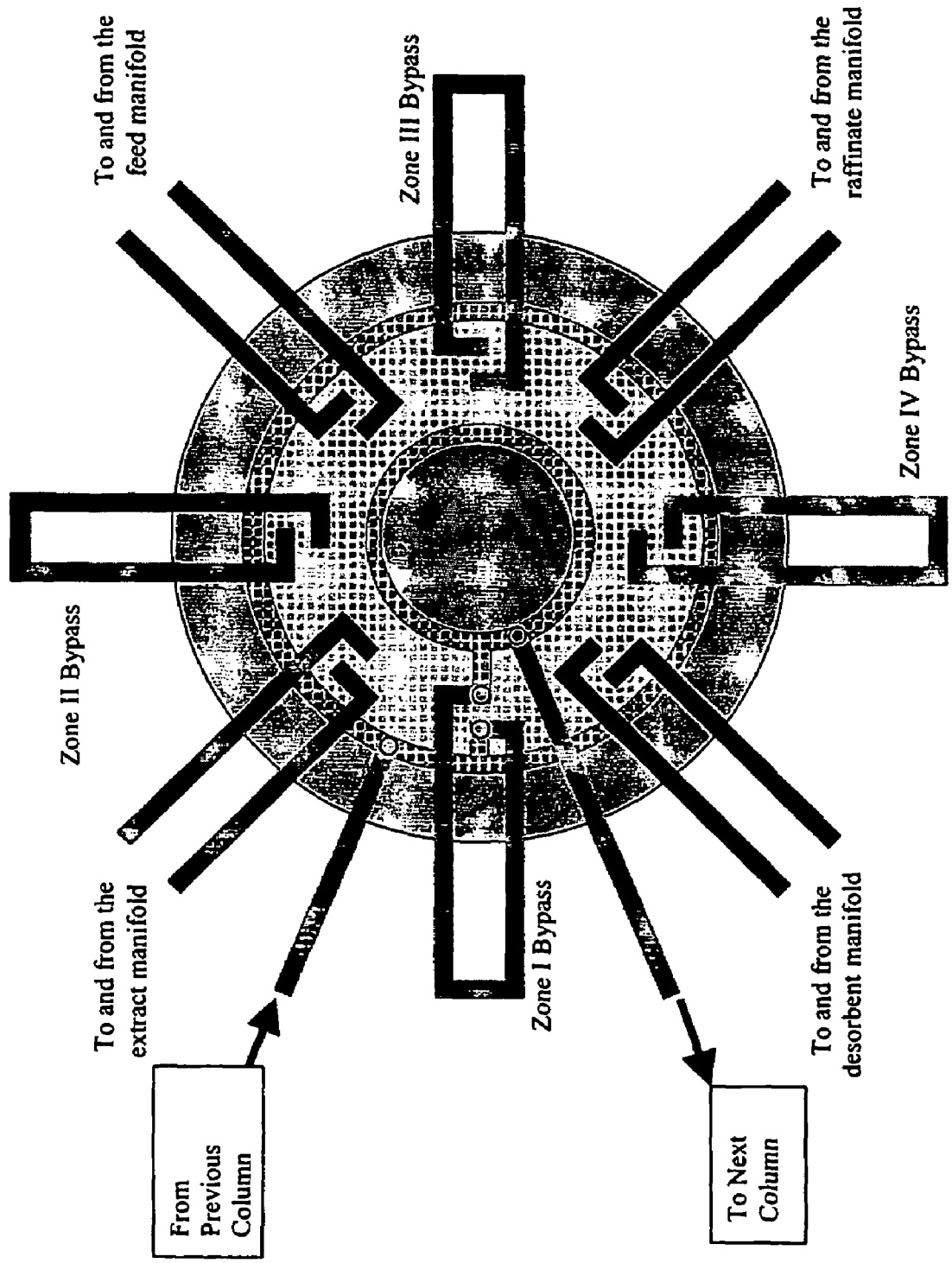
FIG. 17 represents a flowpath in an ST valve for a four zone, binary SMB with at least two columns in each zone. Flow from the previous column enters into the outer ring and travels to the selected pair of ports, in this case, the zone I bypass. The flow is returned by the bypass into the inner ring which directs the flow out into the next column. The grid shaded part is the rotating piece (Rotor) and the solid colored part is the static piece (Stator). The black circles represents the contact points between the rotor and stator.

The one ST rotary valve per column design (1ST1C) is another distributed rotary valve configuration with which the present invention can be practiced. The 1ST1C system can be conceptualized simply by replacing the two SD valves in each junction of the 2SD1C system with one ST rotary valve. FIG. 17 shows an ST rotary valve that could be used in each of the intercolumn junctions shown in FIG. 18 to practice the processes of the present invention.

Thus, each of the zone bypass and input/output lines of the corresponding 2SD1C system would be replaced by the corresponding ST rotary valve flow paths shown in FIG. 17. As can be seen, the valve comprises 4 zone bypass lines corresponding to the four inter-zone bypass junctions in the SMB of FIG. 18. In addition, the valve comprises 4 input/output lines corresponding to junctions at the entrance to each of the four zones shown in FIG. 18. As shown, the valve is actuated to transmit process fluid from column 1 to column 2 through the zone I bypass line. Thus, the valve shown in FIG. 17 would be located between columns 1 and 2 in FIG. 18.

Figure 19:
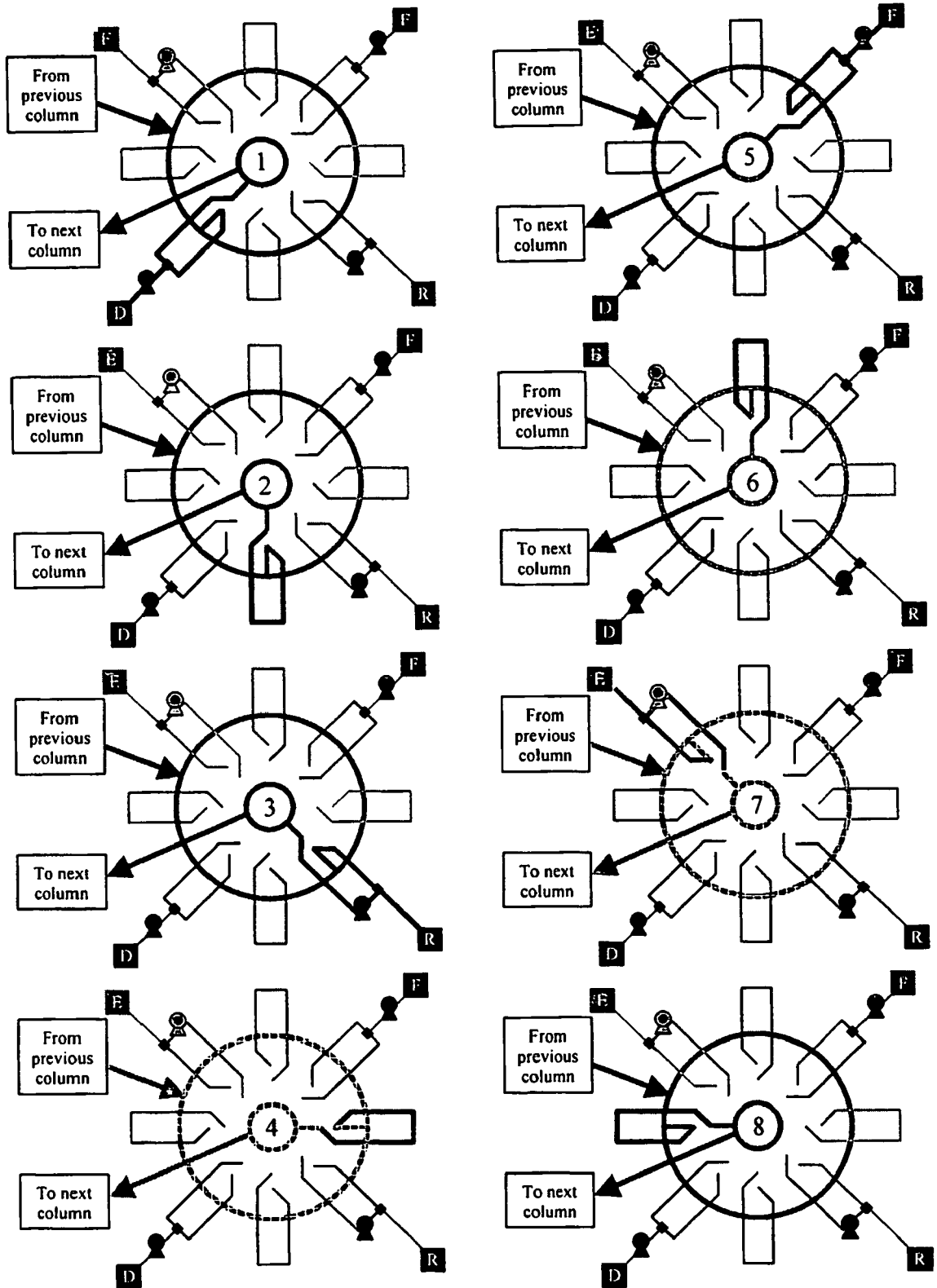
FIG. 19 portrays a switching sequence for column 1 in the SMB depicted in FIG. 17. The outer and inner rings rotate while the ports remain still (Solid colored).

FIG. 19 illustrates the switching sequence that occurs in the ST rotary valve of FIG. 17 as the valve is modulated to accommodate the eight different functions that it plays during an entire switching sequence. The rotor is shaded with grids while the stator is in solid colors. As shown, the valve accepts a stream from the previous column at its inlet port, which then travels within the outer grid shaded ring to the zone I bypass and towards the inner grid shaded ring. The stream finally travels to the next column via the exit port of the ST valve. Thus, in position 1, the valve acts to receive desorbent at the entrance to zone I. At the next switch, the grid shaded rotor parts would move 45 degrees anti-clockwise. This would place the protruding parts of the inner and outer rings at the desorbent manifold. The stream will travel in from the inlet port, through the outer ring and to the external desorbent manifold where the desorbent stream is added. The stream enters the inner ring and finally leaves from the exit port of the valve. This progression occurs through an entire 8 switch switching sequence for the SMB until the valve returns to position 1, and again acts to receive desorbent at the entrance to zone I.

Of course, if one wishes to decrease the number of bypass lines in the junction, or to rearrange the lines so that they do not correspond to the sequential order of the SMB, it is possible to place these valves under a control that rotates the grid shaded rotor parts of the valves by a varying degree with each switch. In addition, a method of sudden switching can be built into the system to respond to contingencies and to minimize the effect of fluctuations in the system or from equipment failure.

FIG. 19 also illustrates an acceptable pump configuration for the SMB. As can be seen, the valves employ one pump per input/output line. These pumps are either external or internal to the input/output line. For example, the extract and raffinate pumps are internal recycle pumps, whereas the desorbent and feed pumps are external pumps. The internal recycle pumps circulate process fluid after extract or raffinate has been withdrawn from the input/output line, and thus help to assure correct directional flow. The desorbent and feed pumps are external to their respective input/output lines to assure sufficient injection pressure to accomplish the injection of these input lines. While this is the preferred pumping configuration, one skilled in the art will appreciate that the configuration can be varied by internalizing one or both of the extract and/or raffinate pumps, or by omitting one or both of the raffinate and/or extract pumps altogether and relying exclusively on a splitting valve at the raffinate and/or extract withdrawal point to control the withdrawal rate. Alternatively, a skilled worker could allocate internal variable speed pumps to the individual columns instead of allocating the internal constant speed pumps to the individual zones.

FIG. 18 presents a schematic of the 1ST1C system for a conventional 8 column, 4 zone SMB, showing the interconnectivity of the various lines, and the external plumbing of each junction to fulfill all of the roles played by each junction during an entire switching sequence. In practice, multi-port manifolds are preferably employed to replace the multitude of tees for each stream to reduce the dead volume. The junctions in the system as shown employ two constant speed internal recycle pumps and two external inlet pumps, but they can easily be refitted for other pump and valve configurations.

Figure 15:
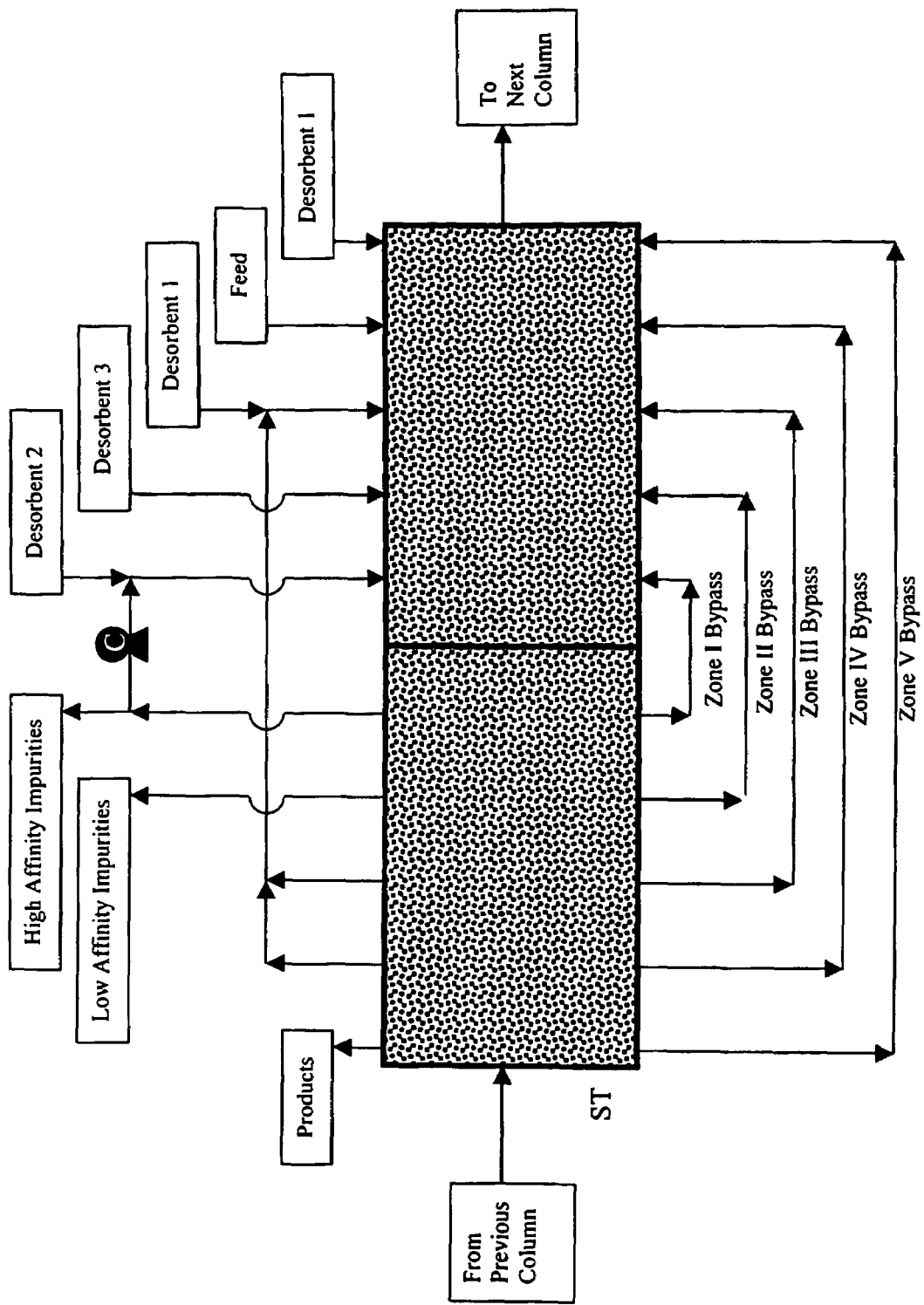
FIG. 15 portrays the port arrangement on an ST valve for the five zone ternary SMB shown in FIG. 16 using the 1ST1C system.

The 1ST1C system has similar flexibility as the 2SD1C system, as shown in FIG. 15 which presents the port arrangement of an ST rotary valve for the five zone, tri-solvent, three component SMB presented in FIG. 16. The 1ST1C system also exhibits identical advantages to the 2SD1C system, including high purity with high yield, column expandability, and multicomponent and multisolvent capability. In addition, the 1ST1C allows for wide zone flexibility if additional ports are built into the junctions early. Moreover, the 1ST1C system is capable of performing open-loop separations, zone bypasses and variable step time operations. It is also capable of using any pump configurations and its cost is moderate.

On-Line Decoupled Regeneration Systems

The inventors have further discovered a new simulated moving bed design that builds upon the foregoing concepts to allow one or more columns to be regenerated in a distinct on-line regeneration zone that is decoupled from the step time of the SMB. In essence the new scheme is able to selectively insert one or more regenerated columns into the SMB loop while removing a corresponding number of columns for regeneration at selected switches. The regeneration cycle is decoupled from the step time of the SMB in the sense that the regeneration zone can regenerate one column or set of columns without reinserting them into the separation zones for as many steps of the SMB operation as are needed to regenerate the column(s) withdrawn from the SMB separation zones. Of course, it will be understood that the insertion and removal of columns from the SMB loop need not correspond precisely in time. For example, if the regeneration requirements of a system are not especially high, it is possible to return columns to the SMB separation zone after they are regenerated without simultaneously moving a corresponding number of columns from the SMB separation loop for regeneration, and waiting a series of additional steps before pulling the columns from the SMB separation loop for regeneration.

Figure 20:
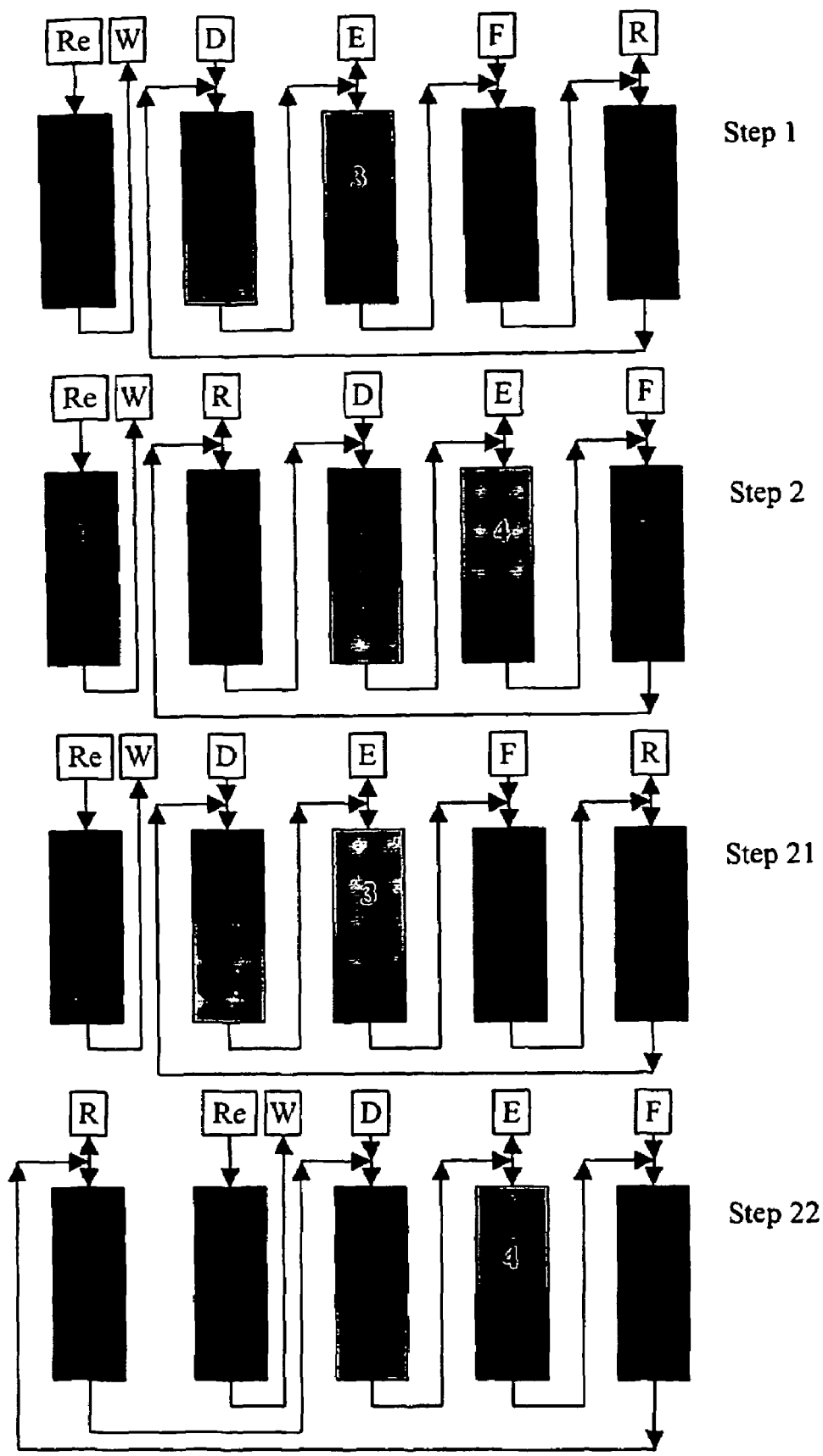
FIG. 20 is an online decoupled regeneration scheme for a simplified four zone, 1-1-1-1 column configuration binary SMB with one additional column in the regeneration zone. (Re=Regenerant, W=Waste, D=Desorbent, E=Extract, F=Feed, R=Raffinate).

FIG. 20 illustrates a simplified four column, four zone SMB with an additional column in an online decoupled regeneration zone. In the SMB shown in this figure, column 1 is regenerated for 21 regular steps of the SMB. During the $22^{nd}$ switch, column 1 is removed from the regeneration zone and inserted into zone IV. Column 2, which was in zone I in the previous step and destined for zone IV in the succeeding switch, is instead removed from zone I and inserted into the regeneration zone. If the regeneration time remains the same during operation, during the $43^{rd}$ switch, column 2, which was in the regeneration zone for 21 regular steps, is reinserted into the SMB in zone IV, and column 3 is removed and inserted in the regeneration zone. Of course, it will be understood that the regeneration time can vary depending upon process needs and conditions.

A number of valve configurations can be employed in order to accomplish the on-line decoupled regeneration contemplated by the present invention. These configurations can be based upon rotary valve systems, on-off valve systems, or a combination of these schemes. Six new SMB systems capable of the novel online decoupled regeneration scheme are presented herein to illustrate the concepts of the present invention, though the invention will be understood to include all such configurations that achieve on-line decoupled regeneration.

Eleven Two-Way Valves per Column

Figure 21:
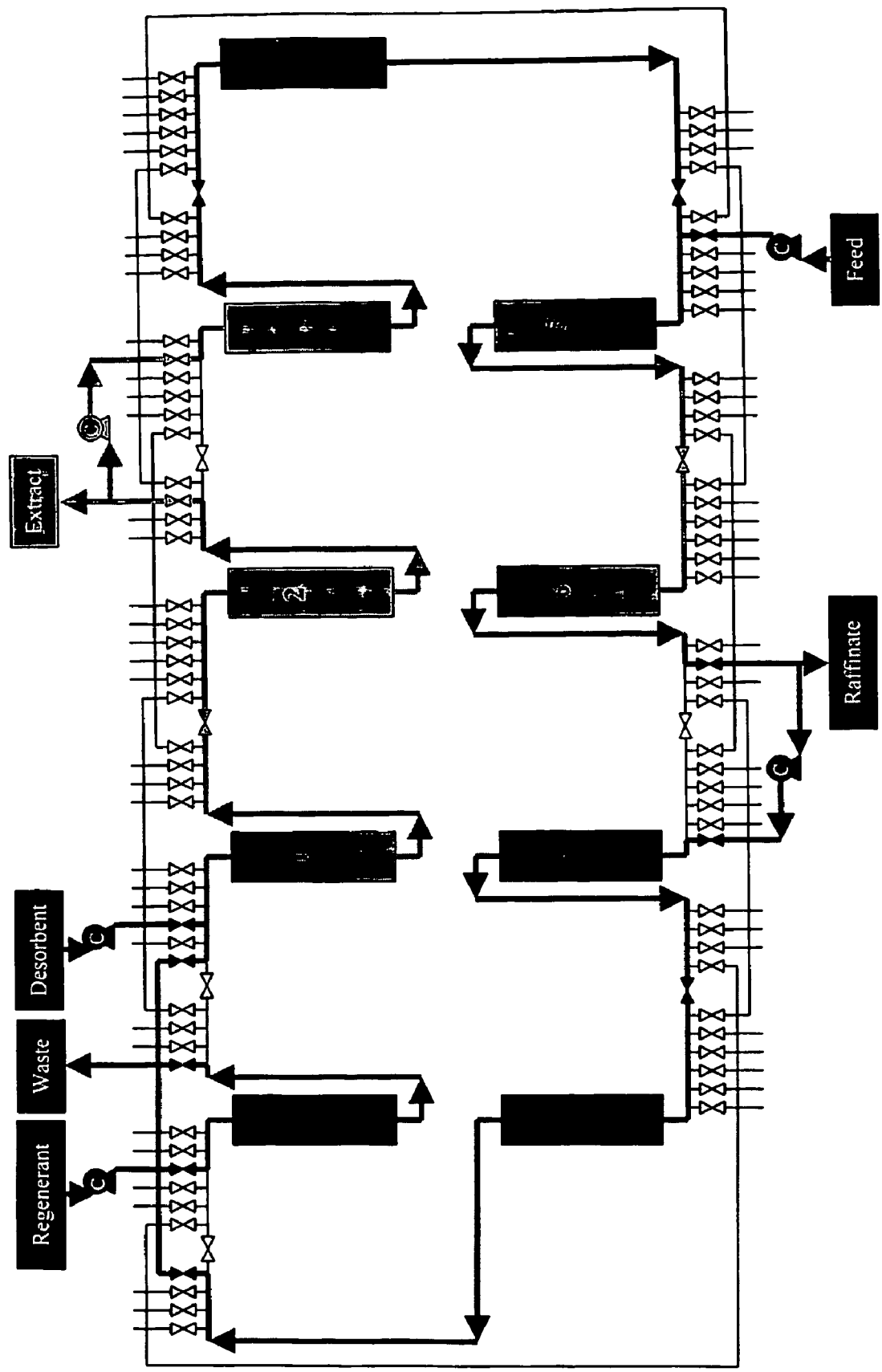
FIG. 21 represents an Eleven Two-way Valves per Column (11-2W1C) system for a four zone, 2-2-2-2 column configuration binary SMB with an additional one column online decoupled regeneration zone.
Figure 22:
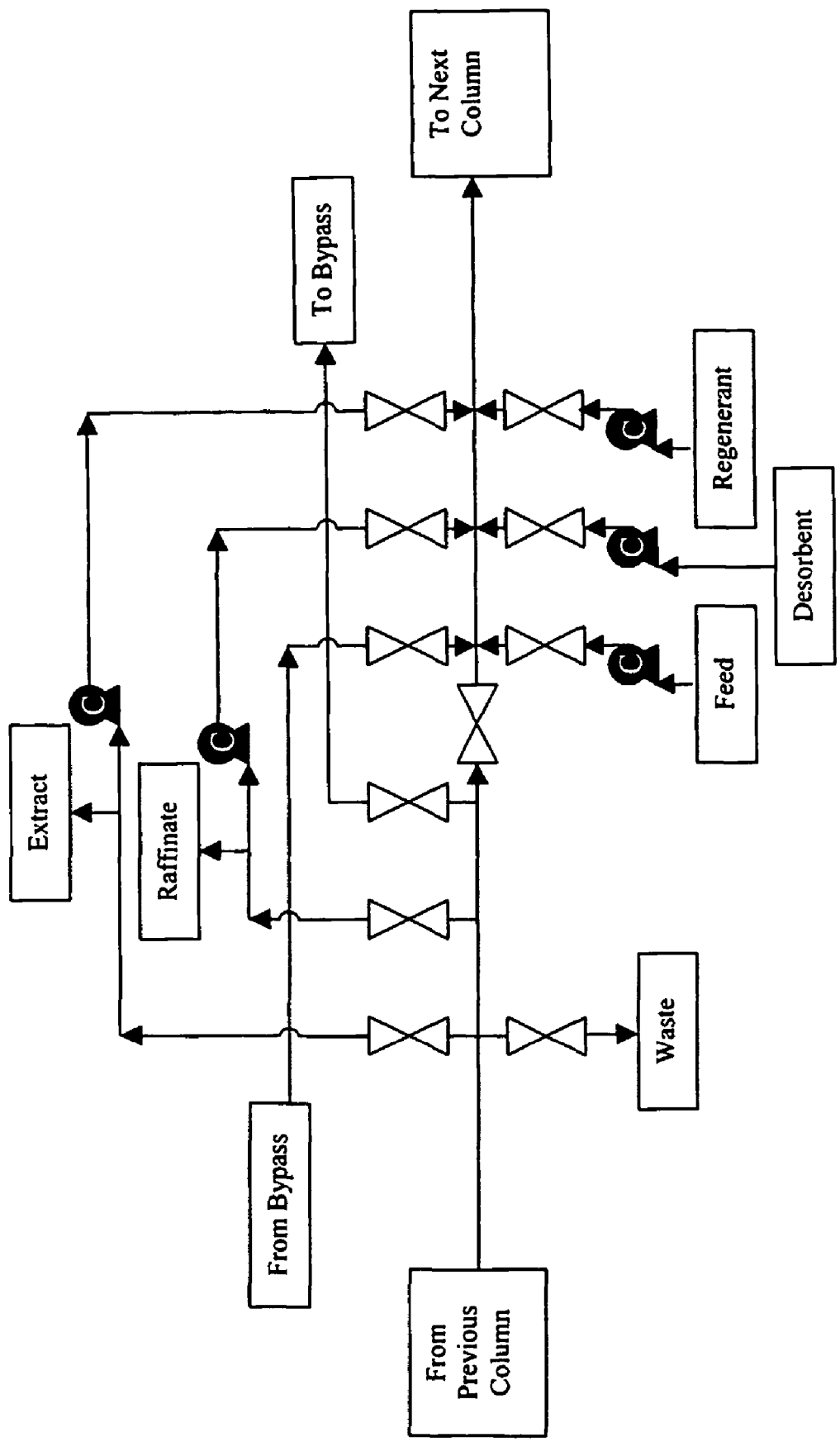
FIG. 22 is a schematic of one set of two-way valves for the Eleven Two-way Valves per Column (11-2W1C) system shown in FIG. 21. The valves represent a conventional four zone, 2-2-2-2 column configuration binary SMB with an additional one column online decoupled regeneration zone.

In one particular embodiment, the online decoupled regeneration scheme is an Eleven Two-Way Valves Per Column (11-2W1C) system as shown in FIGS. 21 and 22, wherein FIG. 21 depicts a 2-2-2-2 four zone binary SMB with an additional one column online decoupled regeneration zone, and FIG. 22 depicts the plumbing for each of the nine inter-column junctions shown in FIG. 21. As shown in FIG. 22, the junctions employ eleven two-way valves that control flow either toward or away from a central process line: (1) a waste valve for withdrawing regenerant waste from a junction, (2) a feed valve supplied by a feed pump, (3) a desorbent valve supplied by a desorbent pump, (4) a regenerant valve supplied by a regenerant pump, (5 and 6) extract valves defining a closed loop extract input/output line circulated by an internal recycle pump, (7 and 8) raffinate valves defining a closed loop raffinate input/output line circulated by an internal recycle pump, (9) a bypass inlet valve, (10) a bypass outlet valve, and (11) a central process line interruption valve.

In operation, each of these valves would cooperate in order to achieve the particular role played by the junction at a particular step in the SMB's operation. Thus, for example, when the junction is located between columns 1 and 2 in FIG. 21, all of the valves would be in the off position except for the central process line interruption valve. When the junction is located between columns 2 and 3, all of the valves except the two extract valves would be turned off. The regeneration zone is accommodated by the interaction of the two junctions on either side of column 9. In the junction that precedes column 9, only the bypass outlet and regenerant inlet valves are turned on. In the junction that follows column 9, only the waste outlet, bypass inlet, and desorbent inlet valves are turned on.

As with other distributed valve SMBs, the valves can be actuated in a manner that the functions of all of the junctions advance one junction with each successive switch of the SMB. Decoupling of the regeneration zone from the SMB separation zones is accomplished simply by skipping column 9 through this sequence until the regeneration of column 9 is complete. Thus, at the next switch for the SMB shown in FIG. 21, if the regeneration step is not yet complete, the valves in the junction between columns 8 and 9 would remain in the same position to accommodate the bypass of column 9 and the regenerant inlet to column 9, and the waste outlet and bypass inlet in the junction between columns 9 and 1 would similarly remain in the on position to complete the bypass of column 9. However, the desorbent valve would be turned off so that the input to column 1 would simply be the output of column 8.

Of course, the foregoing design could be readily adapted to accommodate more than one regeneration solvent per zone, or more than one regeneration zone, simply by adding a corresponding number of two-way valves. In contrast, the pump configuration is limited to a constant speed pump configuration because variable speed pump configurations locate a recycle pump with a column, resulting in the loss of the recycle pump as the column switches into the regeneration zone.

This design suffers from contamination caused by admixing and cross-contamination, a relatively large dead volume for lab scale size systems, and complex controls. The system also has many advantages, however, including a high level of flexibility with respect to the number of columns, zones and solvents that can be employed. In addition, the 11-2W1C design is able to handle multicomponent, open-loop, and variable zone length separations.

Four SD Rotary Valves per Column

Figure 23:
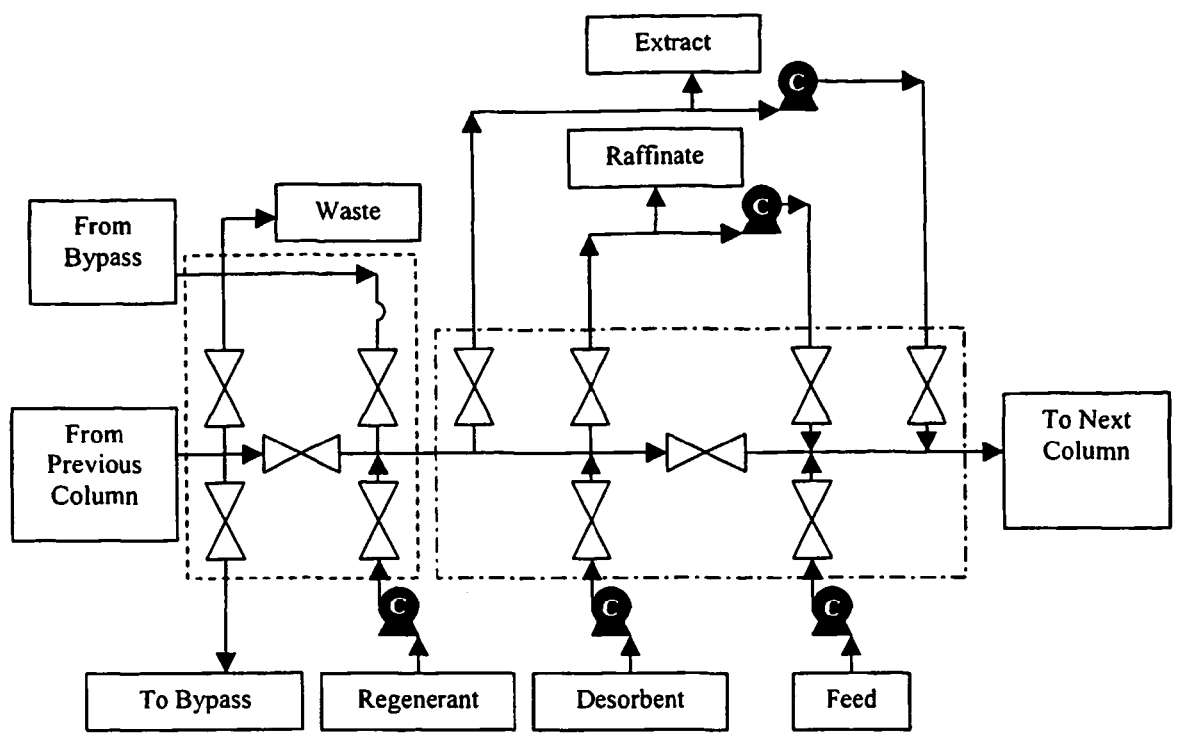
FIG. 23 is a schematic of a single set of valves for a Twelve Two-way Valve per Column (12-2W1C) system for a four zone, 2-2-2-2 column configuration binary SMB system with an additional one column online decoupled regeneration zone.
Figure 24:
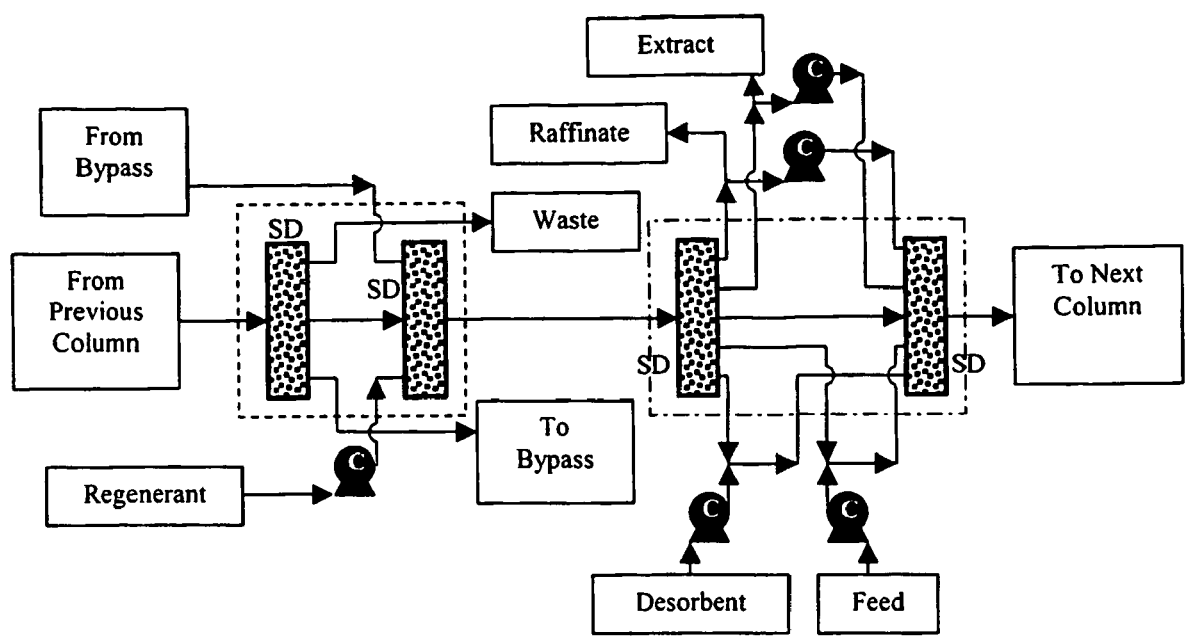
FIG. 24 is a schematic of a single set of valves for a Four SD Rotary Valves per Column (4SD1C) system for a four zone, 2-2-2-2 column configuration binary SMB system with an additional single column online decoupled regeneration zone. The two-way valves in the dashed boxes of FIG. 23 have been replaced with a pair of SD valves.

The addition of a second central processing line valve to the 11-2W1C system to obtain a Twelve Two-Way Valves per Column (12-2W1C) system allows a conceptual rearrangement of the valves into two groups, shown within dashed boxes in FIG. 23. A pair of SD rotary valves, as shown in FIG. 24, can replace each of these dashed boxes to obtain a Four SD Rotary Valves per Column (4SD1C) system, wherein each of the rotary valves is paired with an opposing rotary valve as discussed previously for the 2SD1C system.

Thus, the first pair of rotary valves modulates the functions immediately surrounding the regeneration zone (i.e. the bypass outlet and regenerant inlet that are actuated immediately before the regeneration zone, and the waste outlet and bypass inlet that are actuated immediately after the regeneration zone). When the junction is not on either side of the regeneration zone, the first pair of rotary valves simply allows flow-through of the process fluid. The first pair of rotary valves thus comprises three process lines: (1) a first open loop input/output line that accommodates waste withdrawal and bypass input, (2) a second open loop input/output line that accommodates bypass withdrawal and regenerant input, and (3) a zone bypass line. The first subjunction typically can comprise additional zone bypass lines through which the rotary valves will progress each time that a column is replaced at the conclusion of a regeneration interval. Similarly, lines can be shared to accomplish the various functions of the valve.

The second pair of rotary valves modulates the conventional functions of a 2-2-2-2 closed loop binary SMB, and thus comprises (1) a closed loop internal recycle pump extract input/output line, (2) a closed loop internal recycle pump raffinate input/output line, (3) a closed loop external pump desorbent input/output line, and (4) a closed loop external pump feed input/output line. The second pair functions identically to the pair of rotary valves in each junction of the 2SD1C system previously discussed, with the same advantages and disadvantages. Thus, although only one zone bypass line is shown in FIG. 24, it will be understood that the second "subjunction" shown preferably comprises a number of zone bypass lines sufficient to accommodate each of the interzone bypass flows of the SMB. Thus, in a 2-2-2-2 four zone SMB, the subjunction would comprise 4 zone bypass lines to facilitate the port switching portrayed in FIG. 19 at the desired step time interval.

In practice, the operation of the two subjunctions is modulated to coordinate progression of functions in the second subjunction at the desired step time interval with the replacement of columns in the regeneration zone at the regeneration interval. While the regeneration interval is decoupled from the step time interval, it will of course be understood that the regeneration interval is preferably divisible by the step time interval to give a whole number so that the columns being regenerated can be replaced in the midst of a switching event. It is also understood that if a regenerated column is to be placed in a particular zone after regeneration, the column might have to undergo further switches until the particular zone is immediately before it in the physical arrangement of the SMB. It is also understood that the regeneration switch can occur independently during SMB operation, but judicious care must be taken to account for the disruption.

The 4SD1C offers the same advantages as the 11-2W1C design but does not suffer from the same drawbacks. Most importantly, the 4SD1C design virtually eliminates the contamination seen in the 11-2W1C design principally by incorporating dedicated manifolds.

Two ST Rotary Valves in Series per Column

Figure 25:
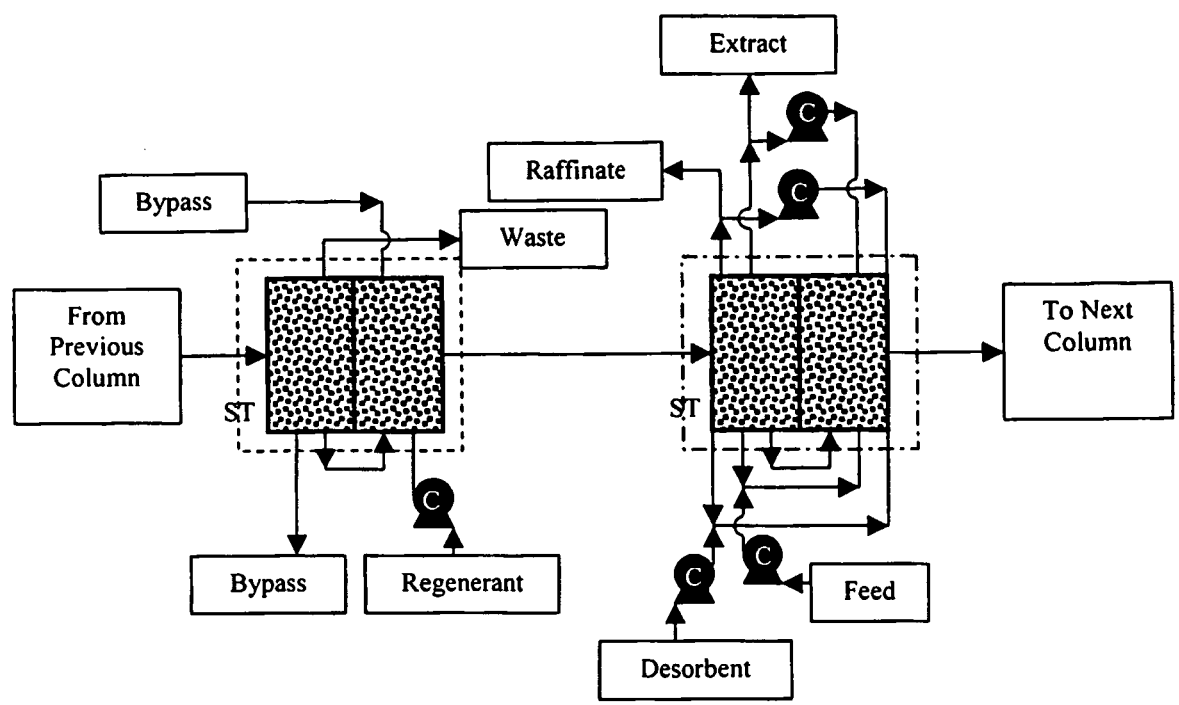
FIG. 25 is a schematic of a single set of valves for a Two ST Rotary Valves in Series per Column (2STS1C) system with an additional single column online decoupled regeneration zone. The four SD rotary valves in the dashed boxes of FIG. 24 have been replaced with a pair of ST valves.

The Two ST Rotary Valves in Series per Column (2STS1C) system represents yet another embodiment for practicing the on-line decoupled SMB separations contemplated by the present invention. The suitable design of an 2ST1C system can be arrived at simply by replacing each of the pairs of SD rotary valves in the subjunctions in the 4SD1C system with an ST rotary valve. The intercolumn junction design of the 2ST1C system is depicted in FIG. 25, wherein the dashed boxes represent the direct descendants of their counterparts in FIGS. 23 and 24. The 2STS1C design has the same benefits as the 1ST1C design including high purity, column expandability, and multisolvent, multicomponent, multizone, open-loop and variable zone length capabilities.

Figure 26:
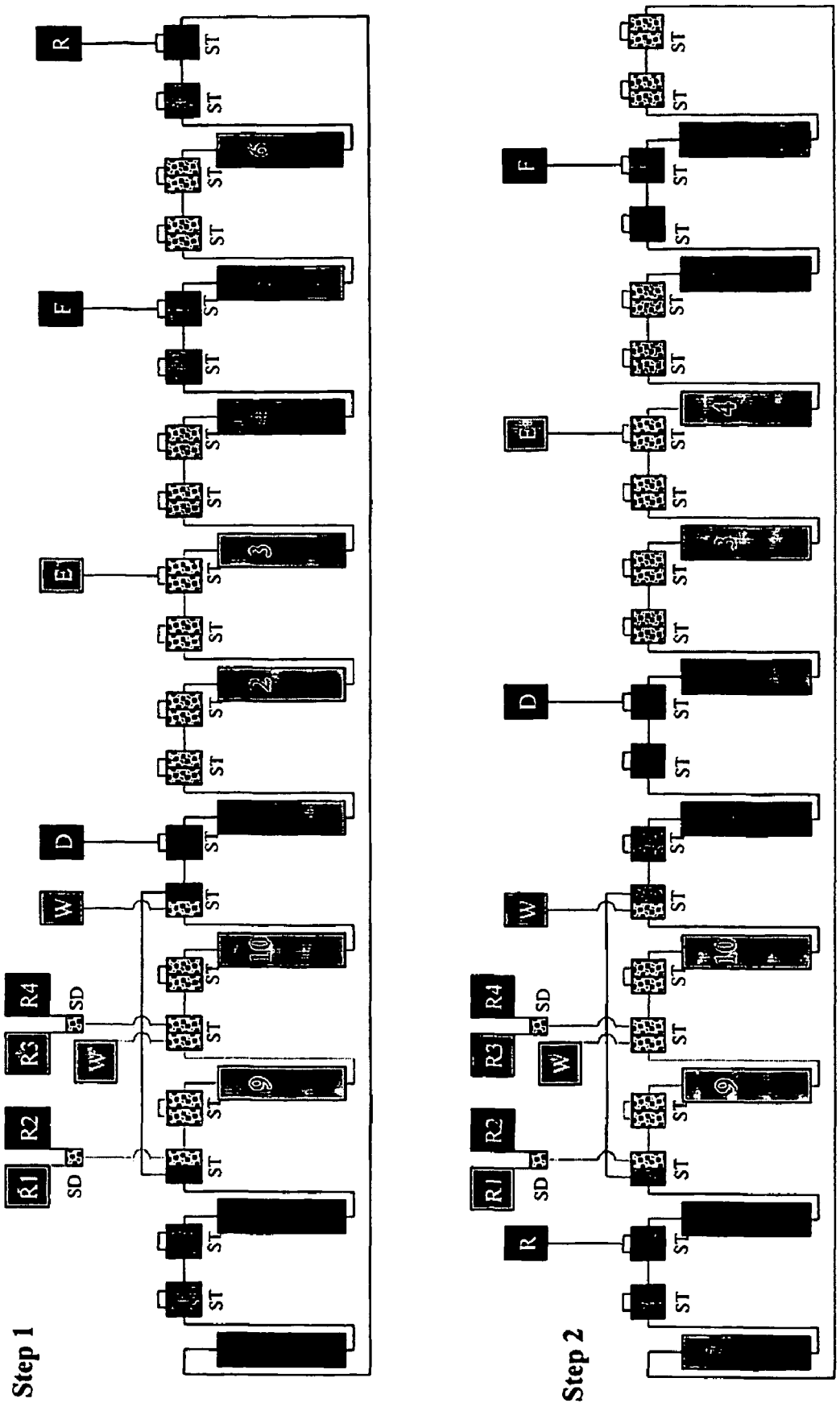
FIG. 26 depicts a Two ST Rotary Valves in Series per Column system switching sequence for a four zone, 2-2-2-2 column configuration binary SMB with two regeneration zones. Each regeneration zone is one column long with two regenerants per zone. The regeneration interval lasts 41 step times. (D=Desorbent, E=Extract, F=Feed, R=Raffinate, R1=Regenerant 1, R2=Regenerant 2, R3=Regenerant 3, R4=Regenerant 4, W=Waste).

The foregoing systems can be readily adapted to accommodate a multitude of design variations, as discussed previously. In addition, the systems can be adapted to include more than one regeneration zone or the use of multiple regenerants within a regeneration zone. FIG. 26 depicts both of these opportunities in one embodiment. In particular, FIG. 26 partially portrays a 2STS1C design for a 2-2-2-2 four zone binary SMB with two single column regeneration zones and two regenerants per zone, wherein the 2 ST rotary valves are plumbed in series.

As shown in FIG. 26, the use of more than one regenerant within a regeneration zone can be accomplished by attaching an SD rotary valve between the pump and source of the regenerants. The SD valve acts to select the correct regenerant. The second regeneration zone is obtained by modifying the first of the 2 ST rotary valves to accommodate the additional regeneration zone. In this way, both regeneration zones are decoupled from the SMB step time. However, they remain coupled to one another, and observe the same regeneration interval. The two regeneration zones can be decoupled by integrating a third ST valve in series in the junction to separately modulate the second regeneration zone, or by placing the first ST Rotary valve under a control that advances the valves to different degrees or at varying intervals depending upon the desired stream to be selected.

FIG. 26 also presents the switching sequence for the SMB in which the regeneration interval lasts for 41 regular steps. The bypass lines allow flow from zone IV to I, bypassing the regeneration zone. The switching of the desorbent, extract, feed and raffinate manifolds occurs at the second set of ST valves while the first set of ST valves provides the regeneration zone bypasses. The SD valves allow multiple regenerants within a regeneration zone.

Two ST Rotary Valves in Parallel per Column

Figure 27:
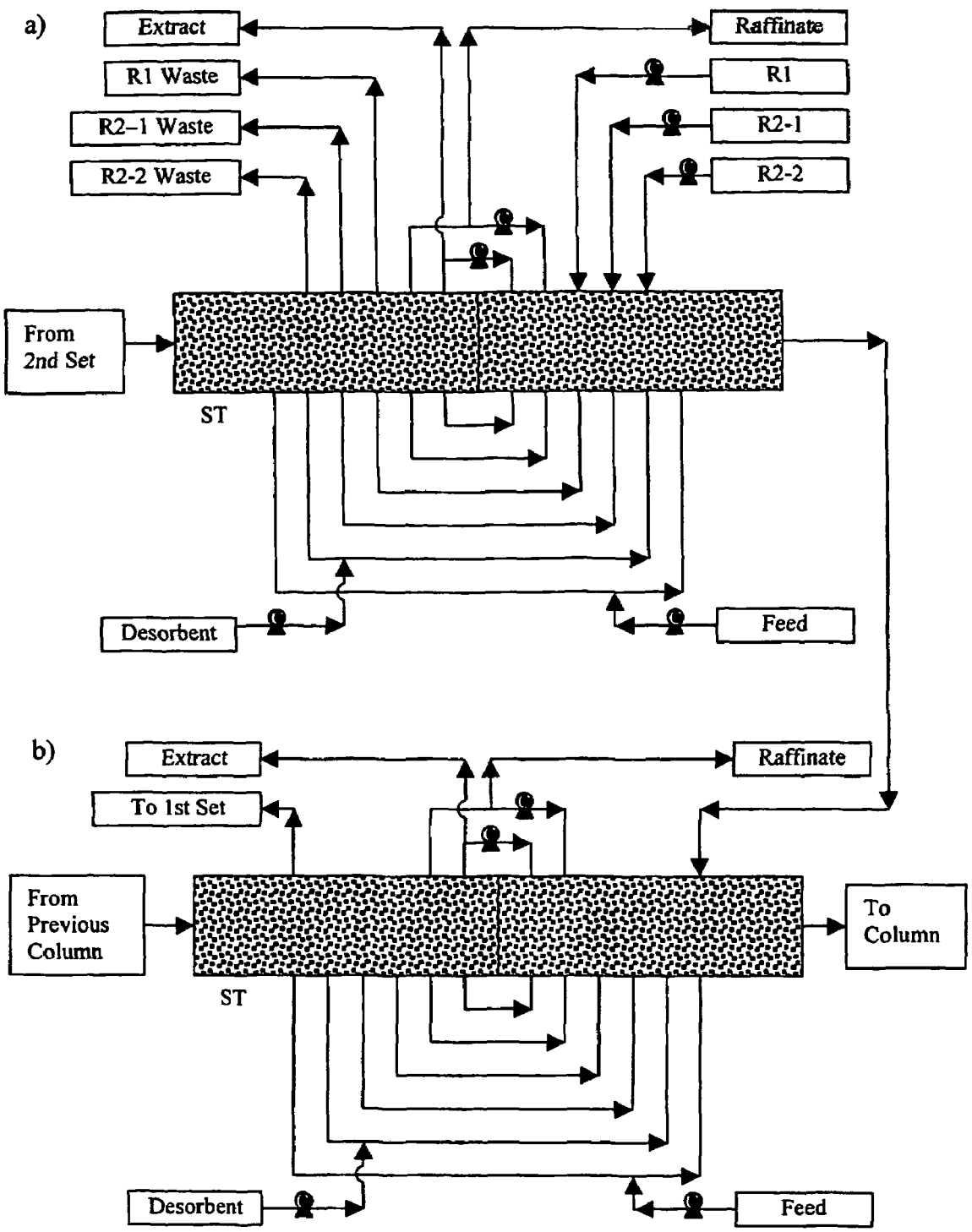
FIG. 27 is a schematic of a set of valves for a Two ST Rotary Valves in Parallel per Column system for a four zone, 2-2-2-2 column configuration with two additional regeneration zones. The regeneration zones have one and two regenerants, respectively. ST ports arrangement is shown for the first (27a) and second (27b) set of valves.
Figure 28:
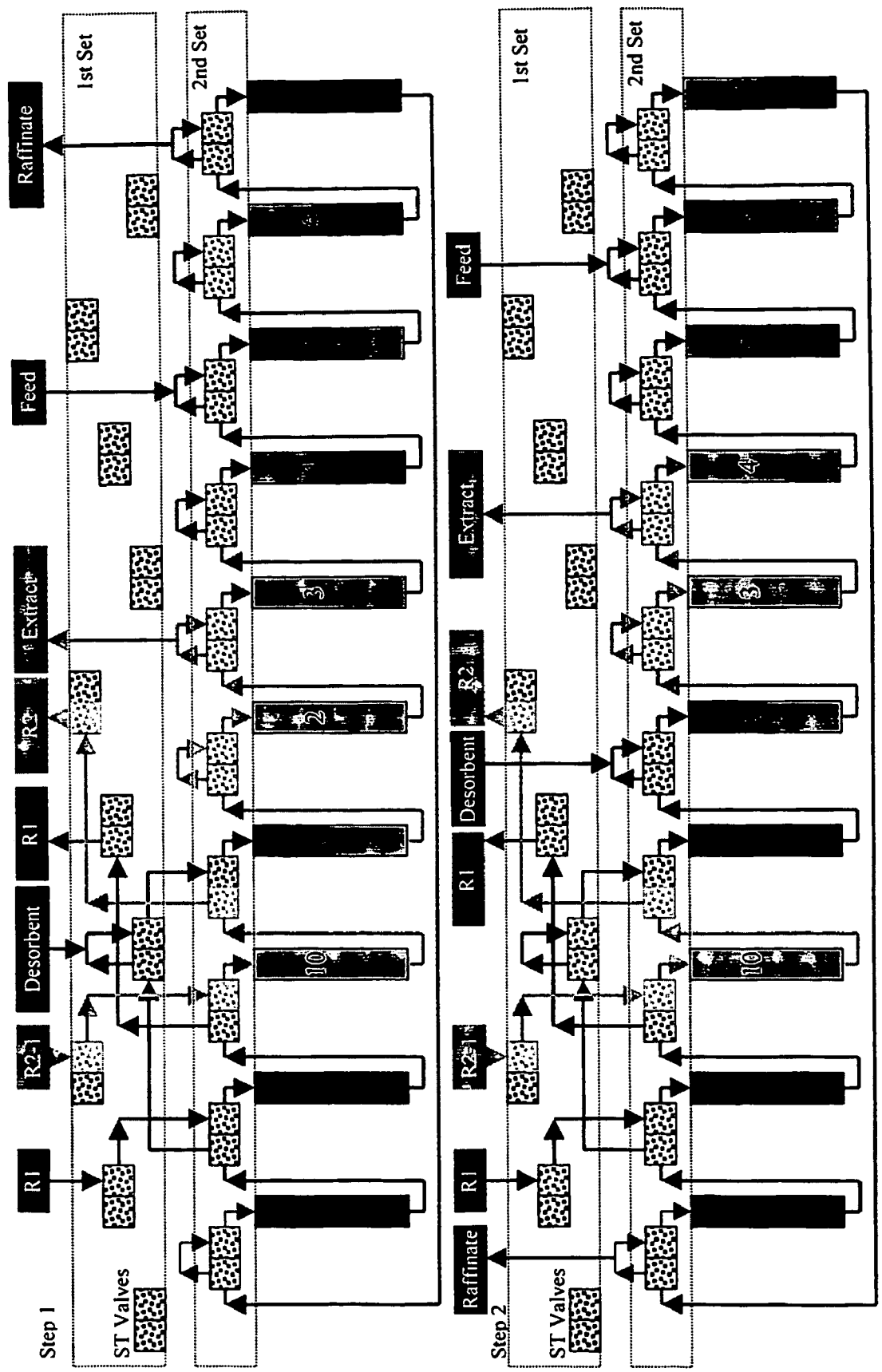
FIG. 28 depicts a Two ST Rotary Valves in Parallel per Column system switching sequence for a four zone, 2-2-2-2 column configuration with two more regeneration zones. The regeneration interval lasts 41 time steps. (R1, R2=Regenerant 1,2).

An alternative system for accommodating multiple regenerant zones or for using more than one regenerant in each regeneration zone is referred to herein as the Two ST Rotary Valves in Parallel per Column (2STP1C) system and is shown in FIGS. 27 and 28. In particular, FIGS. 27 and 28 present the port arrangement and switching sequence for a 2STP1C system for a four zone, 2-2-2-2 column configuration binary SMB with two additional regeneration zones, one regenerant in the first regeneration zone (R1) and two regenerants in the second regeneration zone (R2-1 and R2-2). In this example, the regeneration step lasts 41 regular time steps.

As shown in FIGS. 27 and 28, the 2STP1C design eliminates the need for additional SD valves to handle multiple regenerants per zone. The ST valves can selectively switch to different regenerants within a regeneration zone independent of the rest of the system. This advantage, however, is offset by the near doubling of the number of ports required per valve because both of the valves in each column are required to administer the desorbent, extract, feed and raffinate manifolds. In contrast, in the 2STS1C design (FIG. 25), the ST valves have mutually exclusive functions where the first ST rotary valve performs the regeneration zone bypasses while the second ST rotary valve selects inlet and/or outlet manifolds. Otherwise, the 2STP1C design has the same advantages and disadvantages as the 2STS1C design.

One ST Rotary Valve per Column Plus One ST Rotary Valve per Regeneration Zone The first set of valves in the 2STP1C system are not in use most of the time, as observe in FIG. 28. If minor contamination is tolerable, the first set of ST valves in the 2STP1C design can be reduced to a single ST valve with manifold. This would reduce the large number of valves needed and consequently lower the cost.

Figure 29:
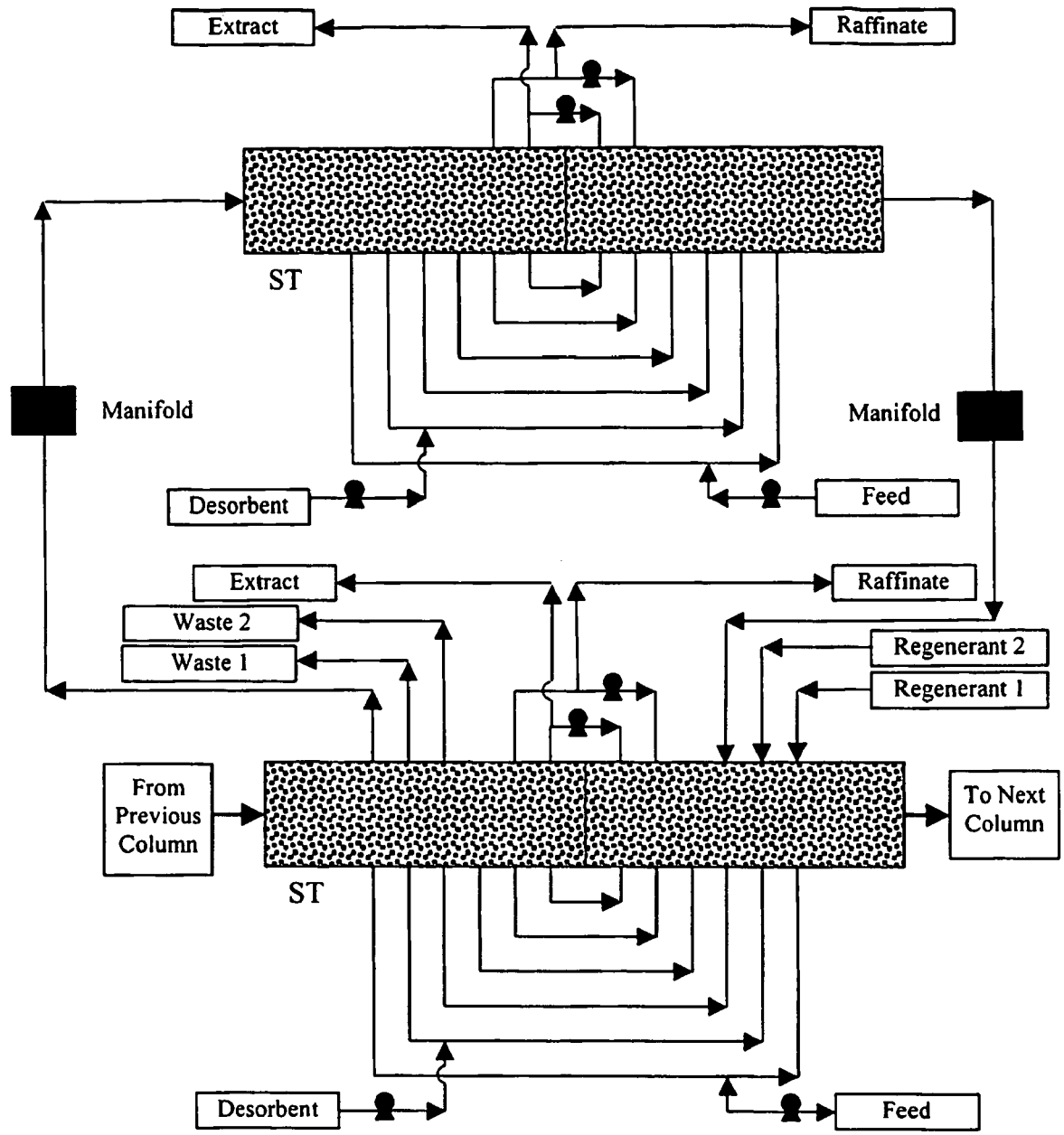
FIG. 29 depicts a schematic of a One ST Rotary Valve per Column plus One ST Rotary Valve for Regeneration Zone system for a four zone, 2-2-2-2 column configuration with two additional regeneration zones, each with one regenerant.
Figure 30:
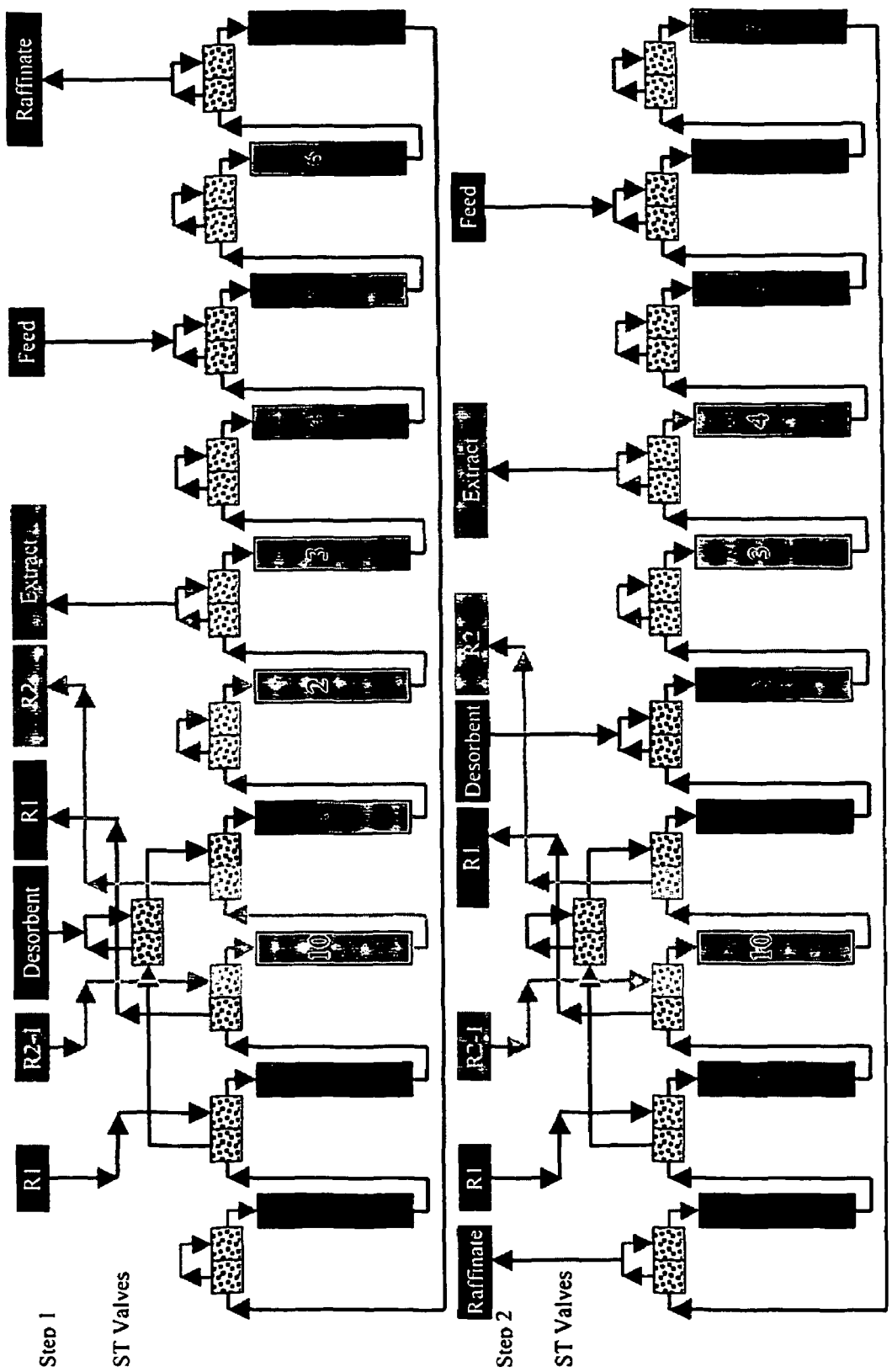
FIG. 30 portrays an 1ST1C+1STRE system switching sequence for a four zone, 2-2-2-2 column configuration with two more regeneration zones. The regeneration interval lasts 41 time steps. (R1, R2=Regenerant 1,2).

The new system, the One ST Rotary Valve per Column plus One ST Rotary Valve for Regeneration Zone (1ST1C+1STRE) system is shown in FIGS. 29 and 30. This system cannot accommodate more than one regenerant per regeneration zone without the use of SD valves as in the 2STS1C design.

The 1ST1C+1STRE design has lower purity than the other ST valves system but the valving cost is much lower. Otherwise, it has the same benefits and drawbacks as the 2STP1C and 2STS1C systems.

EXAMPLES

Figure 31:
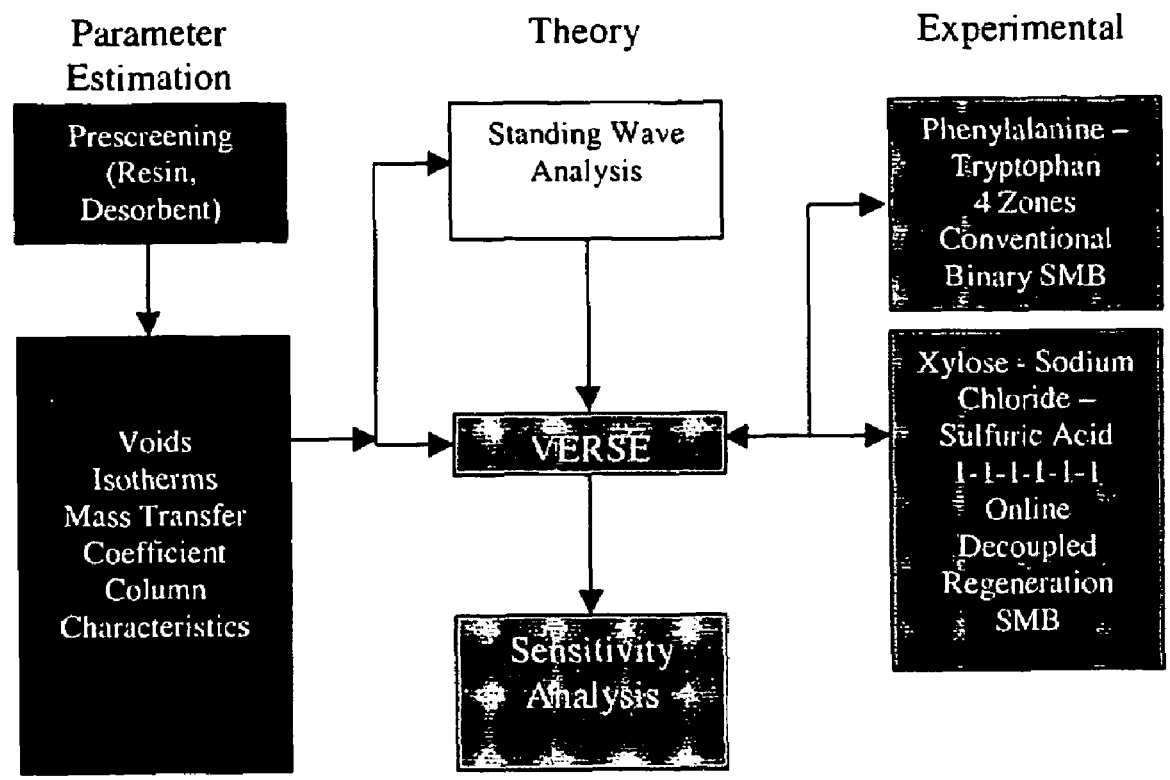
FIG. 31 is a model based design for 1ST1C system validation.

An efficient model based design approach, shown in FIG. 31, is used to minimize the number of experiments required to optimize process conditions for a particular SMD separation. Once prescreening determines an appropriate resin and an effective desorbent for a particular set of compounds, the adsorption isotherms and intrinsic parameters are determined from batch equilibrium, multiple frontals and pulse tests. The parameters are used in the Standing Wave Design (SWD) (Mallmann, et al., (1998); Xie (2001)), to find for a given feed flow rate, feed concentration and desired purity, the optimal operating parameters. Further details concerning the standing wave design can be found in PCT publication numbers WO 01/87452 and WO 01/87451, the disclosures from which are hereby incorporated by reference.

VERSE, a detailed rate model simulator, is used to check the SWD results. (Xie, (2001)). Once the actual experimental conditions and results are determined, VERSE is used again to model the experimental system. A sensitivity analysis through VERSE can identify parameters contributing to experimental discrepancies.

The separation of two amino acids, phenylalanine (Phe) and tryptophan (Trp) was selected as the first binary separation. The selected system is a typical eight column, four zone, closed-loop SMB operation. Phe and trp are stable, inexpensive, readily detectable by UV at 260 nm and available commercially.

Phe-trp SMB separation on PVP (poly-4-vinlypyridine) resin in SMBs has been carried out in earlier experiments. Wu, et. al., (1998) (Supra) and Xie (1998), carried out a total of six experimental runs on mini-ADSEP systems. The mini-ADSEP system, provided by US Filter, uses the 1SD1C design. Xie (2001) carried out an experimental run on a 20 column ISEP system purchased from AST. Table 2 lists the operating parameters and experimental results of the runs.

TABLE 2

Comparison of previous phe-trp SMB experiments. a and b = Langmuir Isotherm Parameters, $E_b$ = Axial Dispersion Coefficient, $k_f$ = Film Mass Transfer Coefficient, $D_{oo}$ = Brownian Diffusivity, $D_p$ = Intrisic Pore Diffusivity, $\epsilon_b$ = Inter-particle Voidage, $\epsilon_p$ = Particle Porosity, $K_f$ = Lumped Mass Transfer Coefficient. (N/R = Not Reported, Conc. = Concentration, C&W = Chung, et al., (1968), W&G = Wilson, et al., (1966))

| | Xie (1998) | | | | | Wu et. al. (1998) | | Xie (2001) |
|---|---|---|---|---|---|---|---|---|
| | Run 2 | Run 2* | Run 4 | Run 5 | Run 6 | Run 1 | Run 2 | Run 1 |
| Reference Parameters | | | | | | | | |
| SMB Unit | ADSEP | ADSEP | ADSEP | ADSEP | ADSEP | ADSEP | ADSEP | ISEP |
| Column Configuration | 2-3-3-2 | 2-3-3-2 | 2-3-3-2 | 2-3-3-2 | 2-3-3-2 | 2-3-3-2 | 2-3-3-2 | 2-3-3-2 |
| Step time (min) | 31.63 | 31.63 | 24.34 | 17.25 | 16.60 | 43.49 | 22.29 | 18.2 |
| Feed (mL/min) | 15 | 15 | 30 | 30 | 29 | 15 | 15 | 19.8 |
| Desorbent (mL/min) | $17.36^2$ | $35.25^2$ | $30.00^2$ | $60.87^2$ | $119.66^2$ | 16.92 | 49.65 | 40.6 |
| Extract (mL/min) | $17.64^2$ | $45.62^2$ | $30.00^2$ | $52.28^2$ | $112.58^2$ | 17.09 | 46.79 | 38.9 |
| Raffinate (mL/min) | $14.72^2$ | $20.63^2$ | $30.00^2$ | $38.59^2$ | $36.08^2$ | 14.83 | 17.85 | 21.5 |
| Zone I (mL/min) | 34.37 | 46.35 | 48.61 | 82.26 | 141.63 | 27.21 | 65.82 | 51.5 |
| Zone II (mL/min) | 16.73 | 16.73 | 18.61 | 29.98 | 29.05 | 10.29 | 19.02 | 12.6 |
| Zone III (mL/min) | 31.73 | 31.73 | 48.61 | 59.98 | 58.05 | 25.12 | 34.02 | 32.4 |
| Zone IV (mL/min) | 17.01 | 11.10 | 18.61 | 21.39 | 21.97 | 10.19 | 16.17 | 10.9 |
| Feed Conc. Phe (g/L) | N/R[1] | N/R[1] | N/R[1] | N/R[1] | N/R[1] | 1.95 | 2.0 | 5.50 |
| Feed Conc. Trp (g/L) | N/R[1] | N/R[1] | N/R[1] | N/R[1] | N/R[1] | 0.86 | 0.93 | 2.06 |
| Column Length (cm) | 76.2 | 76.2 | 76.2 | 76.2 | 76.2 | 68.6 | 68.6 | 30.5 |
| Column Diameter (cm) | 2.54 | 2.54 | 2.54 | 2.54 | 2.54 | 2.54 | 2.54 | 2.68 |
| Isotherm Parameter | | | | | | | | |
| Phe - a | 1.61 | 1.61 | 1.61 | 1.61 | 1.61 | 1.61 | 1.61 | 1.61 |
| Phe - b | 0.01534 | 0.01534 | 0.01534 | 0.01534 | 0.01534 | 0.01534 | 0.01534 | 0.0153 |
| Trp - a | 8.28 | 8.28 | 8.28 | 8.28 | 8.28 | 10.73 | 10.73 | 12.3 |
| Trp - b | 0.08087 | 0.08087 | 0.08087 | 0.08087 | 0.08087 | 0.16103 | 0.16103 | 0.161 |
| $E_b$ (cm$^2$/min) | C&W | C&W | C&W | C&W | C&W | C&W | C&W | C&W |
| $k_f$ (cm/min) | W&G | W&G | W&G | W&G | W&G | W&G | W&G | W&G |
| $D_{oo}$ (cm$^2$/min) | N/R | N/R | N/R | N/R | N/R | N/R | N/R | 4.08e-4 |
| $D_p$ (cm$^2$/min) | 6.55e-5 | 6.55e-5 | 6.55e-5 | 6.55e-5 | 6.55e-5 | 6.55e-5 | 6.55e-5 | 6.55e-5 |
| $\epsilon_b$ | 0.37 | 0.37 | 0.37 | 0.37 | 0.37 | 0.40 | 0.40 | 0.34 |

TABLE 2-continued

Comparison of previous phe-trp SMB experiments. a and b = Langmuir Isotherm Parameters, $E_b$ = Axial Dispersion Coefficient, $k_f$ = Film Mass Transfer Coefficient, $D_{00}$ = Brownian Diffusivity, $D_p$ = Intrisic Pore Diffusivity, $\epsilon_b$ = Inter-particle Voidage, $\epsilon_p$ = Particle Porosity, $K_f$ = Lumped Mass Transfer Coefficient. (N/R = Not Reported, Conc. = Concentration, C&W = Chung, et al., (1968), W&G = Wilson, et al., (1966))

|  | Xie (1998) | | | | | Wu et. al. (1998) | | Xie (2001) |
| --- | --- | --- | --- | --- | --- | --- | --- | --- |
|  | Run 2 | Run 2* | Run 4 | Run 5 | Run 6 | Run 1 | Run 2 | Run 1 |
| $\epsilon_p$ | 0.546 | 0.546 | 0.546 | 0.546 | 0.546 | 0.55 | 0.55 | 0.55 |
| $K_r$ (min$^{-1}$) | 1.5 | 1.5 | 1.5 | 1.5 | 1.5 | 1.495 | 1.495 | N/R |
| Experimental Results | | | | | | | | |
| Raffinate (Phe) | | | | | | | | |
| Phe Conc. (g/L) | N/R | N/R | N/R | N/R | N/R | 1.75 | 1.88 | 5.07 |
| Yield (%) | N/R | N/R | N/R | N/R | N/R | N/R | N/R | 100 |
| Purity (%) | 95.3 | 89.4 | 94.8 | 91.0 | 97.3 | 91.4 | 96.7 | 99.1 |
| Extract (Trp) | | | | | | | | |
| Trp Conc. (g/L) | N/R | N/R | N/R | N/R | N/R | 0.69 | 0.69 | 1.01 |
| Yield (%) | N/R | N/R | N/R | N/R | N/R | N/R | N/R | 96.3 |
| Purity (%) | 58.6 | 85.6 | 95.9 | 99.3 | 99.7 | 85.1 | 99.7 | 100 |

[1]Experimental feed concentration was not reported. However, the design values were 2.0 g/L Phe and 1.0 g/L Trp.
[2]Values were calculated from the reported feed and zone flow rates.

The new 1ST1C experimental system, named Versatile SMB, will use PVP as the resin and water as desorbent, based on the earlier experiments. The intrinsic parameters and isotherms will also be obtained from the earlier reference. A 2-2-2-2 (2 columns in zone I—2 columns in zone II—2 columns in zone III—2 columns in zone IV) column configuration is chosen for simplicity.

Two experimental runs on phe-trp have been completed. The experimental column profile for both runs matches the simulation values closely. The effluent history in Run 1 has discrepancies due to fluctuations in the extract outlet pump. Run 2, which uses a different pump configuration than Run 1 has higher purity and yield, and matches very well with the design values.

Versatile SMB System

Figure 32:
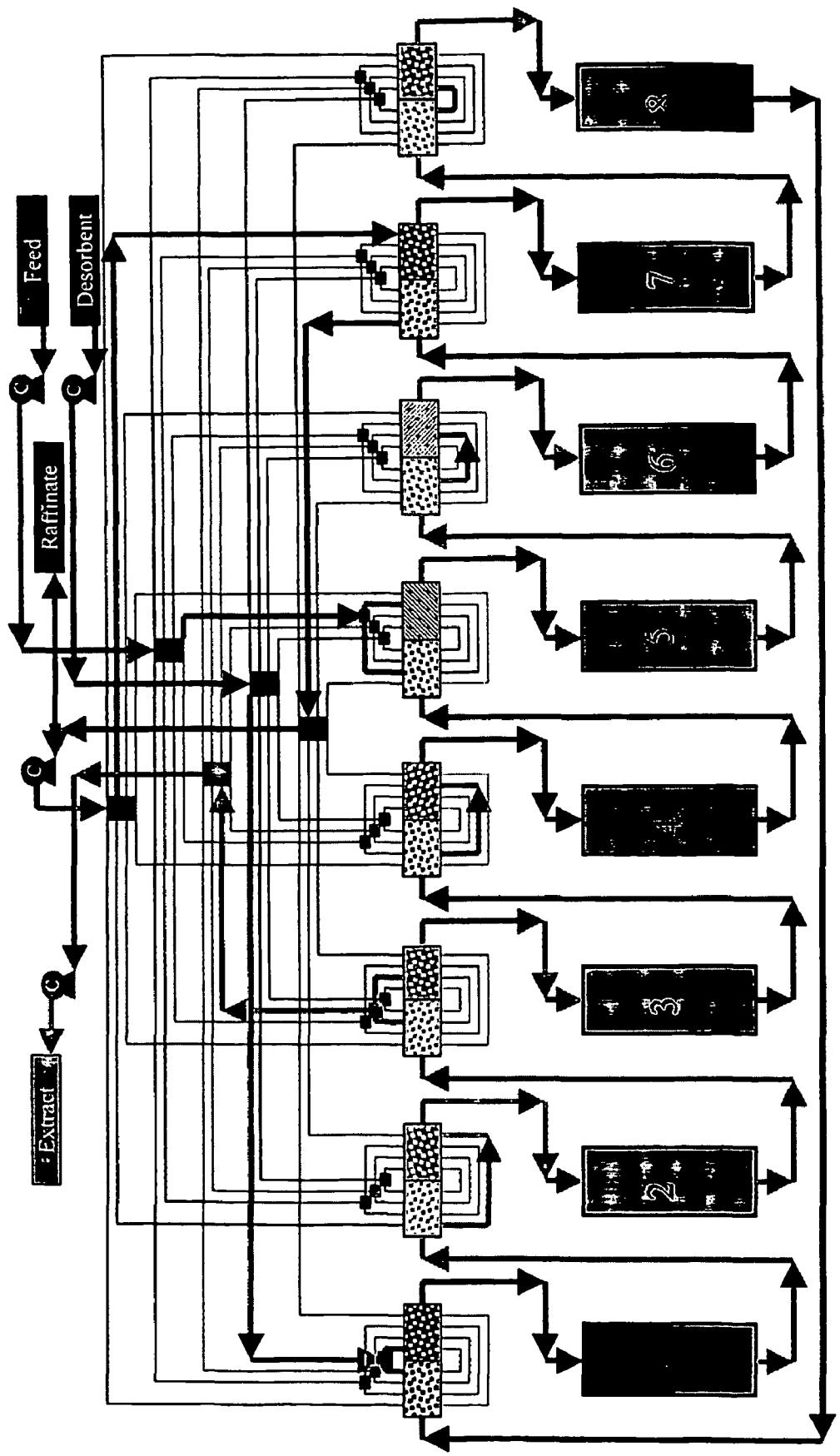
FIG. 32 is a schematic of the Versatile SMB phenylalanine-tryptophan Run 1 experiment. The 1ST1C system is a four zone, 2-2-2-2 column configuration binary system. One constant speed recycle pump in zone IV is used with two inlet pumps (Feed and desorbent) and an outlet pump (Extract).
Figure 33:
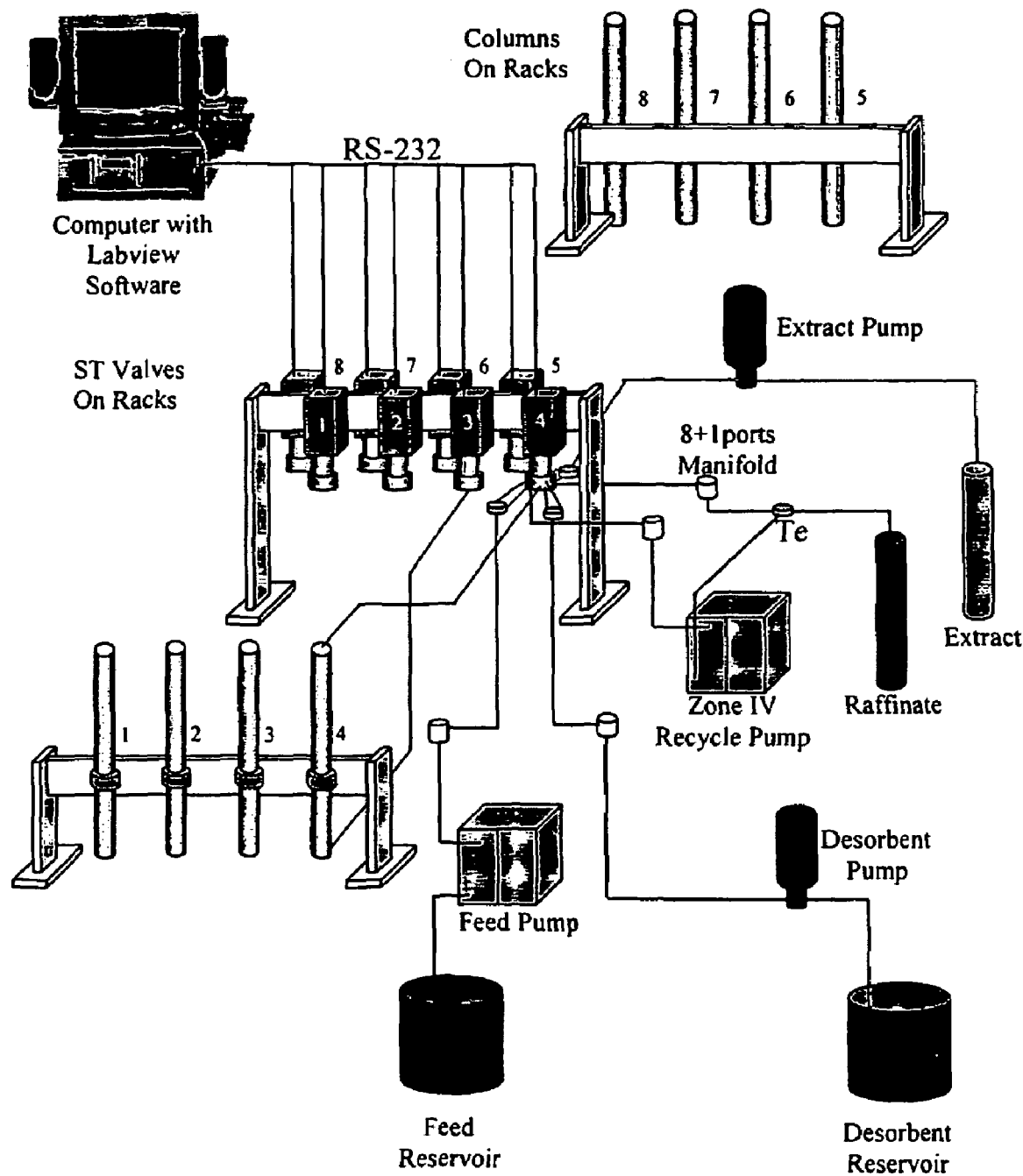
FIG. 33 depicts the Versatile SMB system used in phe-trp Run 1 experiment. Only valve four selected tubing is shown. Feed and zone IV recycle pumps are Waters 510 HPLC pumps. Desorbent and extract pumps are Fluid Metering Inc. Model RHV (With Controller V200) pumps.

FIGS. 32 and 33 present the Versatile SMB system built for the phe-trp Run 1 based on the 1ST1C design. The system consists of eight ST valves placed on a rack and controlled via a Labview vi. The columns are placed on separate racks for easy access. Graduated cylinders are used to collect and measure the extract and raffinate. Two balances, not shown, are used to measure the feed and desorbent flow rates. A four constant speed pumps configuration is used with two inlet pumps (Feed and desorbent), one recycle pump (Zone IV) and one outlet pump (Extract). The feed and extract pumps are Model RHV, with Controller V200, from Fluid Metering Inc. (FMI). The feed and recycle pumps are Waters 510 HPLC pumps.

Desorbent travels from its reservoir through the pump and the 8+1 manifold, and then joins the inline flow at a tee. The tee is connected to the desorbent ports of that valve and it is placed as near as possible to the valve to minimize the dead volume. The feed is likewise connected. The extract layout is similar to the desorbent's except for its reverse flow. In the raffinate layout, flow from zone III leaves the valve, travels through an 8+1 manifold and is split at a tee. The recycle pump draws one part of the flow and travels through another 8+1 manifold before returning to the ST valve and zone IV columns. The remaining flow leaves the system via the other leg of the tee and is collected as the raffinate.

Figure 3:
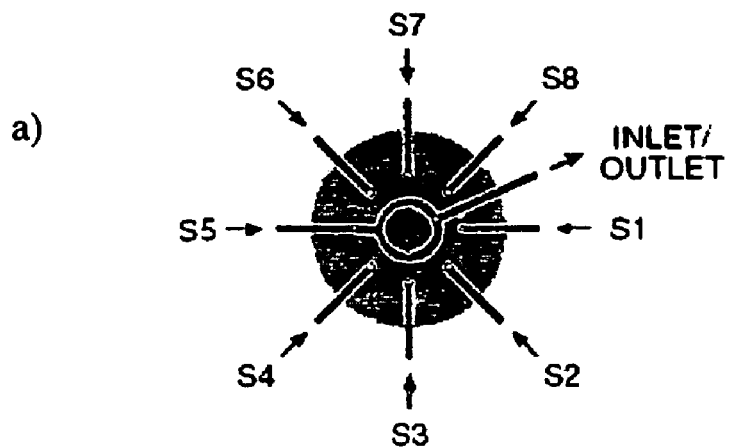
FIG. 3 is a series of figures obtained from the internet web-site of Valco Instruments Co. Inc (Houston, Tex.). The figures depict various types of valves manufactured by Valco, and employ Valco's designations. a) Select-Dead-ended (SD) flowpath b) Select-Common outlet (SC) flowpath c) Select-Flow-through (SF) flowpath d) Select-Trapping (ST) flowpath e) Select-Trapping/Flow-through (STF) flowpath.
Figure 3:
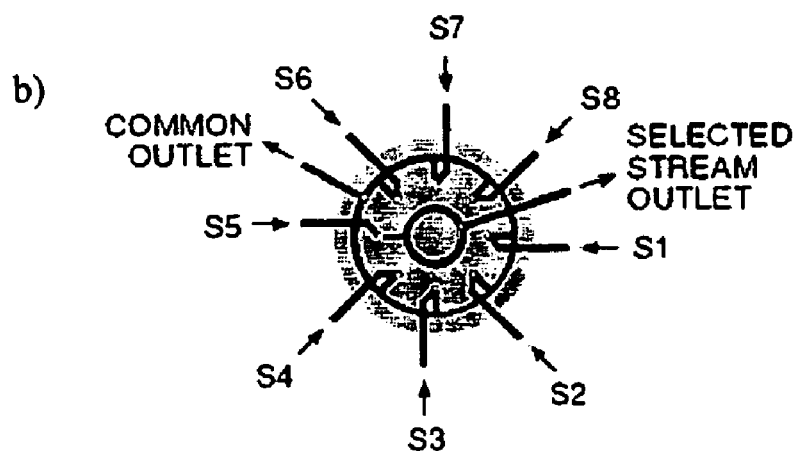
Figure 3:
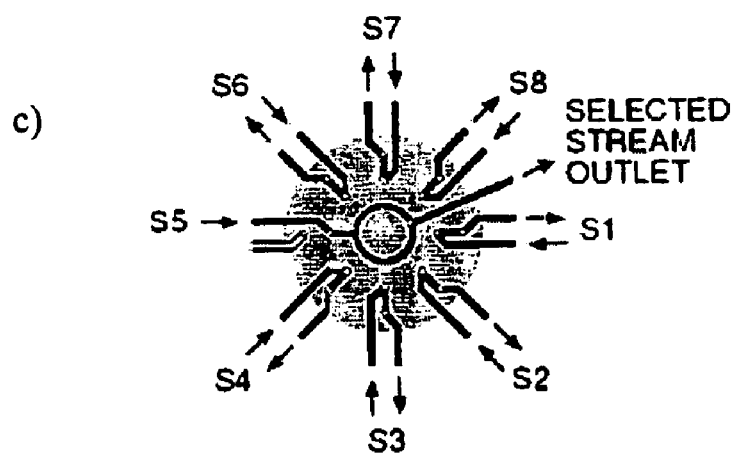
Figure 3:
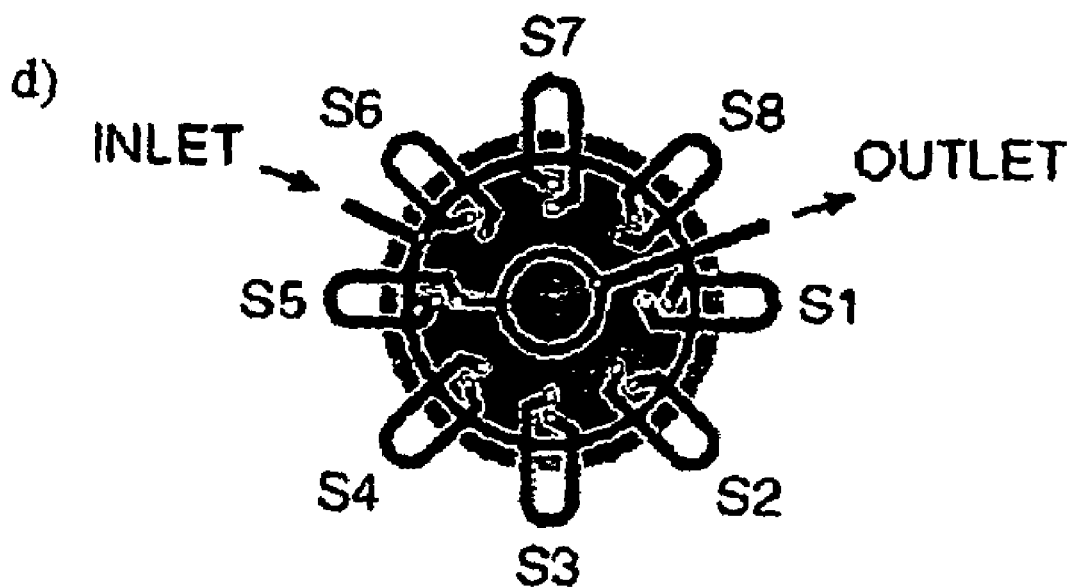
Figure 3:
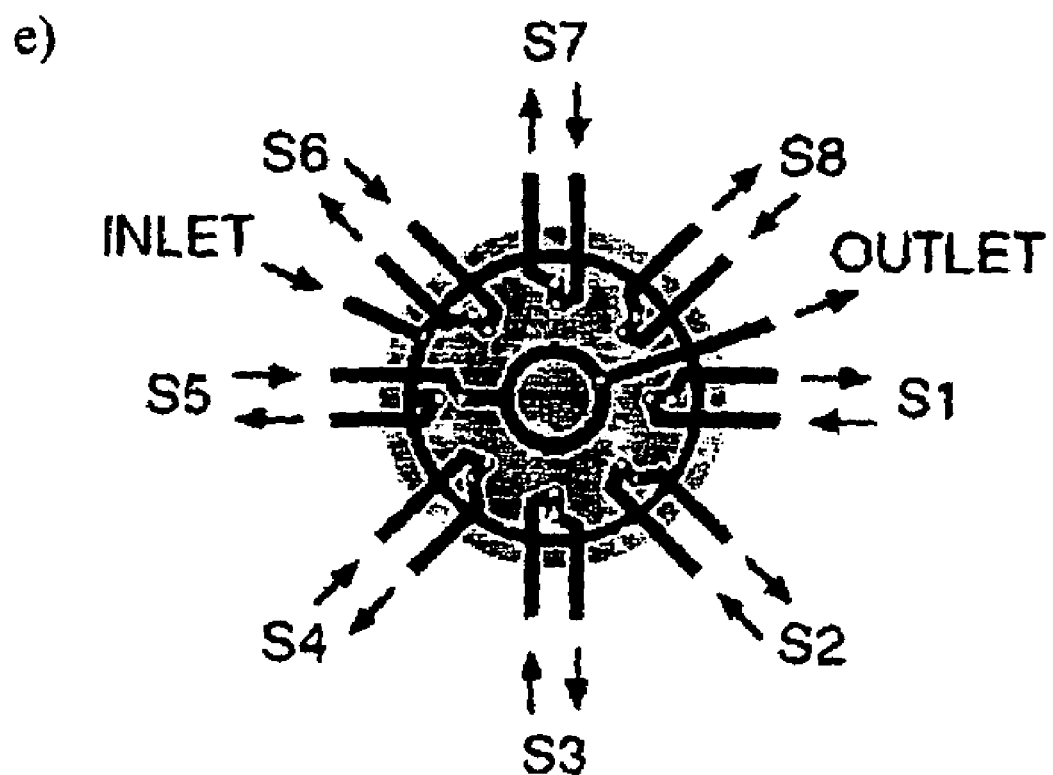
Figure 4:
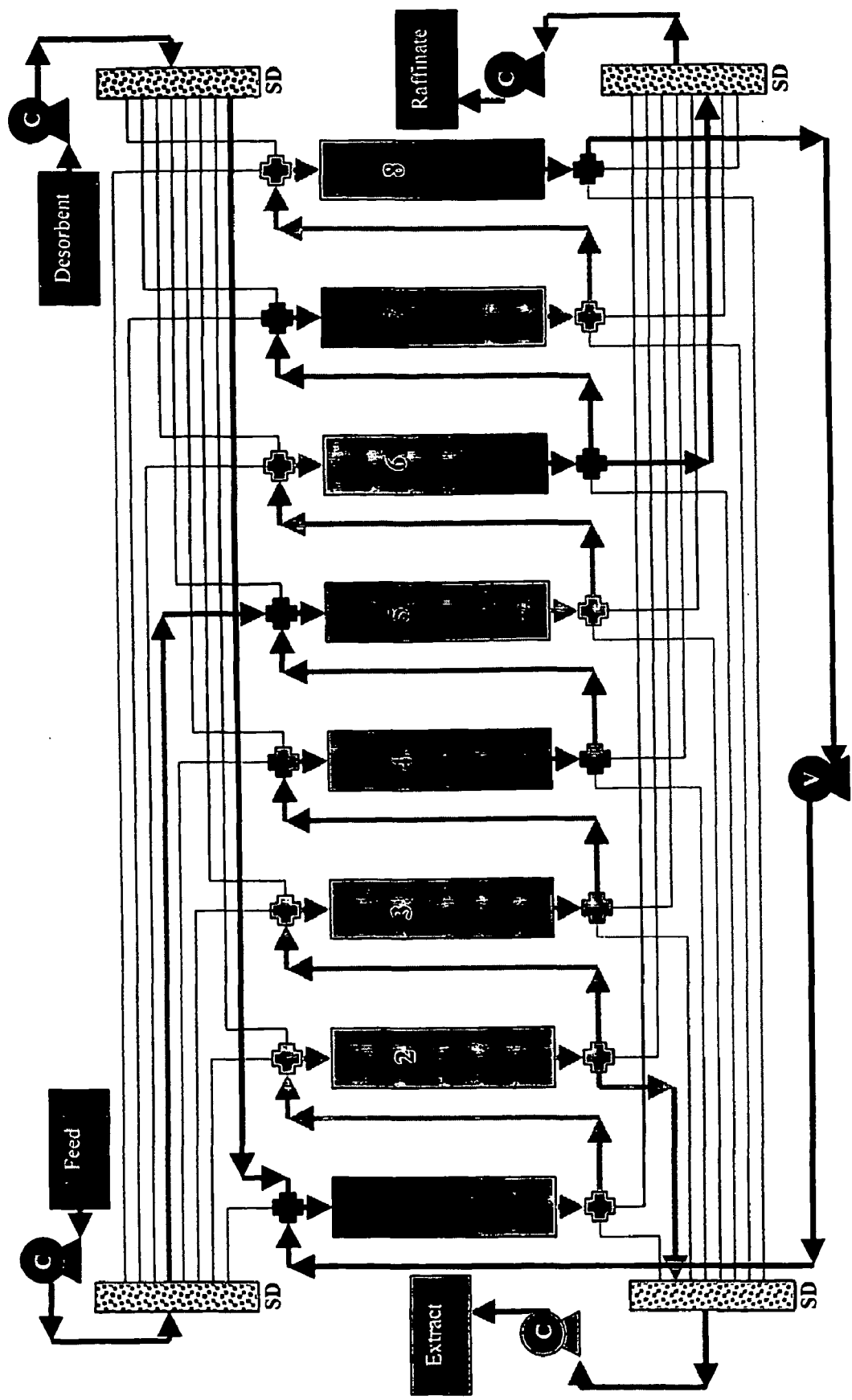
FIG. 4 is a One SD Rotary Valve per Stream SMB design for a conventional four zone, 2-2-2-2 column configuration binary SMB system. One variable speed recycle pump is used with two inlet and two outlet constant speed pumps.
Figure 5:
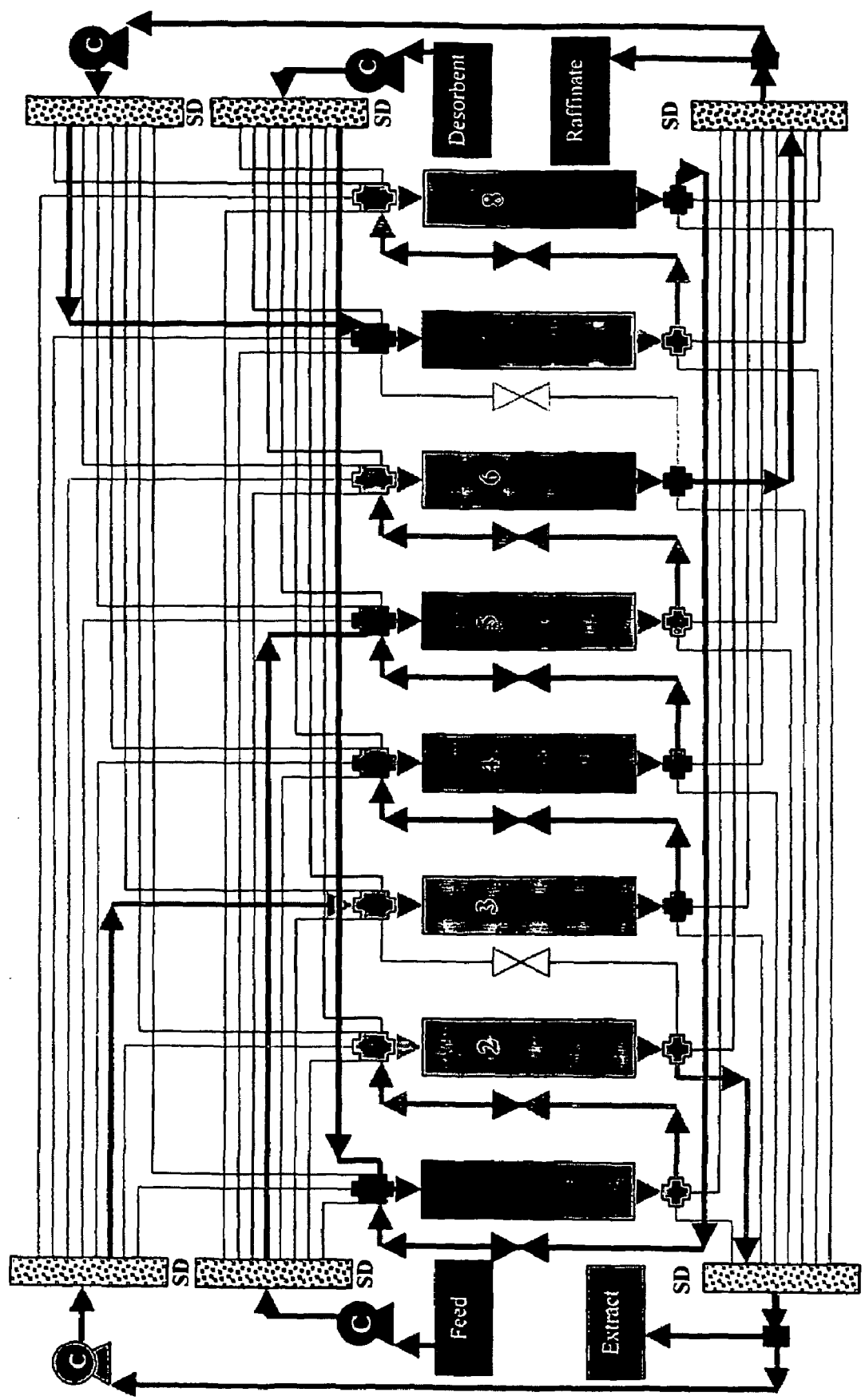
FIG. 5 represents a One SD Rotary Valve per Stream (feed and desorbent) with two SD Rotary Valves per Stream (extract and raffinate) SMB design for a conventional four zone, 2-2-2-2 column configuration binary SMB system. Four constant speed pumps are used: two recycle pumps and two inlet pumps.
Figure 6:
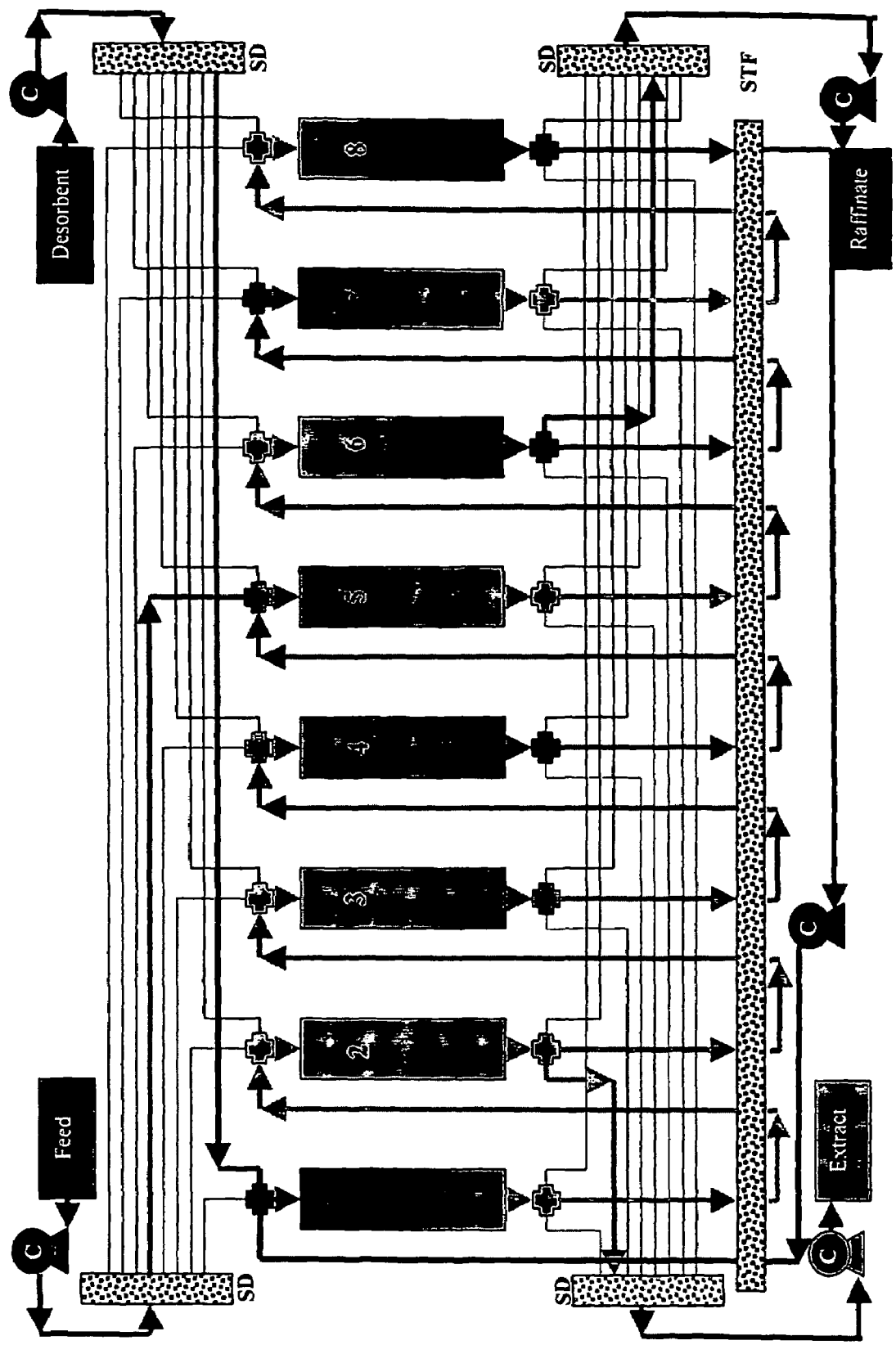
FIG. 6 portrays a One SD Rotary Valve per Stream with One STF Rotary Valve used for Columns Interconnection design for a conventional four zone, 2-2-2-2 columns configuration binary SMB system.
Figure 34:
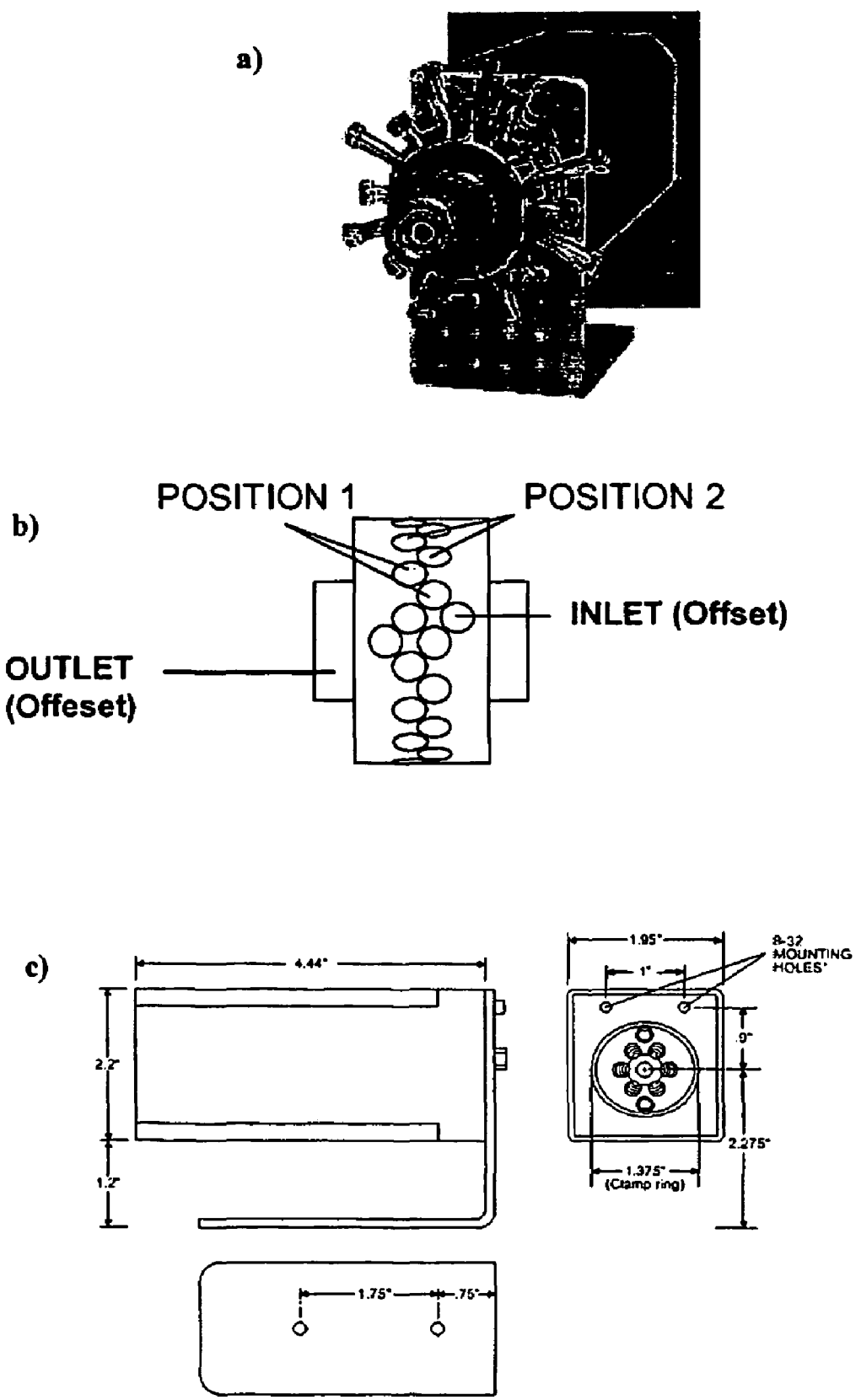
FIG. 34 portrays a Valco ST valve with microelectric actuator again taken from the internet web-site of Valco Instruments Co. Inc (Houston, Tex.).

The ST valves with a microelectric actuator and a manual controller shown in FIG. 3d and FIG. 34 were purchased from Valco. The microelectric actuator (FIG. 34c) is controlled via the manual controller or through the RS-232 protocol. A Labview vi (virtual instrument) program was written for automated switching of the valves. The vi creates a Windows interface which accepts the initial desorbent position and switching time as inputs.

The stainless steel valves each have 16 pairs of ports or 16 positions, and are rated to 500 psi liquid. The inlet and outlet ports of each valve are offset from the two rows of ports. The two rows of port are paired and numbered from 1 to 16 (FIG. 34b). Only eight sets of ports, the even numbered pairs, are used in the binary SMB experiments.

Figure 35:
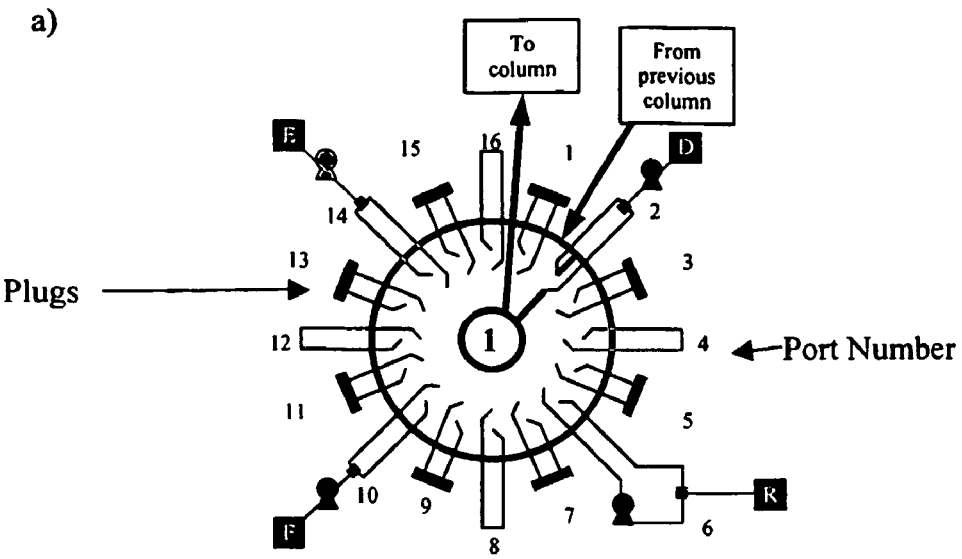
Figure 36:
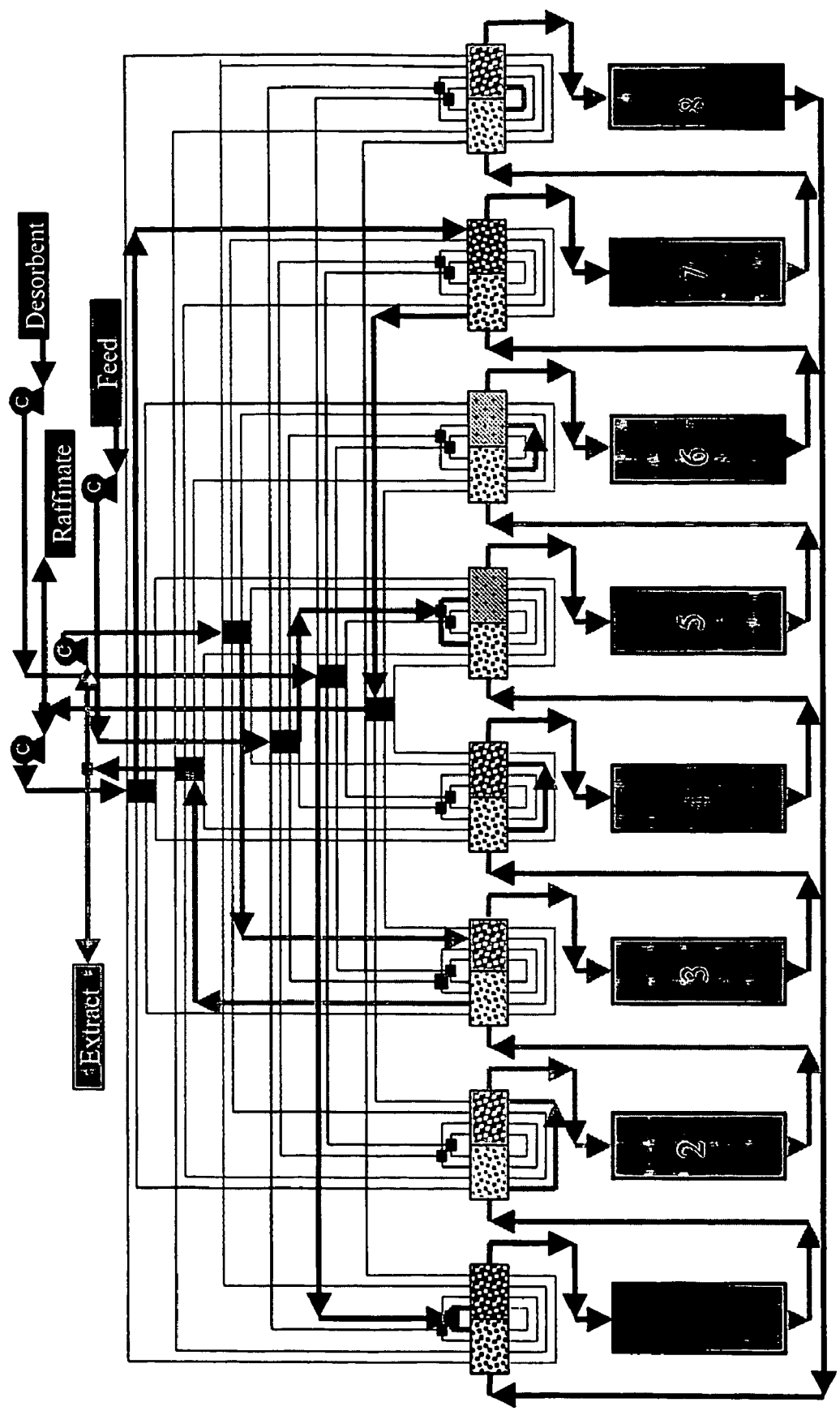
FIG. 36 is a schematic of the Versatile SMB phenylalanine-tryptophan Run 2 experiment. The system is a four zone, 2-2-2-2 column configuration binary system. Two constant speed recycle pumps in zone II and IV are used with two inlet pumps (Feed and desorbent).

Each valve is assigned an address from 1 to 8 and plumbed differently (FIG. 35). Initially it was planned to simultaneously switch all the valves through a general command. However, initial leak proofing of the system results in the shaft of the low-pressure FMI feed pump to break during switching. The feed pump undergoes a high pressure spike during the simultaneous switching of the valves which last for 304 ms. The Labview vi was changed to allow staggered switching of the valves, where the valves with the bypass ports are first switched, and then the remaining four valves are only switched 1000 ms after the first command. This provides an inlet and/or outlet for all the pumps at anytime and thus prevents formation of pressure spikes or vacuums. Run 2 vi adds a ticking countdown to the original vi.

Figure 38:
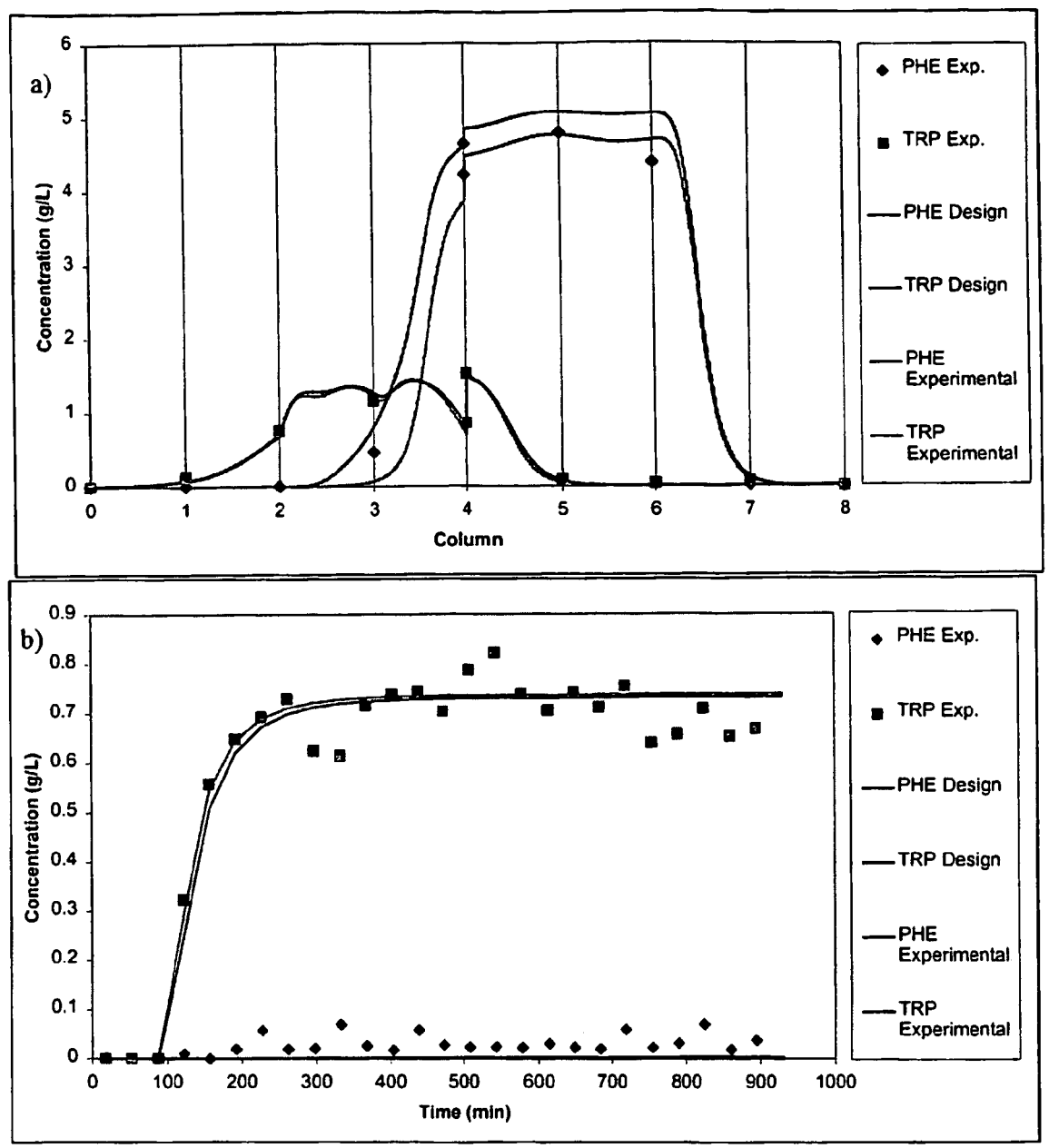
FIG. 38 portrays a) $27^{th}$ mid-cycle column profile, b) Extract history and c) Raffinate history of experimental results (Symbols) and VERSE simulation (Smooth lines) for Run 1 phe-trp SMB. VERSE simulations include the SWD design operating parameters and the average experimentally measured operating parameters given in Table 6. (Exp.=Experimental Data, Phe=Phenylalnine, Trp=Tryptophan).

In phe-trp Run 2, the system used two recycle pumps instead of one. The recycle pumps were placed in zone II and IV, as shown in FIG. 38. All four pumps used experimentally were FMI Model RHV pumps. The only other modification in Run 2 is the use of the modified vi.

Example 1

Phenylalanine-Tryptophan SMB Separation—Experimental Setup and Design

The first experimental validation runs on the 1ST1C system used the well-understood phenylalanine-tryptophan as its model separation. Values from Xie, (2001) in Table 2 were used to design an appropriate set of operating parameters. The identical desorbent (water) and resin, (PVP) was used. The PVP resin, Reillex HP Polymer from Reilley Industries Inc. (Indianapolis, Ind.), is stable and easily regenerated. The resin was packed via the slurry packing method (Xie, (2001)). Table 3 lists the properties of the resin. The glass columns (30.5×2.68 cm) were obtained from Ace Glass Inc.

PVP resin was regenerated and repacked for Run 2. Water was pumped at high flow rates (>25 ml/min) through the columns for 24 hours before unpacking. The resin was successively soaked in 1 mol of NaOH, water, 1 mol of HCl, followed again by water, 50% ethanol by volume and finally with water again. Each step lasted 24 hours.

A 5.0 g/L Phe, 2.0 g/L Trp feed at 8.0 mL/min and a desired extract (Trp) purity and yield of 99.0% was chosen for both runs. These parameters were fed through the Standing Wave Design (SWD) (Mallmann, et. al., (1998)). The resulting operating parameters are listed in Table 4. Note that the resulting raffinate is predicted to have 99.6% yield and 99.6% purity. Raffinate and extract dilution are 2% and 63.5%, respectively.

VERSE simulation requires two additional parameters, the Brownian diffusivity, $D_{00}$ and the intrinsic pore diffusivity, $D_p$, which were obtained from Xie, (2001) in Table 2. The axial dispersion and film mass transfer coefficient were obtained, respectively, from Chung, et al., (1968) (supra), and Wilson, et al., (1966) (supra). Table 5 lists the input and output parameters from the VERSE simulation. The predicted extract and raffinate concentration, yield and purity match the SWD design closely. The simulation effluent histories indicate that at 17.5 time step, both the extract and raffinate concentration would surpass 99.7% of their steady state values. Sufficient feed and desorbent was prepared for a maximum of 30 steps. Phe (Catalog #: P,1700-8, Lot #: 03323LU) and trp (Catalog #: T-0254, Lot #: 89H0816) were obtained from Sigma Aldrich.

HPLC assay was used to determine phe and trp concentration. The HPLC system consists of two Waters 515 HPLC pumps, a Waters 996 Photodiode Array Detector and a Rheodyne 7725i injector. Waters Millennium 32 software was used for collecting and analyzing the samples collected. Based on the method used by Xie, (2001), phe-trp assay was carried out at 0.5 mL/min at 20/80% acetonitrile/water by volume on a YMC ODS-AQ HPLC column (5 μm 120 Å, 4.6×250 mm) from Waters. HPLC grade acetonitrile from Mallinckrodt and water (Distilled deionized water) from a Milli-Q system by Millipore was used. The mobile phase was degassed for 30 minutes prior to use.

TABLE 3

Typical properties for the PVP resin used in the Phe-Trp SMB experiments.

| Characteristics | Description |
| --- | --- |
| Appearance | White to beige spherical beads |
| Solubility | Insoluble in water, acids, bases and organic solvents |
| Flash Point | >300° F |
| BET Surface Area | 60 m²/g |
| Total Pore Area | 108 m²/g |
| Media Pore Diameter (Volume Average) | 600 Å |
| Bulk Density | 0.53 g/mL |
| Porosity | 55.0% |
| Loss on Drying | 53.0% |
| Backwashed and Settled Density | 38.5 lb/ft³ |
| True Density (Wet Absolute) | 1.07 g/mL |
| Average Radius | 180 μm |

TABLE 4

Non-linear, non-ideal Standing Wave Design with iteration inputs and outputs for Run 1 and 2 phe-trp SMB separation.

| Parameters | Values |
| --- | --- |
| Inputs | |
| Phe - a | 1.61 |
| Phe - b | 0.0153 |
| Trp - a | 12.3 |
| Trp - b | 0.161 |
| Feed Flow rate (mL/min) | 8.0 |
| Feed Concentration - Phe (g/L) | 5.0 |
| Feed Concentration - Trp (g/L) | 2.0 |
| Column Length (cm) | 30.5 |
| Column Internal Diameter (cm) | 2.68 |
| Particle Radius (μm) | 180 |
| $\epsilon_b$ | 0.34 |
| $\epsilon_p$ | 0.55 |
| Viscosity of Desorbent (g/cm/s) | 0.0089014 |
| Density of Desorbent (g/cm³) | 0.99705 |
| Column Configuration | 2-2-2-2 |
| Desired Extract Purity | 99.0% |
| Desired Extract Yield | 99.0% |
| Outputs | |
| Desorbent Flow rate (mL/min) | 21.889 |
| Extract Flow rate (mL/min) | 21.599 |
| Raffinate Flow rate (mL/min) | 8.290 |
| Zone I Flow rate (mL/min) | 27.122 |
| Zone II Flow rate (mL/min) | 5.523 |
| Zone III Flow rate (mL/min) | 13.523 |
| Zone IV Flow rate (mL/min) | 5.233 |
| Step time (min) | 35.1 |
| Estimated Raffinate Purity | 99.6% |
| Estimated Raffinate Yield | 99.6% |
| Estimated Extract Concentration (Trp) (g/L) | 0.73 |
| Estimated Raffinate Concentration (Phe) (g/L) | 4.80 |

Desorbent is pure water. (a and b = Langmuir Isotherm Parameters, $\epsilon_b$ = Inter-particle Voidage, $\epsilon_p$ = Particle Porosity)

TABLE 5

VERSE inputs and outputs for run 1 and 2 phe-trp SMB separation using the non-linear, non-ideal SWD with iteration design values.

| Parameters | Values |
| --- | --- |
| Inputs | |
| Phe - a | 1.61 |
| Phe - b | 0.0153 |
| Trp - a | 12.3 |
| Trp - b | 0.161 |
| Feed Flow rate (mL/min) | 8.0 |
| Desorbent Flow rate (mL/min) | 21.889 |
| Raffinate Flow rate (mL/min) | 8.290 |
| Zone IV Flow rate (mL/min) | 5.233 |
| Feed Concentration - Phe (g/L) | 5.0 |
| Feed Concentration - Trp (g/L) | 2.0 |

TABLE 5-continued

VERSE inputs and outputs for run 1 and 2 phe-trp SMB separation using the non-linear, non-ideal SWD with iteration design values.

| Parameters | Values |
|---|---|
| Column Length (cm) | 30.5 |
| Column Internal Diameter (cm) | 2.68 |
| Particle Radius (μm) | 180 |
| $\epsilon_b$ | 0.34 |
| $\epsilon_p$ | 0.55 |
| $E_b$ (cm$^2$/min) | C&W |

TABLE 5-continued

VERSE inputs and outputs for run 1 and 2 phe-trp SMB separation using the non-linear, non-ideal SWD with iteration design values.

| Parameters | Values |
|---|---|
| $k_f$ (cm/min) | W&G |
| $D_{00}$ (cm$^2$/min) | N/R |
| $D_p$ (cm$^2$/min) | 6.55e−5 |
| Column Configuration | 2-2-2-2 |
| Dead Volume (mL) | 8 |
| Step time (min) | 35.1 |
| Outputs | |
| Raffinate Purity | 99.85% |
| Raffinate Yield | 99.96% |
| Raffinate Concentration (g/L) | 4.82 |
| Extract Purity | 99.56% |
| Extract Yield | 99.69% |
| Extract Concentration (g/L) | 0.73 |

(a and b = Langmuir Isotherm Parameters, $E_b$ = Axial Dispersion Coefficient, $k_f$ = Film Mass Transfer Coefficient, $D_{00}$ = Brownian Diffusivity, $D_p$ = Intrisic Pore Diffusivity, $\epsilon_b$ = Inter-particle Voidage, $\epsilon_p$ = Particle Porosity)

Figure 37:
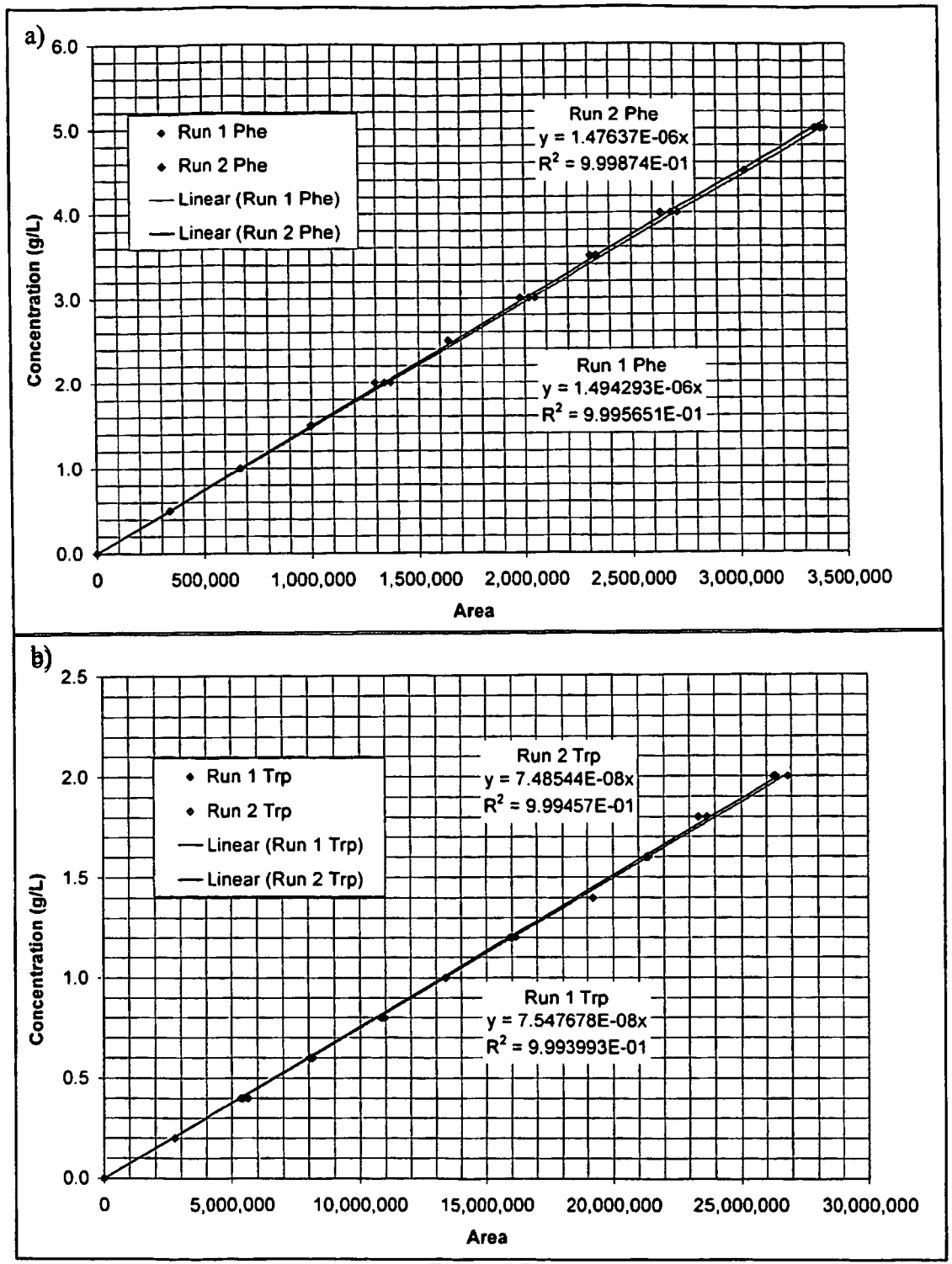
FIG. 37 depicts a) phe and b) trp HPLC assay calibration curves (260 nm) for Run 1 and 2 phe-trp SMB. Symbols are experimental data and smooth lines are regressed lines. YMC ODS-AQ C18 5 μm, 120 Å, 4.6×250 mm, 20/80% v/v Acentonitrile/Water 0.5 mL/min.

Phenylalanine-Tryptophan SMB Separation—Experimental Results, Simulation and Discussion Phe and trp HPLC assay calibration curves are presented in FIG. 37. As expected from Xie, (2001), the data regress well linearly at 260 nm. Run 2 and 1 calibration curves differ by an acceptable 1%.

Table 6 tabulates the steady state experimental results and simulation predictions against the design values from the Standing Wave Design. Run 1 extract purity and yield were 95.6% and 98.0%, while the raffinate purity and yield were 99.1% and 98.2%. Run 2 extract purity and yield were 99.1% and 98.7%, while the raffinate purity and yield was 99.5% and 99.6%, respectively. Run 2 compares very well with the earlier experiments listed in Table 2.

TABLE 6

Experimental results from Run 1 and 2 phe-trp SMB separation in comparison with the SWD design values and VERSE simulations based upon the average experimental conditions.

| Parameters | SWD Design | Run 1 Exp. | Run 1 Sim.[1] | Run 2 Exp. | Run 2 Sim.[2] |
|---|---|---|---|---|---|
| Average feed flow rate (mL/min) | 8.00 | 8.00 | 8.00 | 7.88 | 7.88 |
| Average desorbent flow rare (mL/min) | 21.89 | 22.19 | 22.19 | 21.89 | 21.89 |
| Calibration zone II flow rare (mL/min) | 5.523 | N/A | N/A | 5.52 | N/A |
| Calibration zone IV flow rate (mL/min) | 5.233 | 5.23 | 5.10 | 5.23 | 5.23 |
| Average raffinate flow rate (mL/min) | 8.29 | 8.78 | 8.60 | 8.16 | 8.16 |
| Average extract flow rate (mL/min) | 21.60 | 21.10 | N/A | 21.60 | N/A |
| Feed phe concentration (g/L) | 5.0 | 4.93 | 4.93 | 4.98 | 4.98 |
| Feed trp concentration (g/L) | 2.0 | 1.97 | 1.97 | 1.98 | 1.98 |
| Average extract concentration (g/L) | 0.73 | 0.71 | 0.73 | 0.72 | 0.72 |
| Average extract purity (%) | 99.6 | 95.6 | 99.9 | 99.1 | 99.5 |
| Average extract yield (%) | 99.7 | 98.0 | 99.6 | 98.7 | 99.7 |
| Average raffinate concentration (g/L) | 4.82 | 4.28 | 4.59 | 4.66 | 4.80 |
| Average raffinate purity (%) | 99.9 | 99.1 | 99.9 | 99.5 | 99.8 |
| Average raffinate yield (%) | 100.0 | 98.2 | 100.0 | 99.6 | 99.8 |

[1] Operating parameters for simulation based upon 1st Order Two Parameters Sensitivity Analysis of Run 1.
[2] Operating parameters for simulation based upon average experimental operating conditions of Run 2.
(SWD = Standing Wave Design, Exp. = Experimental Values, Sim. = Simulation Values, N/A = Not Applicable)

FIG. 38 presents the 27$^{th}$ mid-cycles column profile and effluent histories of Run 1. The symbols represent the experimental data and the smooth lines represent the simulation results. The simulations include the design values and the experimentally measured values. The profile experimental data are collected from the ends of columns. At column 4, the lower symbols for both phe and trp are the actual collected experimental data while the higher data points are calculated from mass balance with the experimental flow rates. The discontinuity is a result of the incoming feed stream at column 4. All the profiles graphs have been normalized such that feed enters at column 4 and desorbent at column 0/8, while the extract is collected at column 2 and the raffinate at column 6.

In FIG. 38, the phe experimental profile data does not fit the design simulation since the actual experimentally measured feed concentrations and flow rates are quite different (Table 6). The simulation based on the averaged experimentally measured values does not fit the experimental points either. Both the trp simulations for the design and experimental values match well with the experimental data. This is as expected, since trp has a much higher affinity with respect to the PVP resin and is thus relatively insensitive to variations in the operating conditions.

All effluent history data are per cycle average concentration. The fluctuations in the products histories in FIG. 38 are the result of pump fluctuations. As expected from the profile simulations, the extract simulation does not vary much from the design and experimental values. The lower steady state value for the experimental raffinate history is a result of the increased dilution from the higher experimental raffinate flow rate.

Figure 39:
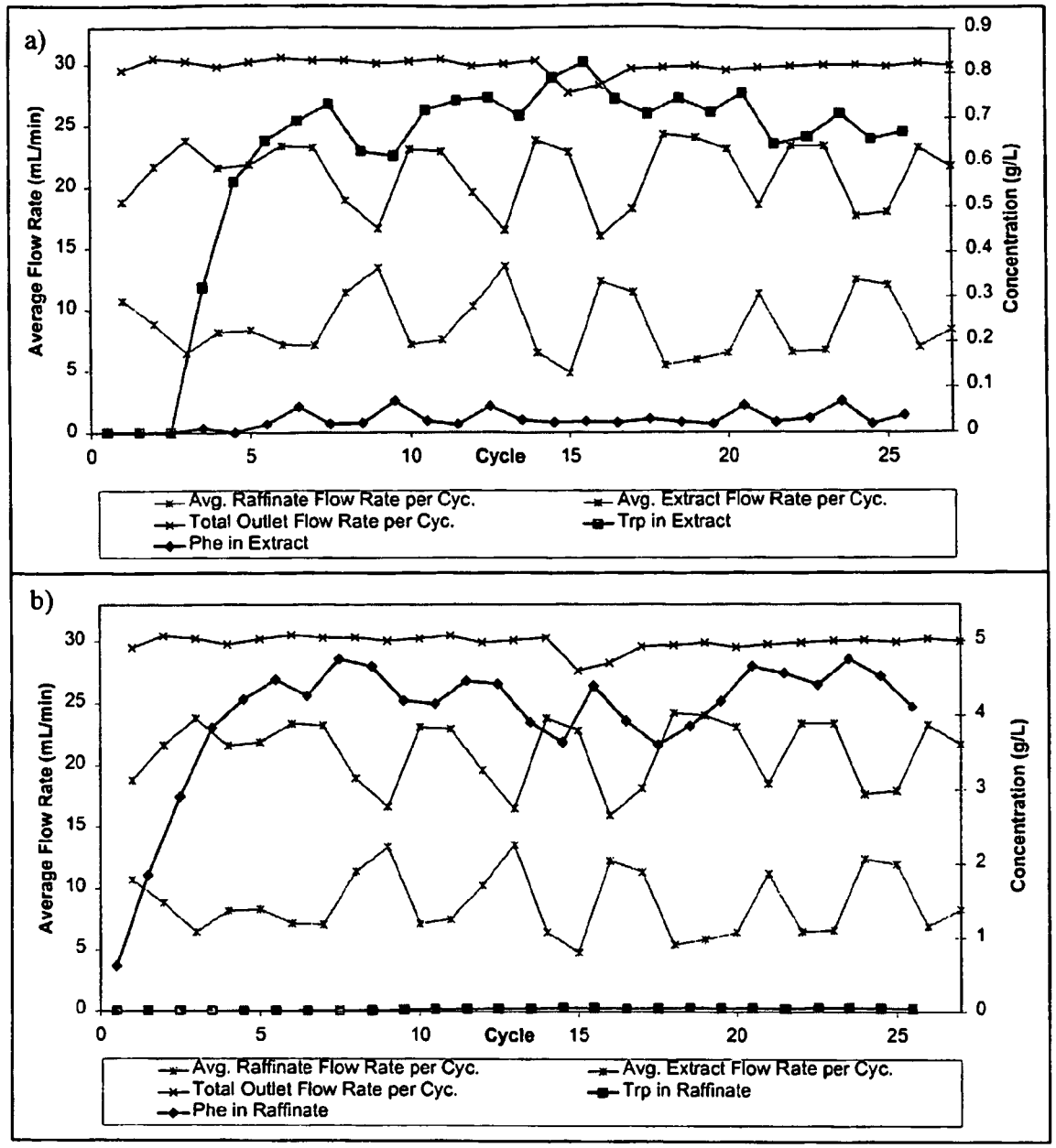
FIG. 39 presents an average raffinate, extract and total outlets flowrates per cycle, and experimental data. a) Extract and b) Raffinate history for phe-trp SMB Run 1. (Avg.=Average, Cyc.=Cycle, Phe=Phenylalanine, Trp=Tryptophan).

The collected experimental data indicates that the feed and desorbent flow rates were relatively stable (±<1%). This is observed in FIG. 39 which plots the average total outlet flow (Raffinate plus Extract). However, when the average extract and raffinate flow rates per cycle is plotted, the almost mirror image fluctuations indicate that the fluctuations are a result of an unstable extract pump. The right y-axis of FIG. 39 shows the experimental effluent histories whose discrepancies roughly follow the pump's fluctuations.

Figure 40:
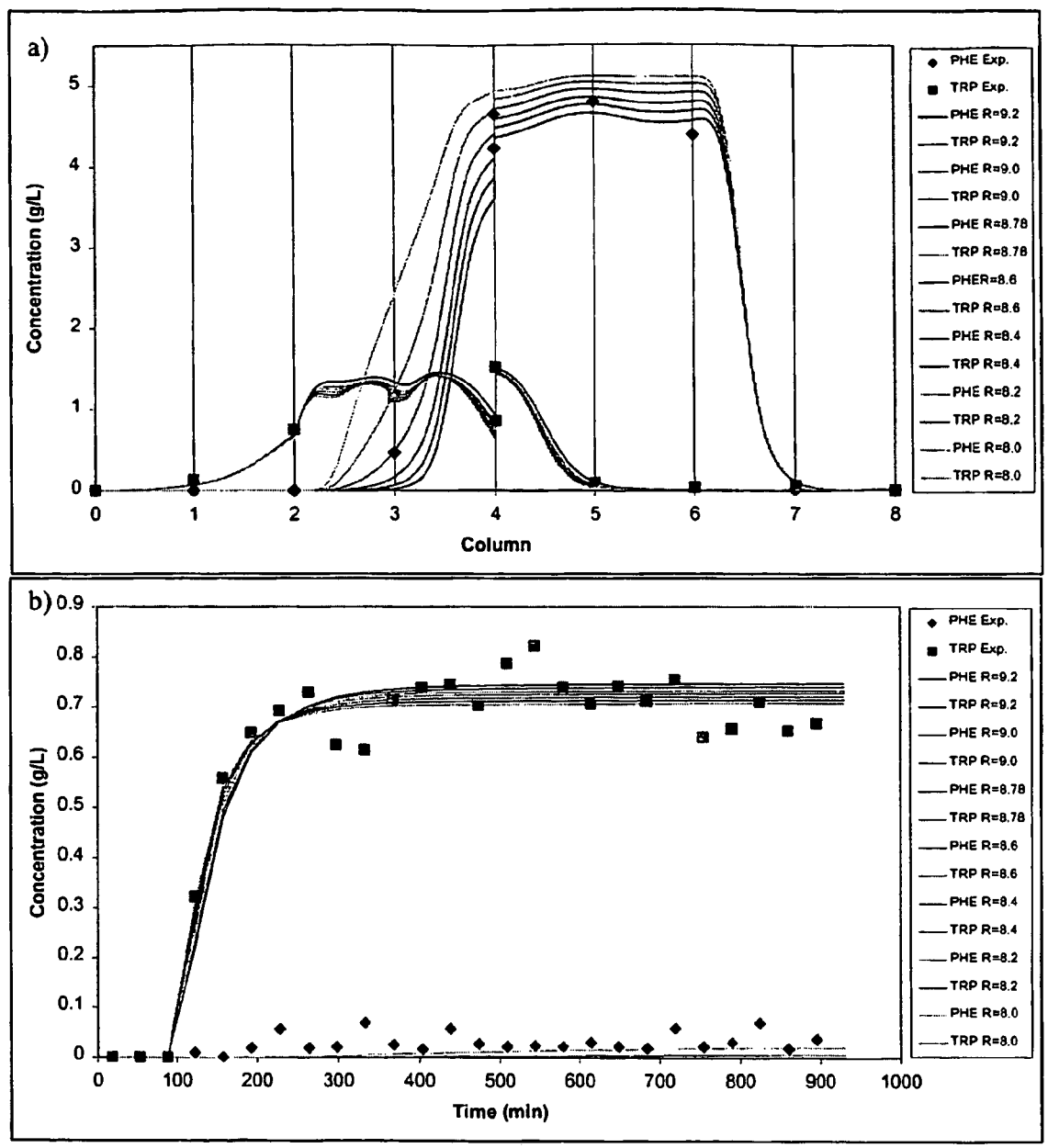
FIG. 40 contains a) the $27^{th}$ mid-cycle column profile, b) the Extract history and c) the Raffinate history of experimental results (Symbols) and VERSE simulations (Smooth lines) from raffinate sensisitivity analysis of phe-trp SMB Run 1. R=7.8 is the average experimental raffinate flowrate. (Phe=Phenylalanine, Trp=Tryptophan, R=Raffinate Flow rate in mL/min).

A sensitivity analysis on the extract pump is used to explore the experimental deviation. A simple mass balance of the whole SMB system, holding the inlet pumps flow rates constant, would show that an increase in the raffinate is balanced by a decrease in the extract. Thus, a raffinate sensitivity analysis (FIG. 40) is similar to that of the extract.

FIG. 40a shows that the phe desorption wave becomes sharper as the raffinate flow rate increases, while the feed, desorbent and zone IV recycle pumps were held constant. Increasing the raffinate flow rate increases the raffinate flow increases zone II and III flow rates, which leaves a smaller amount of phe in the columns and consequently a lower phe plateau is observed in FIG. 40a. The trp profile has a slightly broader adsorption wave and a higher plateau concentration with an increase in the raffinate. Since zone I and IV flow rates did not change, the trp adsorption and phe adsorption waves remain relatively unscathed. The increased raffinate flow rate decreases the extract trp concentration and the extract impurities, as seen in FIG. 40b. The higher raffinate flow rate results in a further diluted raffinate, thus the lower steady state value on the raffinate histories in FIG. 40c.

Figure 41:
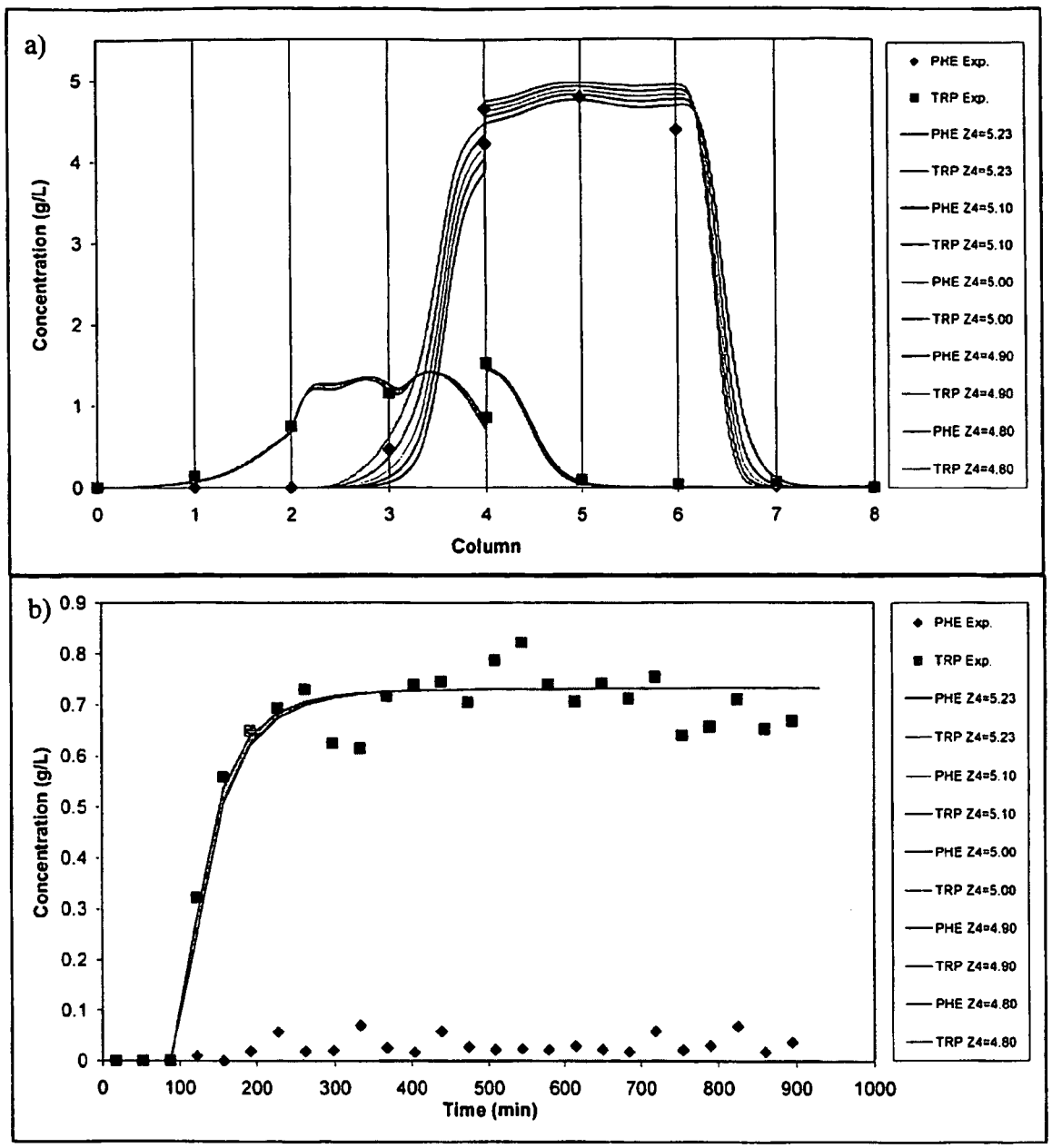
FIG. 41 contains a) the $27^{th}$ mid-cycle column profile, b) the Extract history and c) the Raffinate history of experimental results (Symbols) and VERSE simulations (Smooth lines) from zone IV sensisitivity analysis of phe-trp SMB Run 1. Z4=5.23 is the average experimental raffinate flow rate. (Phe=Phenylalanine, Trp=Tryptophan, Z4=Zone IV Flow rate in mL/min).

Since no flowmeter was attached to the recycle pump, its actual experimental flow rate is unavailable. The HPLC recycle pump does not fluctuate during calibration, but its flow rate can drop if a bubble is caught within its pump head. A zone IV sensitivity analysis for flow rates lower than that of the calibrated flow rate of 5.23 mL/min is shown in FIG. 41. As seen in FIG. 41a, a lower zone IV flow rate broadens the desorption wave and sharpens the adsorption wave of the phe profile. The phe plateau concentration increases with a decrease in zone IV flow rate. The trp profile undergoes a slight sharpening of the adsorption wave and a lower plateau with a decrease in the zone IV flow rate. Both effluent histories in FIGS. 41b and 41c do not undergo any significant change in the steady state concentration with the studied changes in the zone IV flow rate. The transient trp front slows down while the phe front is slightly faster when zone IV flow rate decreases.

Figure 42:
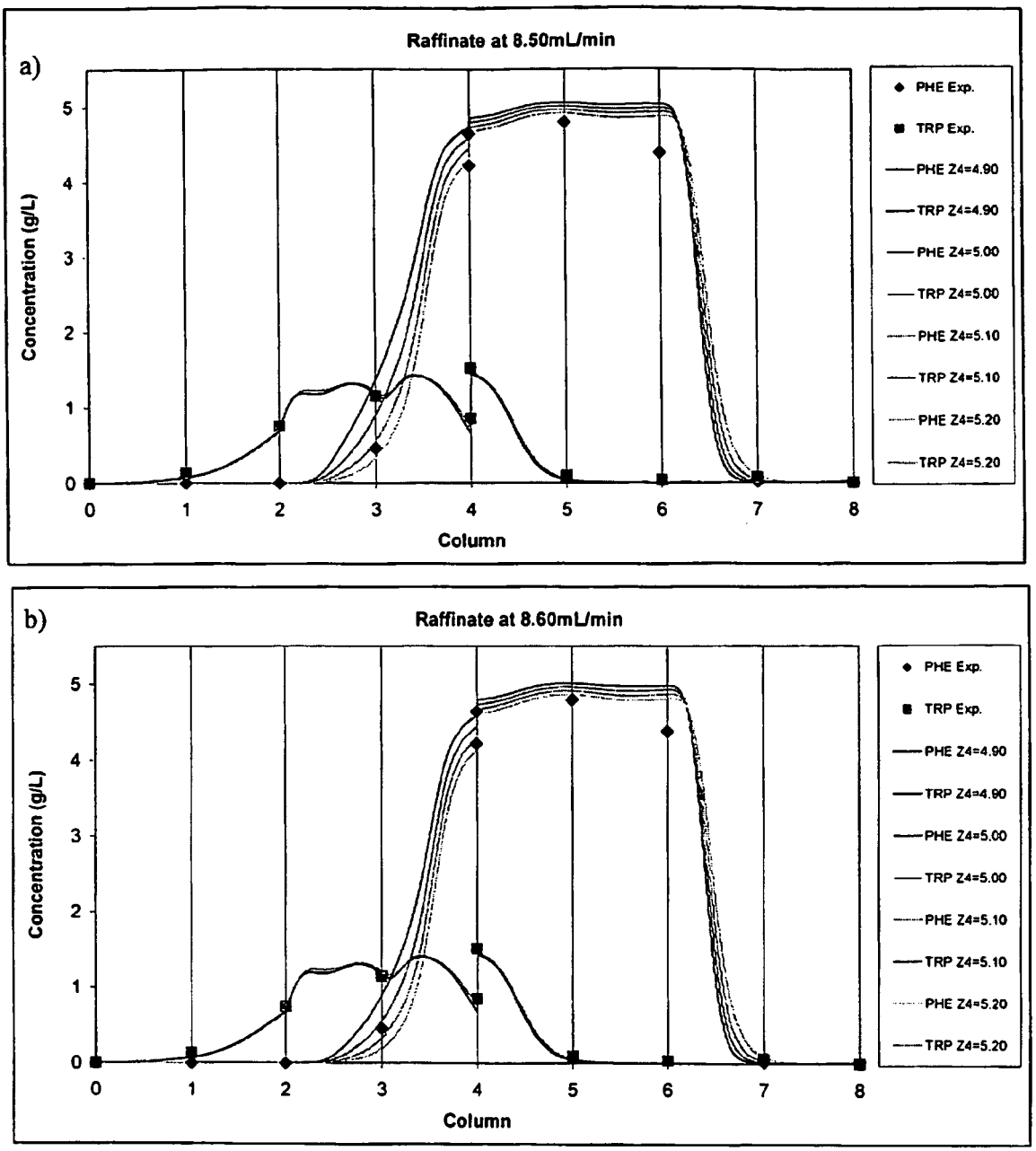
FIG. 42 contains a $27^{th}$ mid-cycle column profile of experimental results (Symbols) and VERSE simulations (Smooth lines) from two parameters sensitivity analysis of phe-trp SMB Run 1. a)R=8.5 mL/min b)R=8.6 mL/min c)R=8.7 mL/min d)R=8.8 mL/min (R=Raffinate, Z4=Zone IV flow rates in mL/min).

Based on the raffinate and zone IV sensitivity analysis, a first-order two parameters sensitivity analysis to identify a better profile fit was carried out with raffinate flow rates at 8.5, 8.6, 8.7 and 8.8 mL/min, and zone IV flow rates at 4.9, 5.0, 5.1 and 5.2 mL/min. The resulting profiles in FIG. 42 shows that the probable fits include simulations #60, #63, #66 and #69. Table 7 lists the relevant flowrates.

TABLE 7

Simulations that fit well with Run 1 phe-trp experimental profile.

| Simulation | Zone IV Flow Rate (mL/min) | Raffinate Flow Rate (mL/min) |
|---|---|---|
| #69 | 5.2 | 8.5 |
| #66 | 5.1 | 8.6 |
| #63 | 5.0 | 8.7 |
| #60 | 4.9 | 8.8 |

Figure 43:
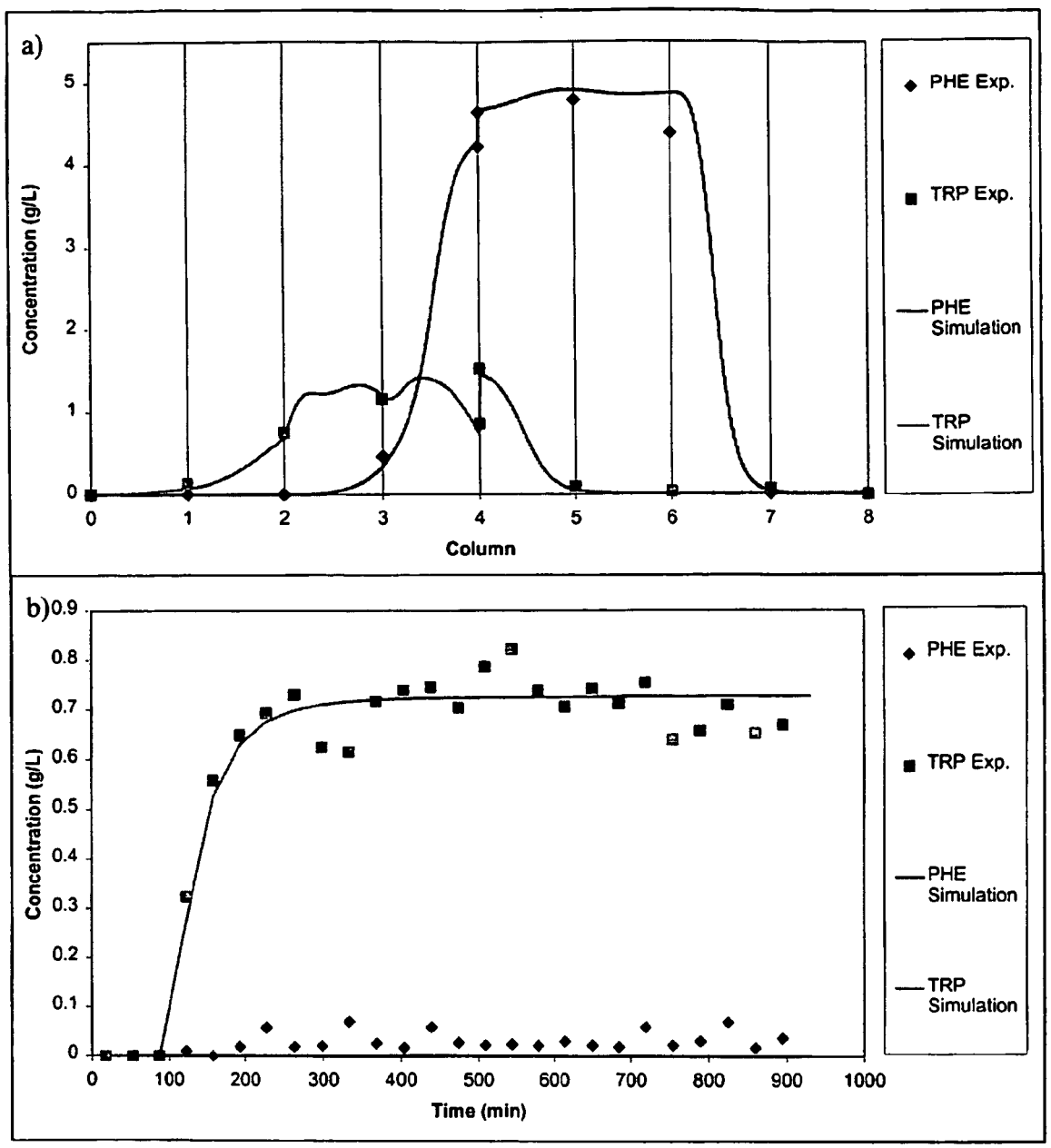
FIG. 43 contains a) the $27^{th}$ mid-cycle column profile, b) the Extract history and c) the Raffinate history of experimental results (Symbols) and VERSE simulations (Smooth lines). VERSE simulations search analysis result for phe-trp SMB Run 1. Raffinate=8.6 mL/min, Zone IV=5.1 mL/min, Feed=8.00 mL/min, Desorbent=22.19 mL/min, Feed phe concentration=4.93 g/L, Feed trp concentration=1.97 g/L, other parameters identical to Table 5. (Exp=Experimental, Sim=Simulation).

The simulations have somewhat identical profiles. This is expected since the zone flow rates in zone II and III are identical in the 4 simulations above. Simulation #63, shown in FIG. 43, is used to represent the profile and effluent histories of the first order two parameters sensitivity analysis for Run 1.

Figure 44:
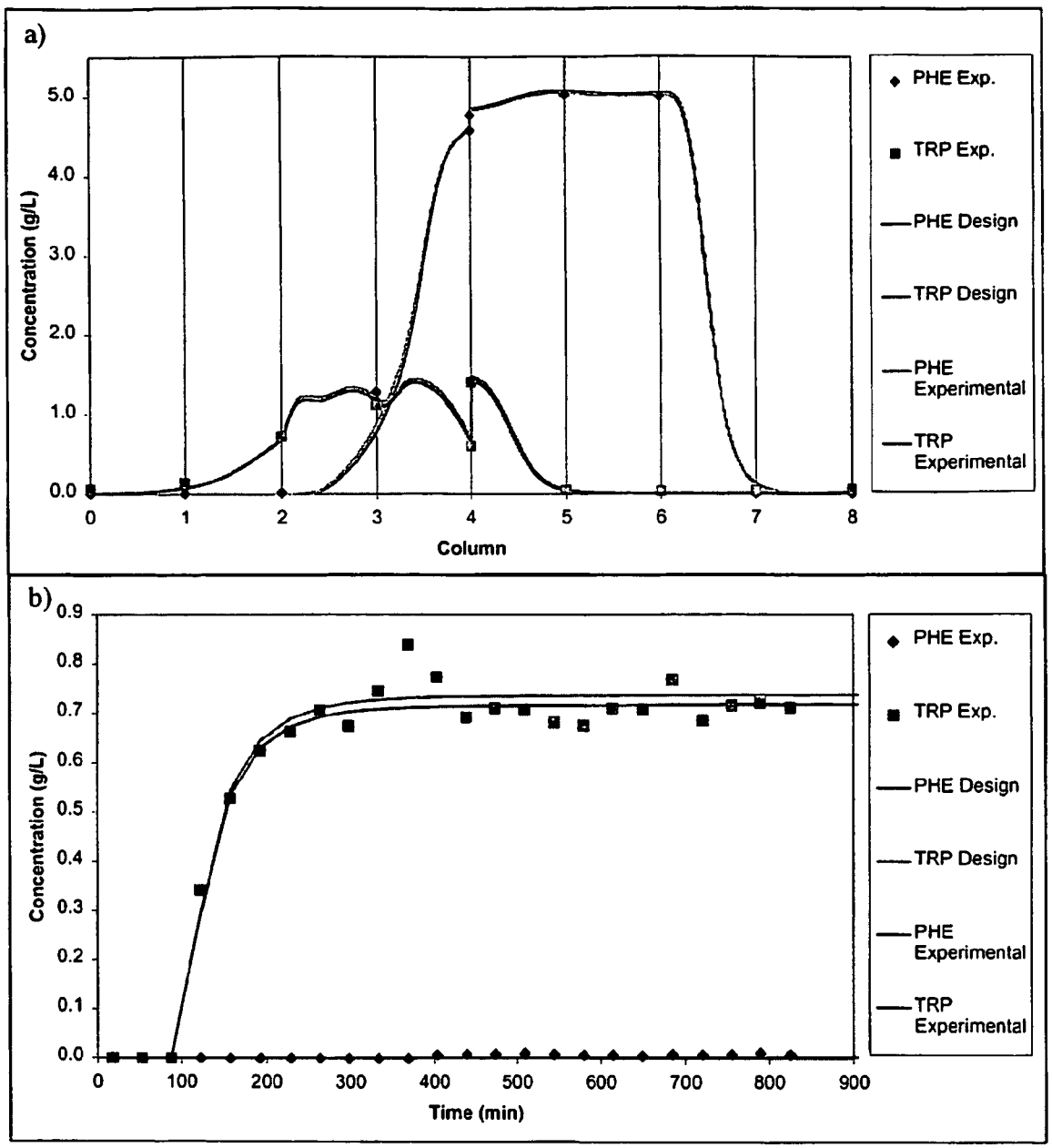
FIG. 44 contains a) the $24^{th}$ mid-cycle column profile, b) the Extract history and c) the Raffinate history of experimental results (Symbols) and VERSE simulations (Smooth lines) for phe-trp SMB Run 2. VERSE simulations include the SWD design operating parameters and the average experimentally measured operating parameters (Table 6). (Exp.=Experimental data, Phe=Phenylalnine, Trp=Tryptophan).

FIG. 44 presents the $24^{th}$ mid-cycle column profile and effluent histories of Run 2. The experimental and design simulation shows very good agreement with each other and with the experimental data. As noted earlier, the tabulated purity and yield of Run 2 in Table 6 shows good agreement with the design values and compares very well against the earlier experiments listed in Table 2.

Figure 45:
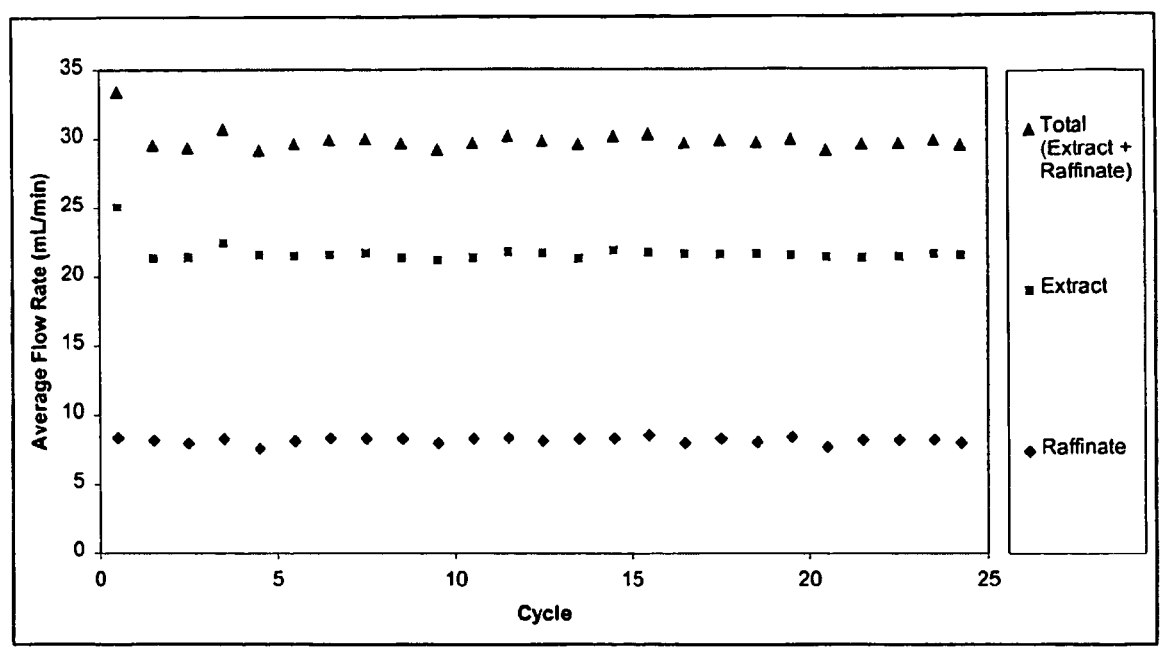
FIG. 45 shows average raffinate, extract and total outlets flowrates per cycle for phe-trp SMB Run 2.

The feed pump fluctuates about 10% during Run 2. Manual adjustment of the pump rate was made throughout to compensate. The averaged experimental feed flow rate of 7.88 mL/min was calculated from mass balance. FIG. 45 presents the raffinate and extract flow rates, and the total effluent flow rate, which were relatively stable in comparison to Run 1 (FIG. 39).

The phe-trp experimental results shows that the ST valve system worked as expected. Stable flowrates are essential for separation to occur.

Example 2

Online Decoupled Regeneration

Figure 46:
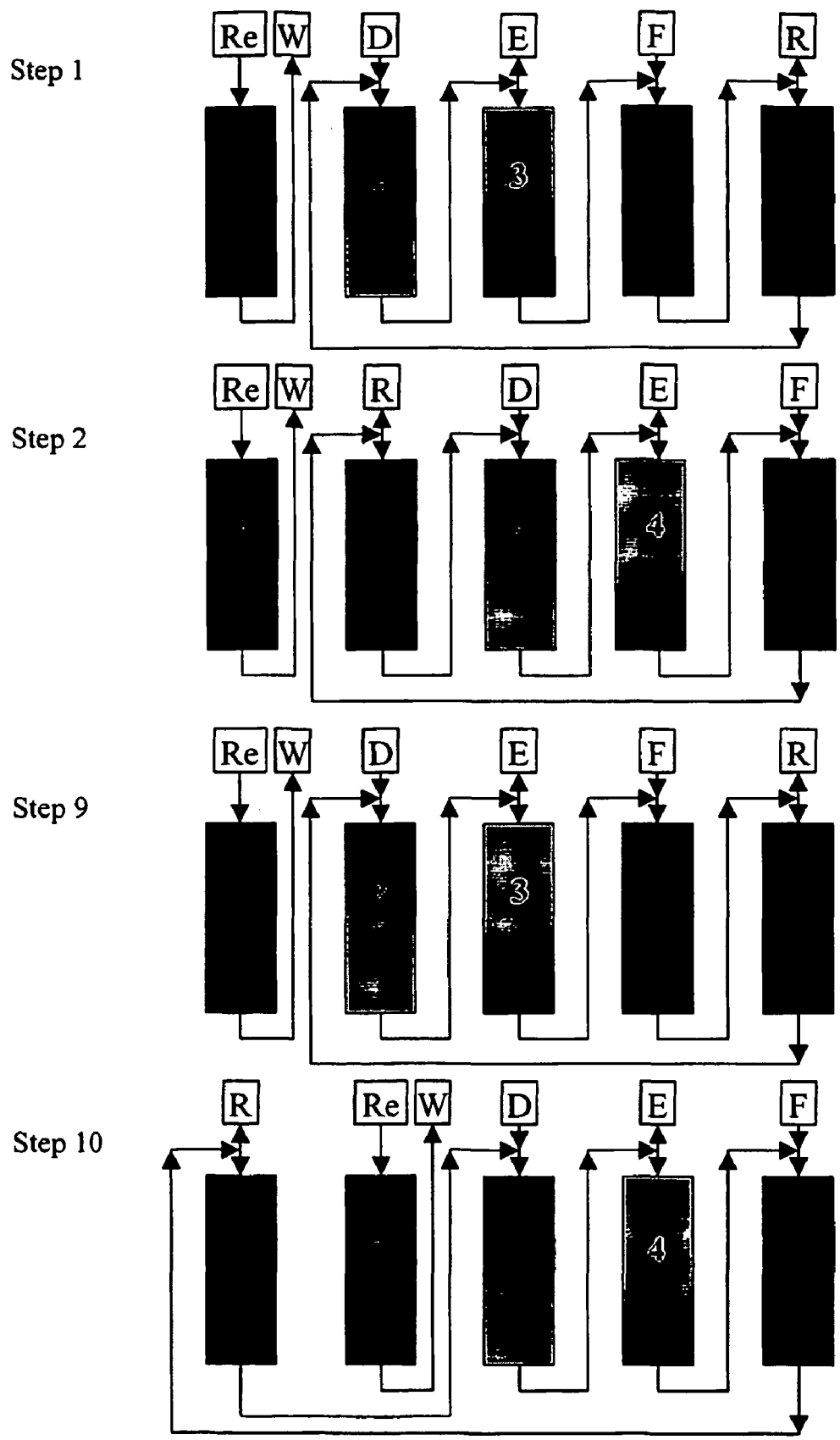
FIG. 46 depicts a basic online decoupled regeneration scheme in which the regeneration step time is nine times that of the regular switching time. Re=Regenerant, W=Waste, D=Desorbent, E=Extract, F=Feed, R=Raffinate.

FIG. 46 illustrates a four column, four separation zone SMB with an additional column in an online decoupled regeneration zone. In this example, the regeneration step lasts for 9 regular step times. Between step 1 and 9, column 2 to 4 undergo conventional SMB switching. At the $10^{th}$ switch, column 1 is switched from the regeneration zone into zone I, and column 2 from zone I into the regeneration zone. A column can be placed into the regeneration zone at regular or varying intervals, or triggered by the detection of fouling in the separation columns, or by other means. A corresponding number of columns need not be replaced when a regeneration switch occurs from the separation zone into the decoupled regeneration zones.

A mixture of sulfuric acid, xylose and sodium chloride was chosen as a model system to validate the online decoupled regeneration method. Xylose is the middle affinity product, sodium chloride the low affinity impurity and sulfuric acid the high affinity impurity with PVP, poly-4-vinlyprydine, resin. Water is used as the desorbent.

A six-zone system, with one column in each zone is used. Zone I and II, corresponding to column 1 and 2 in FIG. 47 Step 1, are the decoupled regeneration zones. Zone II washes out the sulfuric acid, the high affinity impurity, with sodium hydroxide as the regenerant. Zone I washes out the regenerant and reequilibrates the column back to the mobile phase. The remaining four zones, zones III to VI are the conventional four separation zones.

The One ST Rotary Valve per column plus One ST Rotary Valve for Regeneration Zone design is used in the experimental setup. This design, the 1ST1C+1STRE, provides flexibility without requiring a large number of additional valves.

Experimental Setup and Design

The Standing Wave Analysis (SWA) method, with a target yield of 90%, is used to design the operating conditions for the SMB experiment. The regeneration zone flow rates were calculated from single column washing with water, and regeneration with 0.3M sodium hydroxide, and from the decoupled regeneration zone switching time, which was chosen as five times that of the regular step time. Table 8 lists the design operating parameters.

Table 9 lists the additional mass transfer parameters used for VERSE simulations. The VERSE simulations provide a quick check on the validity of the SWA results.

Two separate HPLC assays were used to determine the concentration of the three components. A Waters 996 Photodiode Array Detector with a Rheodyne 7725i injector and a Water 515 HPLC pump via Millenium 32 software was used for the assay of xylose. The assay was carried out at 0.7 mL/min of 0.01N sulfuric acid on a Biorad Aminex HPX-87H column (7.8×300 mm) with a guard column (4.6×30 mm). The column was ran at 55.0° C. in an Eppendorf CH-30 Column Heater with a TC-50 controller. The sample injection volume was 20 µL.

The second HPLC assays sodium chloride and sulfuric acid. The assay system uses a Dionex LC-30 Chromatography Oven set at 30° C., a Dionex ED50 Electrochemical Detector with conductivity cell set at 100 mA and 2000 µS, and a Dionex GP50 Gradient Pump. Millenium 32 software was used to acquire and analyze the data. The assay was carried out in a Dionex IonPac AS15 column (3×150 mm) with a guard column (3×30 mm) at 0.6 mL/min of 20 mM sodium hydroxide. The sample injection volume was 25 µL.

The experimental SMB system used seven ST (ECMTLST16MWPHC) rotary valves based on the 1ST1C+1ST1Re design. Two additional valves were used for sampling. All the valves were controlled via a Labview vi.

Figure 47:
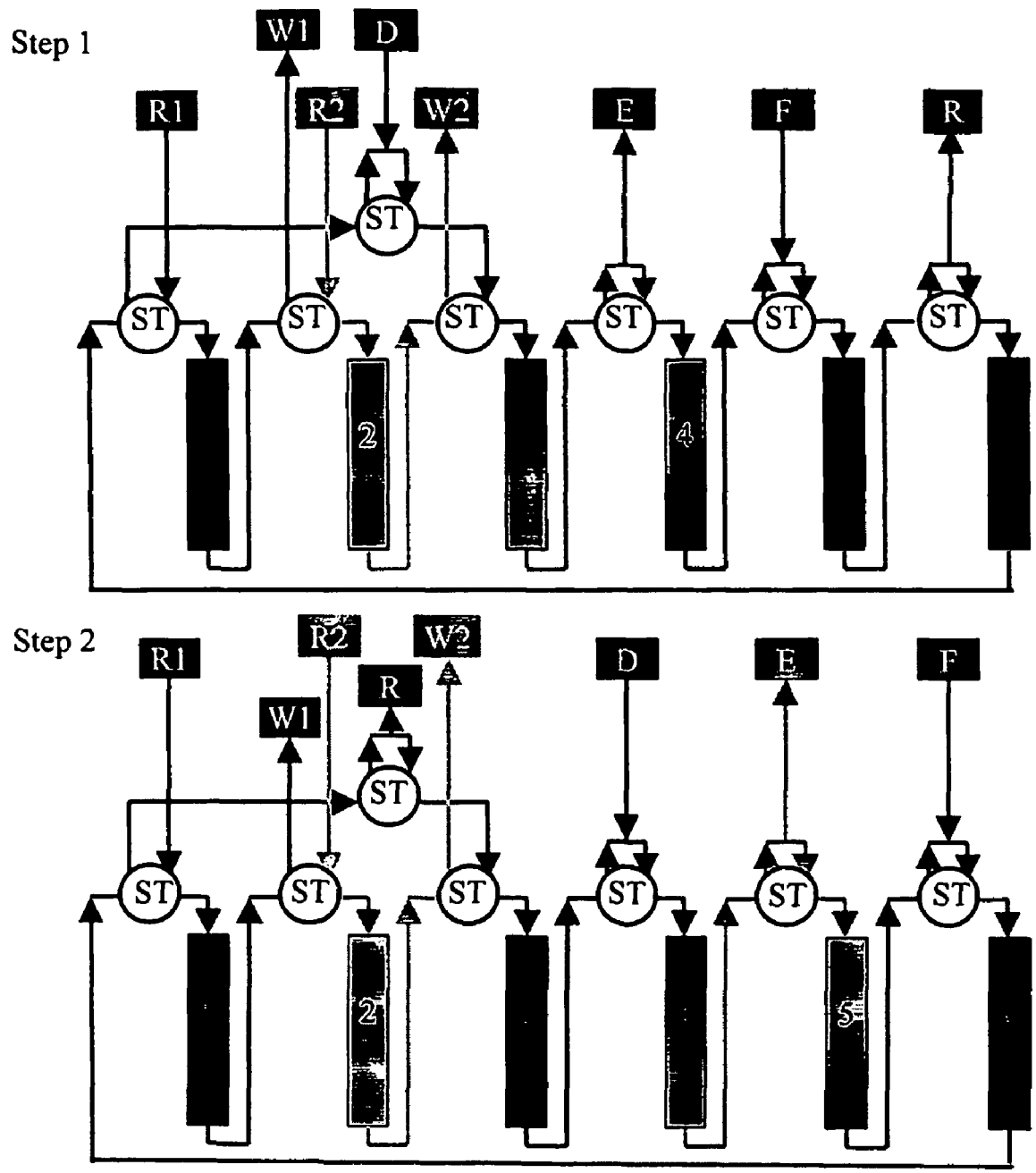
FIG. 47 depicts the switching sequence for the online decoupled regeneration SMB experiment of Example 2. The regeneration zone has a switching time five times of the regular separation switching time. The experiment employs the One ST Rotary Valve per Column plus One ST Rotary Valve for Regeneration Zone design. R1 =Water, W1=Waste from Zone I, R2=Sodium Hydroxide, W2=Waste from Zone II, D=Desorbent, E=Extract, F=Feed, R=Raffinate.
Figure 48:
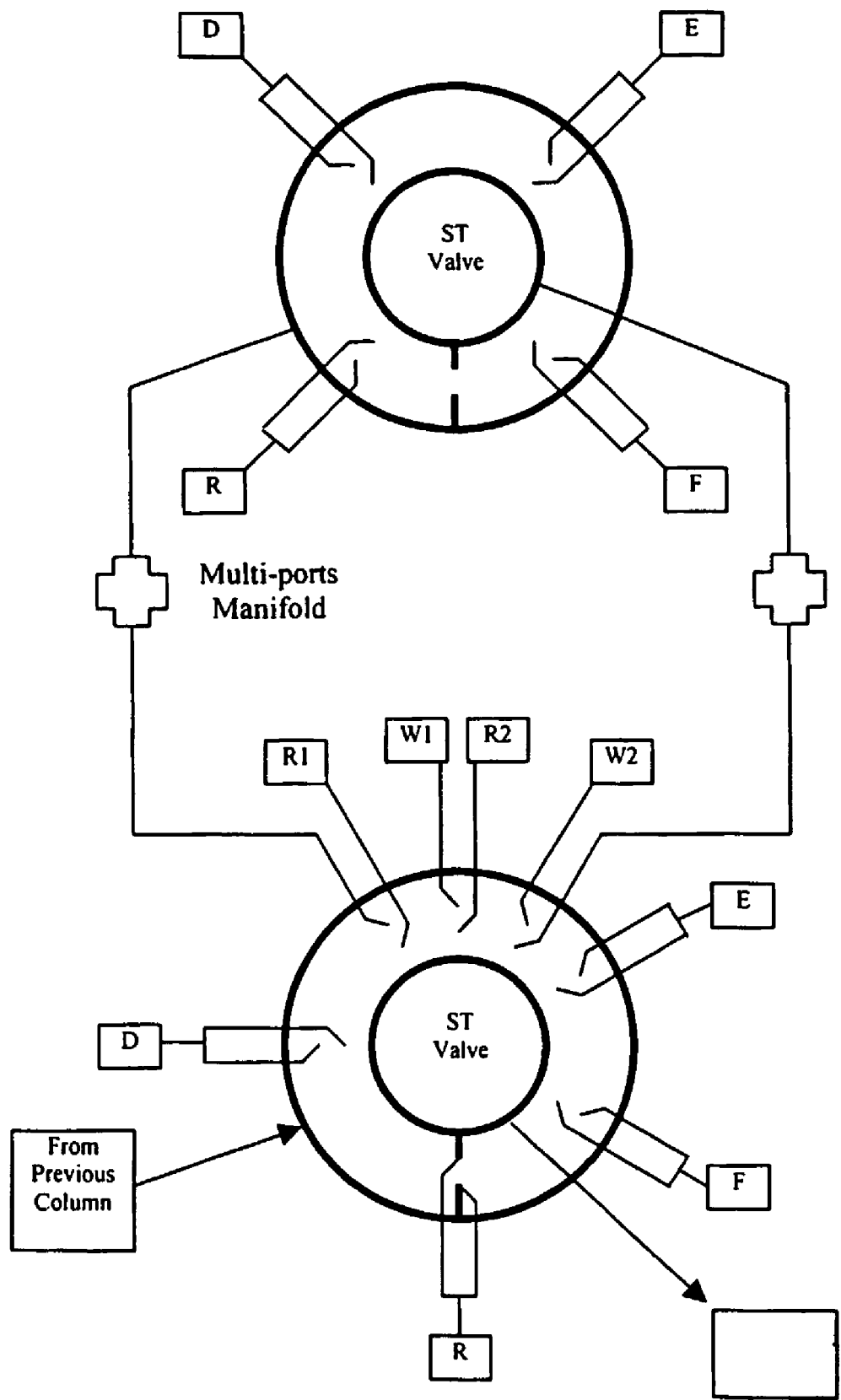
FIG. 48 depicts a schematic of the valving for the online decoupled regeneration SMB experimental setup of Example 2 using 1ST1C+1STRe design. R1 =Water, W1=Waste from Zone I, R2=Sodium Hydroxide, W2=Waste from Zone II, D=Desorbent, E=Extract, F=Feed, R=Raffinate.
Figure 49:
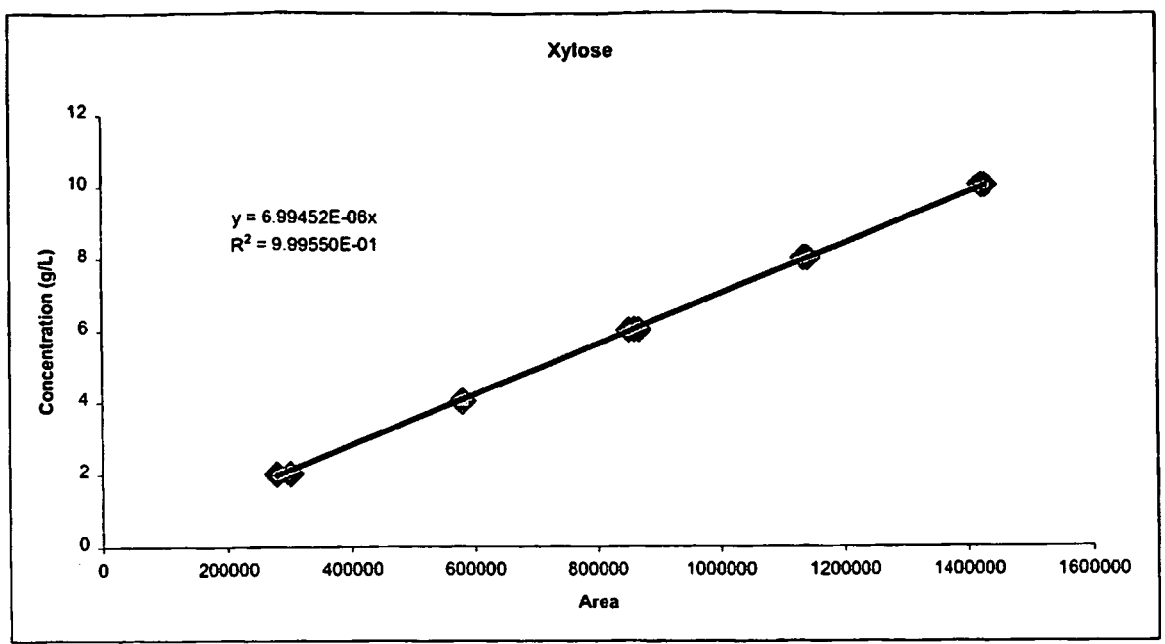
FIG. 49 depicts the calibration curve for xylose employed in Example 2 in which the assay conditions were as follows: Aminex HPX-87H (Biorad, Calif.), 0.7 mL/min, 0.01N Sulfuric Acid, 20 µL Sample, 55° C., 195 nm from Waters 996 PDA.
Figure 50:
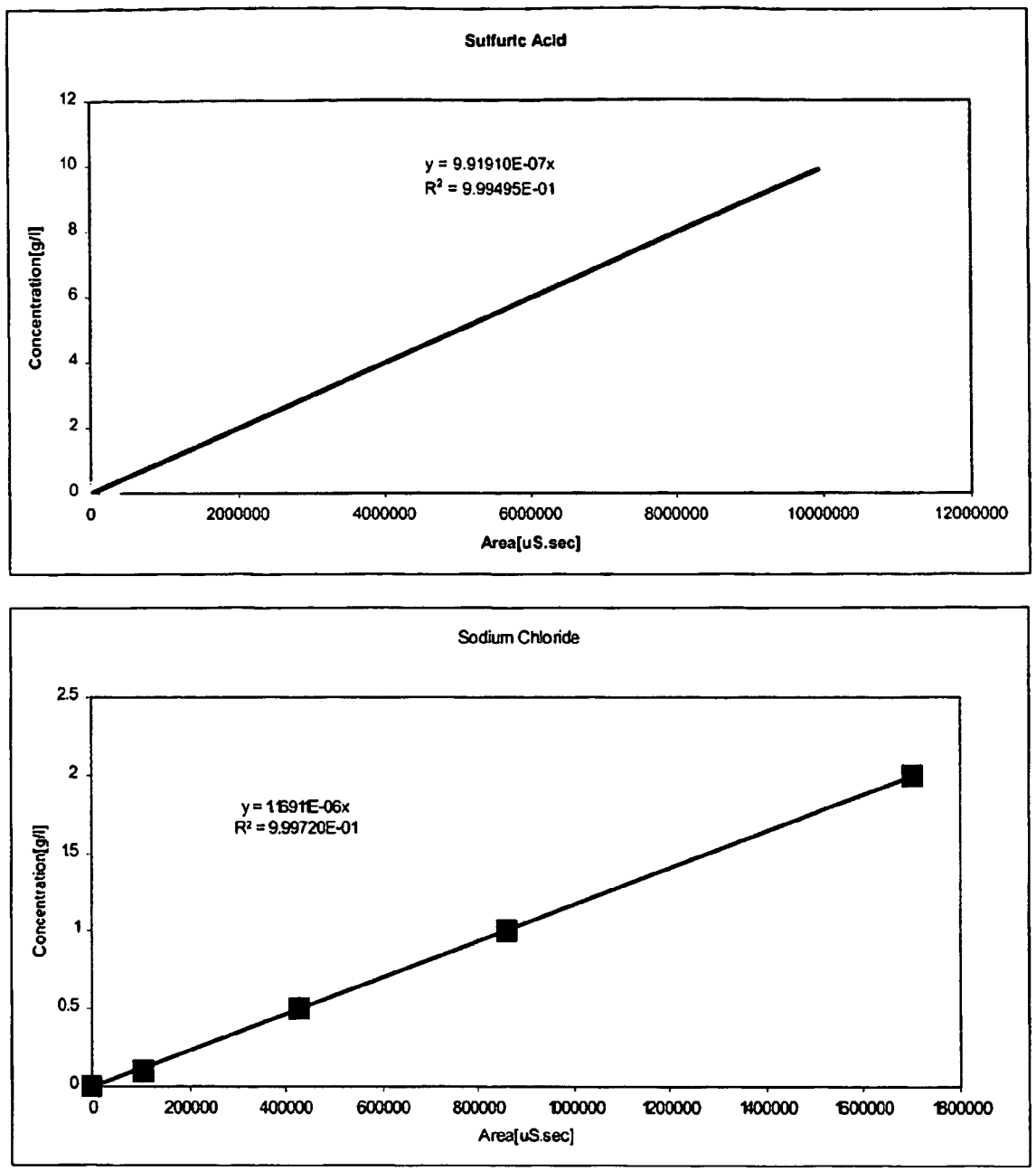
FIG. 50 depicts the calibration curves for sulfuric acid and sodium chloride employed in Example 2 in which the assay conditions were as follows: IonPac A515 (Dionex, Calif.), 0.6 mL/min 20 mM Sodium Hydroxide, 25 µL Sample, 30° C., Dionex ED50 Electrochemical Detector (100 mA, 2000 µS).

FIGS. 47 and 48 depict the valving and switching sequence in the SMB system. An ST rotary valve interrupts the flow between consecutive columns, and an additional ST rotary valve is used as a substitute separation valve to replace one of the three valves fixed in position during regeneration. As shown in FIG. 47, between step 1 and 5, column 1 and 2 are in the regenerated zones, and the ST valves before the first three columns are locked in position; the substitute ST valve is thus needed for the port movement on column 3.

Zone I uses an Iwaki Walchem EHE30E1-VE diaphragm as an inlet pump. Zone II uses a Model RHV pump, with Controller V200, from Fluid Metering Inc, as an inlet pump. The feed and desorbent inlet pumps were FPLC P-500 syringe pumps from Pharmacia. An Ismatec MCP pump with a FMI Q pump head was used as the extract outlet pump. The recycle pump, an Ismatec MCP-CPF IP65 with a FMI Q pump head, was placed in zone VI, immediately after raffinate withdrawal.

The columns were purchased from Ace Glass Inc. The columns were heated by a set of column heaters from Glas-Col, which were controlled via a Watlow Anafaze CLS216 PLC. The inputs lines were heated using long tubing or unpacked columns immersed in a Cole Parmer Polystat thermal bath. The valves and flow lines were insulated in a Styrofoam lined box.

The PVP resin, Reillex HP Polymer was obtained from Reilley Industries Inc. Sodium chloride were purchased from Acros; d-xylose from Aldrich Chemicals; sulfuric acid from Fluka.

Experimental Results and Discussion

Figure 51:
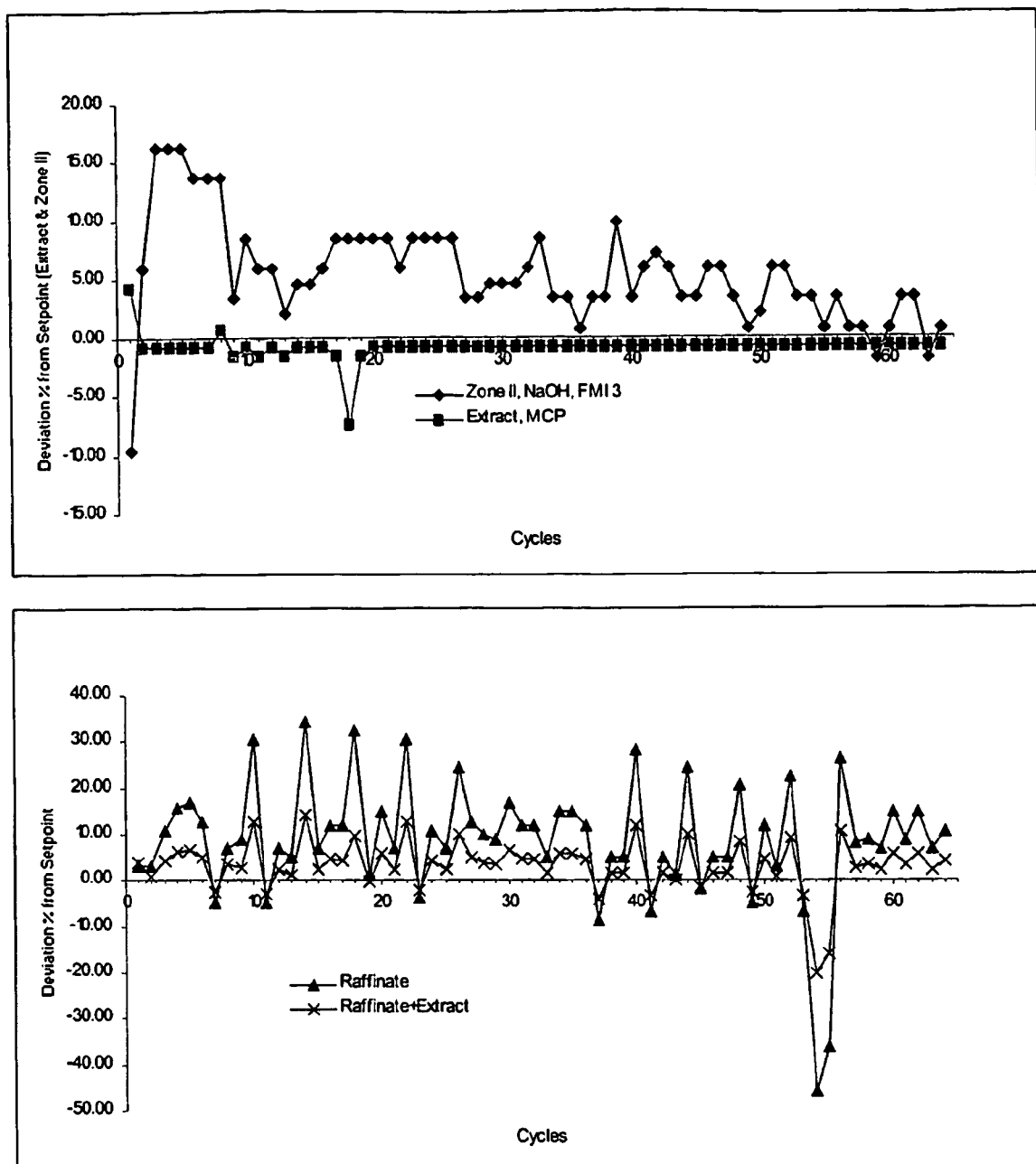
FIG. 51 depicts the flow rate deviations from the design setpoint in the online decoupled regeneration SMB experiment of Example 2.
Figure 52:
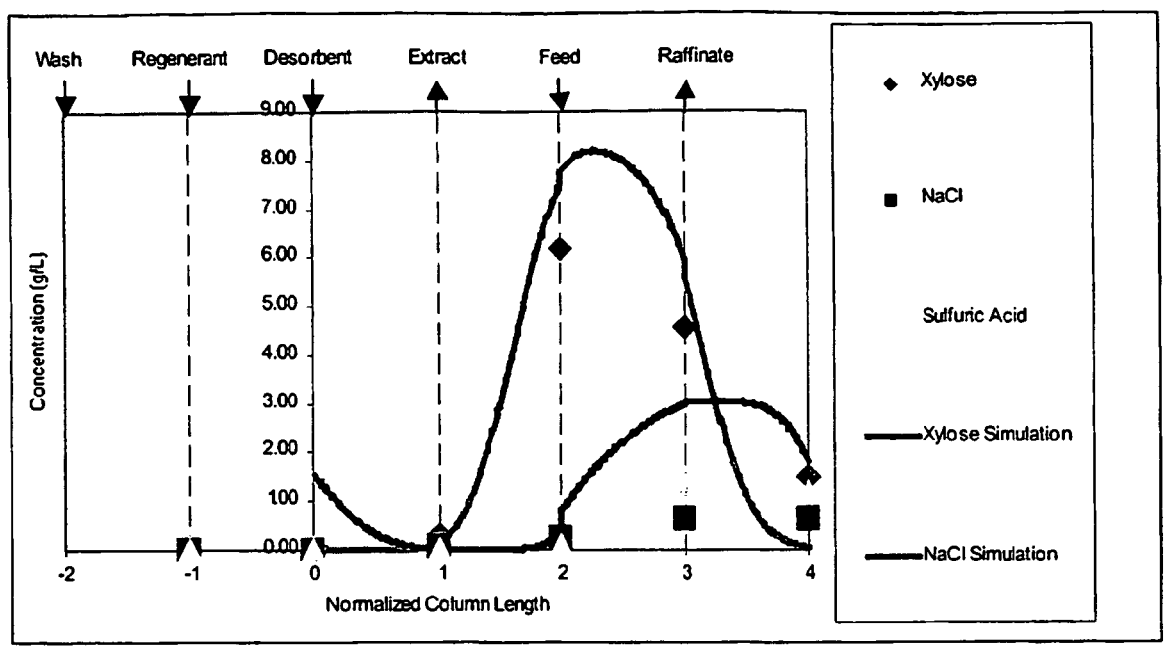
FIG. 52 depicts a column profile of the online decoupled regeneration SMB experiment of Example 2 at the end of the $65^{th}$ step. The x-axis has been normalized by the column length. The lines are simulation results from VERSE. VERSE simulations of the regeneration zones were not included.

The calibration curves for the three components are shown in FIGS. 51 and 52. The curves regress very well linearly.

Table 10 summarized the results of the online decoupled regeneration SMB experiment. The extract purity (xylose) was a respectable 94.6% but the yield was a low 60.5%. This is however, not totally unexpected. In a fragile system of only one column per zone and low selectivity, in this case a selectivity of 1.4 between xylose and sodium chloride, the SWA design is extremely sensitive to fluctuations in the zone flow rates.

FIG. 51 plots the experimental variation in the flow rates from the design set points. The fluctuations in the raffinate flow rate contribute to the experimental discrepancy with the design targets. The large deviations in cycle 54 and 55 are probably due to a stoppage in the feed pump.

Zone I flow rate was increased during the experiment to ensure that all of the regenerant was washed out. The earlier 4-bed volumes design was replaced with a more conservative 6-bed volumes design with a 28.8 mL/min corresponding zone flow rate.

Zone II flow rate was conservatively maintained at a higher flow rate than the design value to ensure that all the sulfuric acid was washed out.

Zone II has an 82.2% yield of sulfuric acid, the high affinity impurity. Ideally, the yield would be 100%, but the experimental feed concentration was unexpectedly twice as high as the designed feed concentration. Additionally, the one column per zone design allows little room for error.

Zone II washes out 70.4% of the sodium chloride, which was originally designed to collect in the raffinate. The unexpected high concentration of sodium chloride in zone II remains inexplicable. It is postulated that the sodium chloride wraps around into zone III; but, before the sodium chloride enters the next zone and contaminates the extract, the column in zone III is switched into the regeneration zone; and, thus the majority of sodium chloride was recovered in zone II instead.

FIG. 52 shows the experimental profile of the columns at the end of the 65$^{th}$ step. The xylose VERSE simulation fit reasonably well with the, experimental data. The simulations were adjusted by increasing the raffinate and desorbent by 10% of the designed raffinate flow rate, and increasing all the zones flow rates by 2% of the designed zone VI flow rate. The sodium chloride simulation does not fit well with the experimental data. Further simulations are needed to explore this discrepancy.

Figure 7:
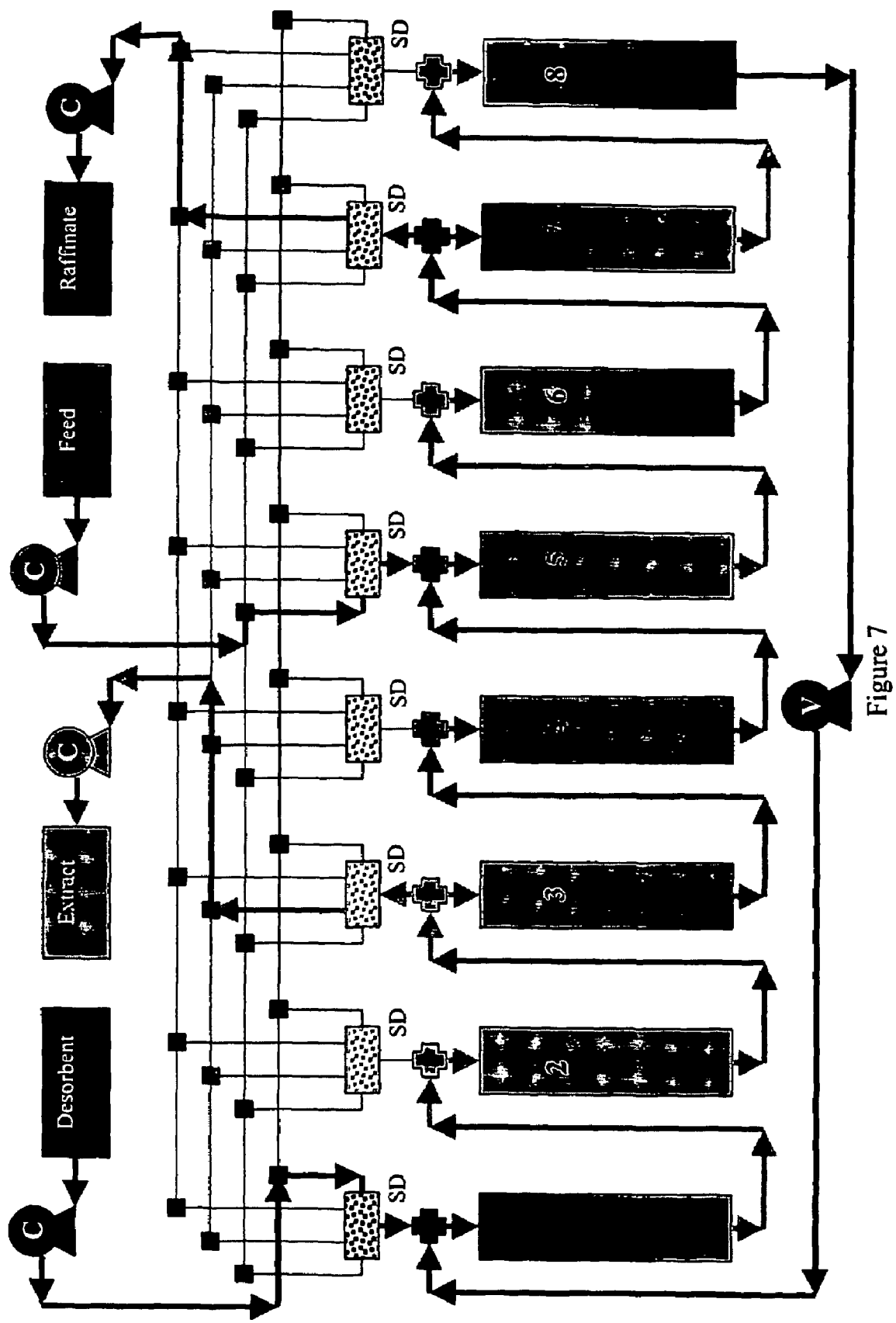
FIG. 7 is a One SD Rotary Valve per Column design for a conventional four zone, 2-2-2-2 column configuration binary SMB system. The SD valve selects the correct stream for its column. Contamination exists in the unused transit lines between the SD valve and its multiport manifold.
Figure 8:
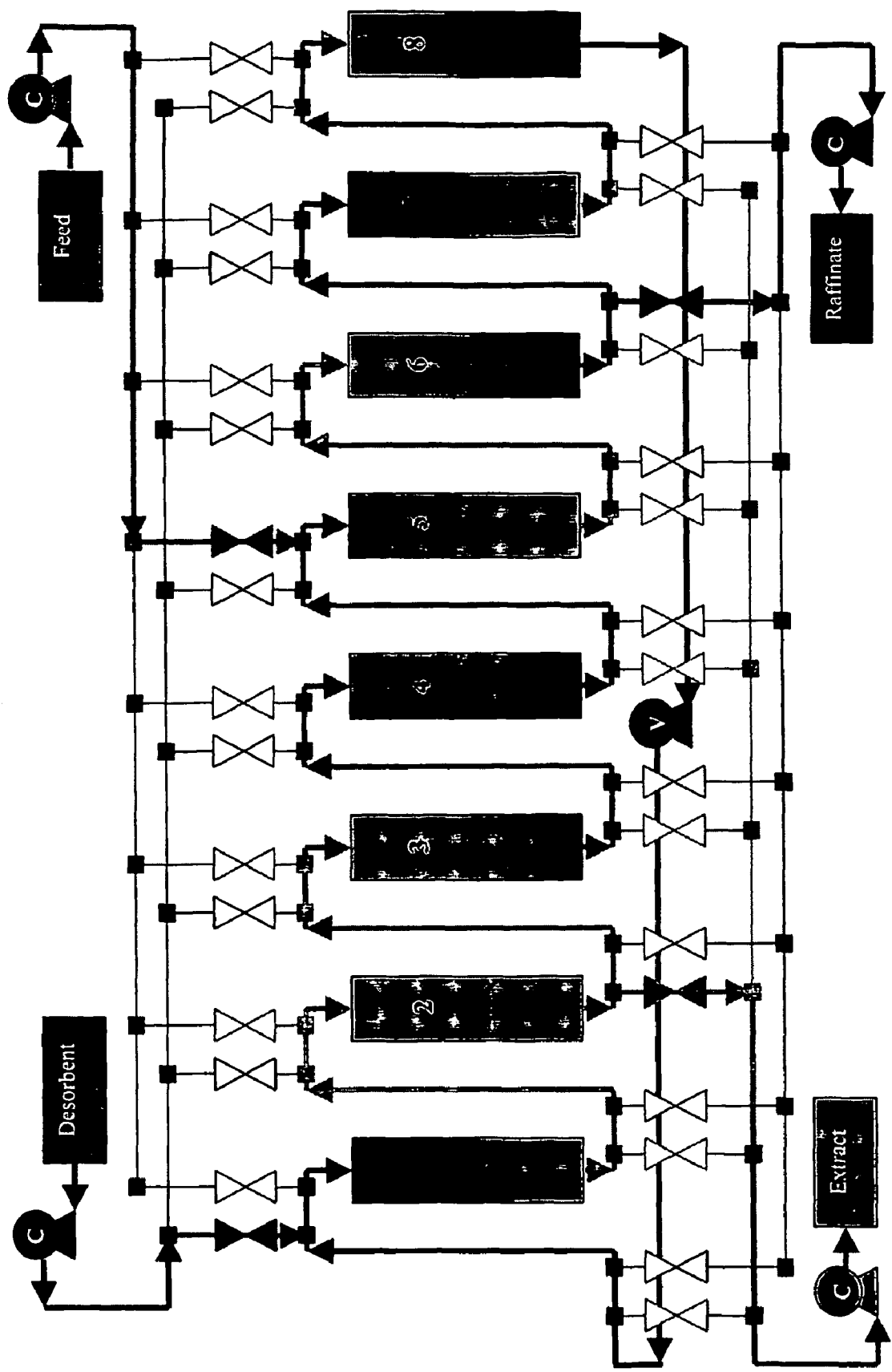
FIG. 8 represents a Four Two-Way Valves per Column design for a conventional four zone, 2-2-2-2 column configuration binary SMB system. One variable speed recycle pump is used with two inlet and two outlet constant speed pumps.
Figure 9:
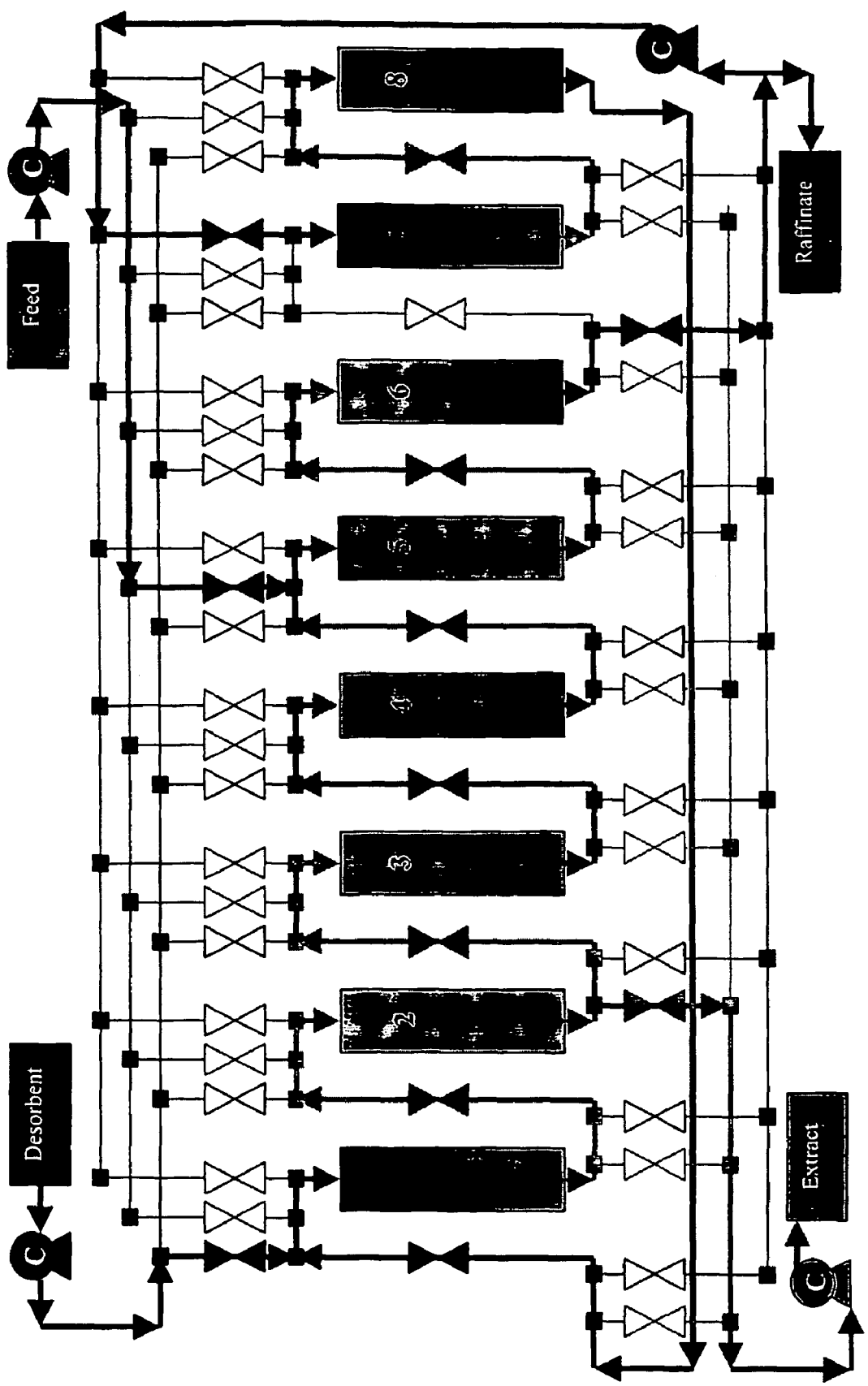
FIG. 9 depicts a Six Two-Way Valves per Column design for a conventional four zone, 2-2-2-2 columns configuration binary SMB system. Only constant speed pumps are used: one recycle pump, two inlet pumps, and one outlet pump.
Figure 10:
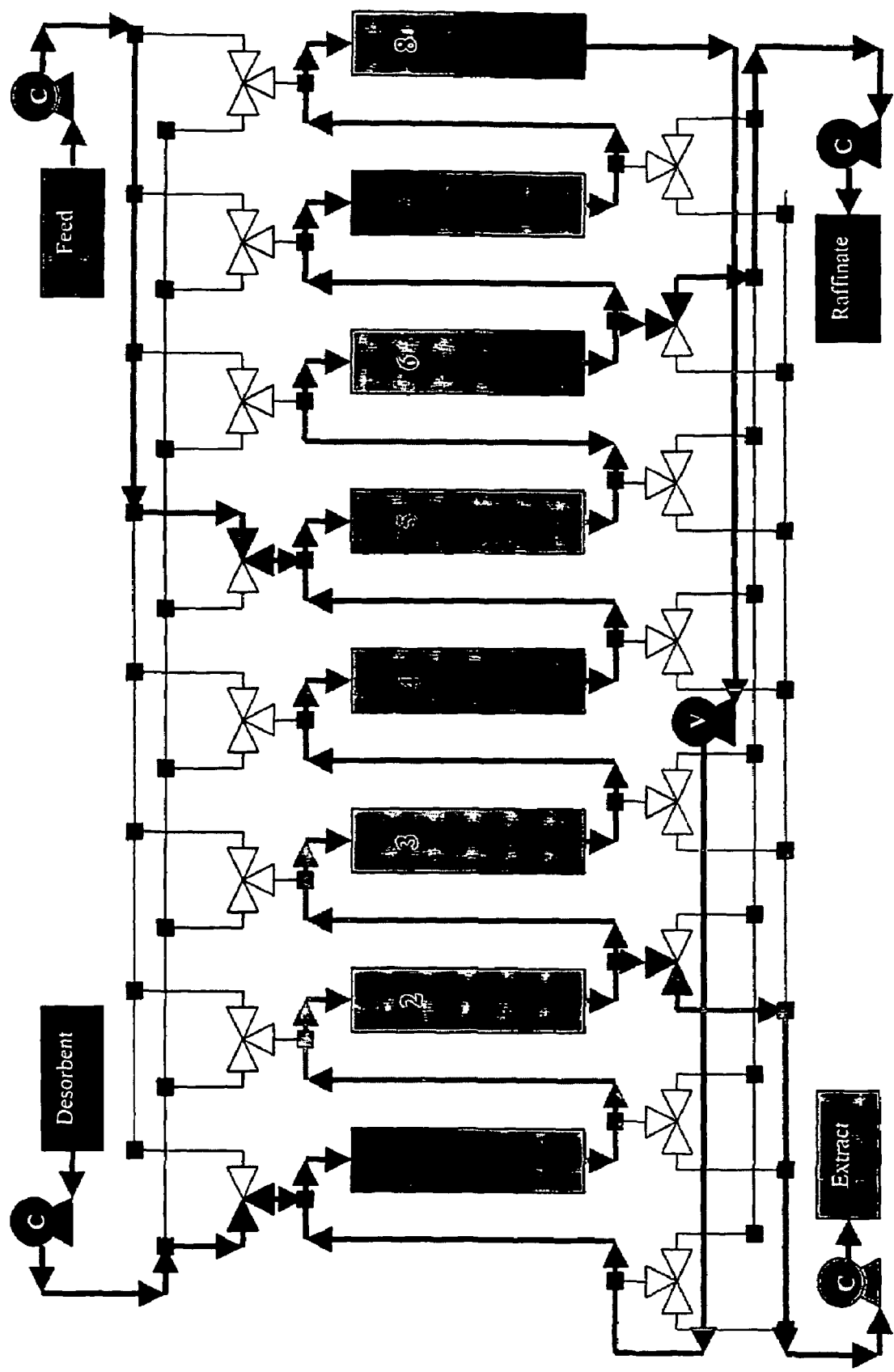
FIG. 10 portrays a Two Three-Way Valves per Column design for a conventional four zone, 2-2-2-2 column configuration binary SMB system. One variable speed recycle pump is used with two inlet and two outlet constant speed pumps.
Figure 11:
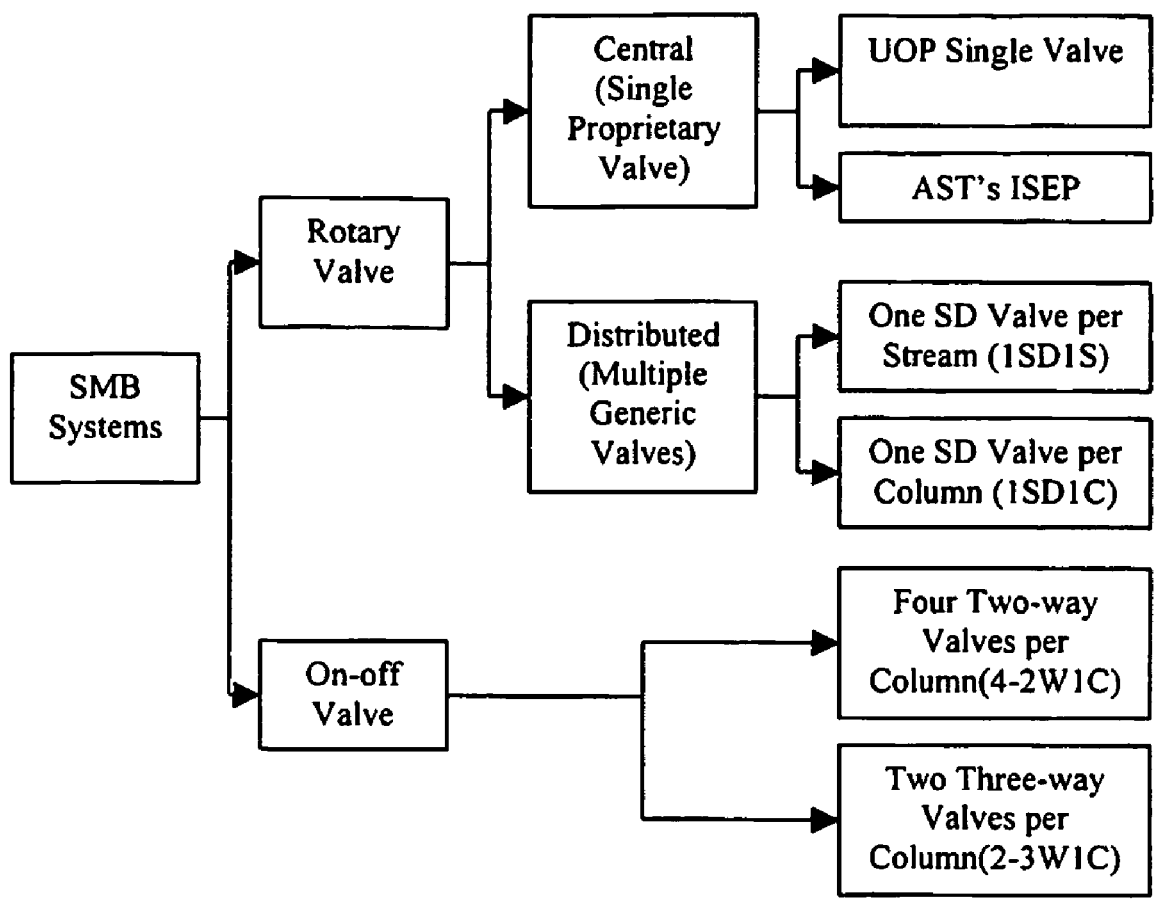
FIG. 11 represents existing SMB systems by valve types and arrangements.
Figure 53:
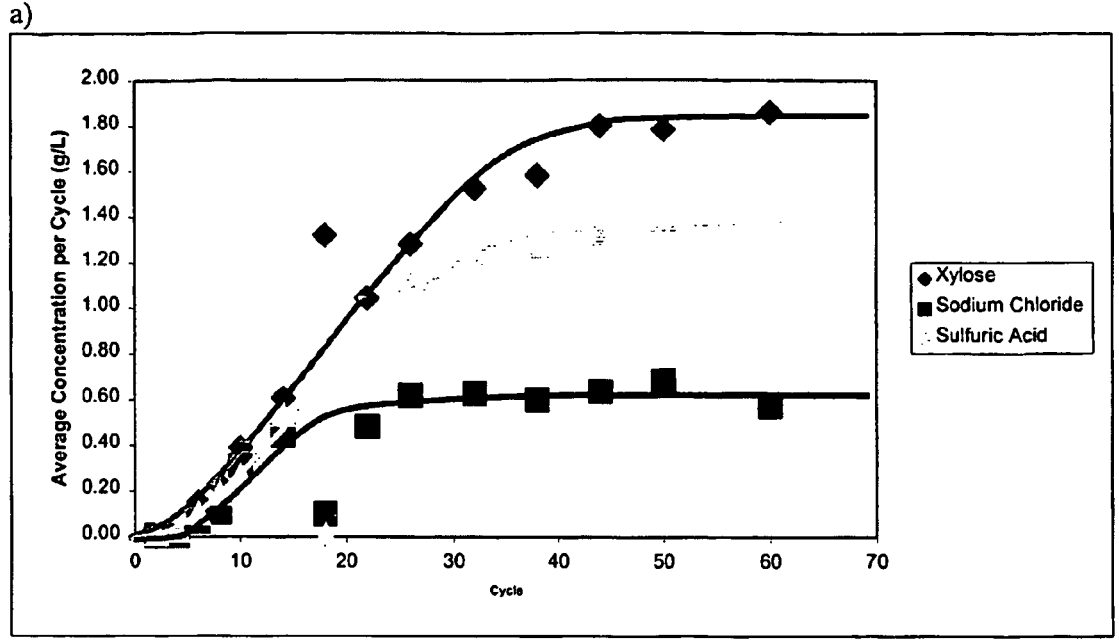
FIG. 53 depicts the raffinate (a) and extract (b) histories of the online decoupled regeneration experiment of Example 2. The lines were best-fitted to the experimental data (symbols).
Figure 53:
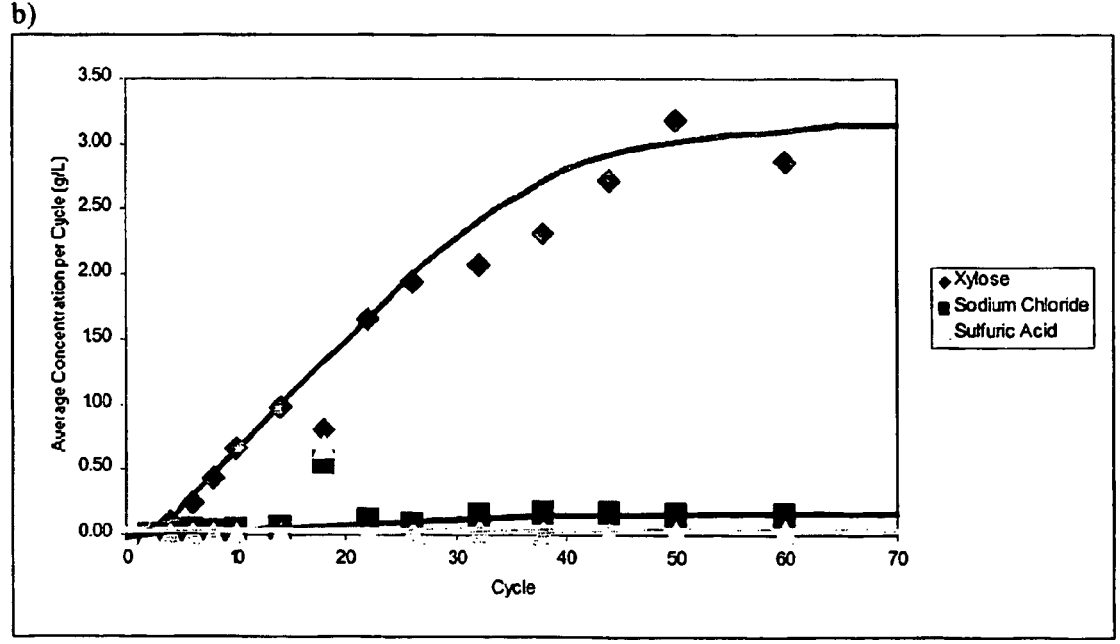

FIG. 53 shows the raffinate and extract histories. As expected from the previous column profile, the extract was relatively pure, but with a lower yield. The raffinate collects the majority of the remaining xylose and only a small part of sodium chloride. The experimental data were relatively smooth except for those at cycle 18, which correspond to a large fluctuation in the extract flow rate in FIG. 7.

Figure 54:
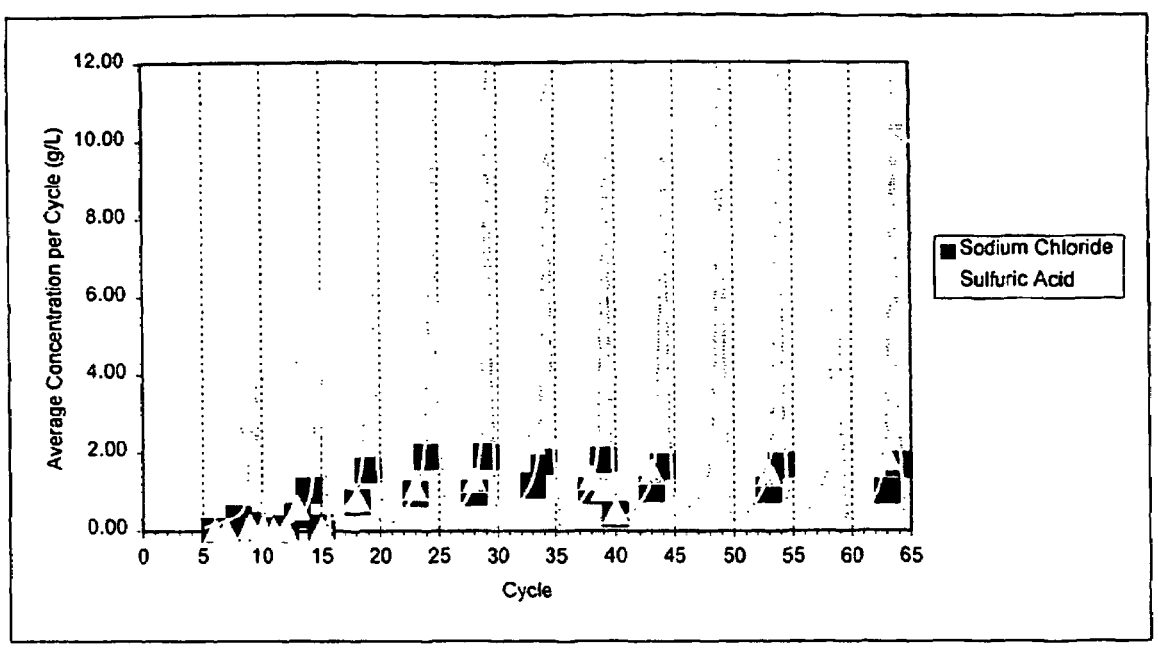
FIG. 54 depicts the zone II history of the online decoupled regeneration experiment of Example 2. Only sulfuric acid and sodium chloride are shown in the zone II history. The sulfuric acid line is best fitted to the experimental data points (symbols).

FIG. 54 shows the zone II history for sulfuric and sodium chloride. Xylose assay was not carried out for zone II samples. The figure shows that sulfuric acid was removed by the regenerant periodically within the decoupled regeneration step time, which is five times that of the separation step time. This proves that the decoupled regeneration can remove high affinity components from a multi-component feedstock.

The online decoupled regeneration SMB method has thus been validated with a 1-1-1-1-1-1 xylose-sulfuric acid-sodium chloride model system. 82.2% of sulfuric acid, the high affinity impurity, was removed via the online decoupled regeneration zone. The extract has an average 60.5% yield at 94.6% xylose purity. A reduction in zone V flow rate is also expected to increase the extract yield. More columns per zone can increase yield and purity of the product.

TABLE 8

Design operating conditions for online decoupled regeneration SMB experiment at 65° C.

Isotherms

Sodium chloride

| | |
|---|---|
| a | 0.0 |
| b | 0.0 |

Xylose

| | |
|---|---|
| a | 0.2241 |
| b | 0.0 |

Sulfuric acid

| | |
|---|---|
| a | 470.5 |
| b | 0.8761 |

Feed Concentration(g/L)

| | |
|---|---|
| Sodium chloride | 5 |
| Xylose | 10 |
| Sulfuric acid | 10 |
| Column length (cm) | 30.0 |
| Column internal diameter (cm) | 2.69 |
| Particle radius (μm) | 180 |
| $\epsilon_b$ | .307 |
| $\epsilon_p$ | .55 |
| Total number of columns | 6 |
| Column configuration | 1R-1R-1-1-1-1 |
| Extra-column dead volume (mL/column) | 5.00 |

Zone flow rates (mL/min)

| | |
|---|---|
| Zone I (washing zone) | 19.18 |
| Zone II (regeneration zone) | 5.46 |
| Zone III | 19.41 |
| Zone IV | 17.49 |
| Zone V | 18.49 |
| Zone VI | 17.04 |

Inlet and outlet flow rates (mL/min)

| | |
|---|---|
| Feed | 1.00 |
| Raffinate | 1.45 |
| Desorbent | 2.37 |
| Extract | 1.92 |
| Regenerant (NaOH) | 5.46 |
| Wash (Water) | 19.18 |
| Switching time (min) | 7.09 |
| Periodic regeneration step | 5 |

Zone III–VI flow rates and switching times are designed based on the Standing Wave Analysis with 90% yield for each component.
Zone I and II flow rates are designed based on experimentally determined single column washing (4 bed volume of water) and regeneration (1.14 bed volume of 0.3 M NaOH) tests and the decoupled regeneration zone switching time.

TABLE 9

Mass transfer parameter for VERSE simulations at 65° C.

| Component | $D_{00}$ (cm²/min) | $D_p$ (cm²/min) | $E_b$ (cm²/min) | $k_f$ (cm/min) |
|---|---|---|---|---|
| Sodium chloride | $2.15 \times 10^{-3}$ | $5.62 \times 10^{-4}$ | Chung & Wen | Wilson & Geankoplis |
| Xylose | $1.23 \times 10^{-3}$ | $3.23 \times 10^{-4}$ | | |
| Sulfuric acid | $1.69 \times 10^{-3}$ | $4.42 \times 10^{-4}$ | | |

$E_b$ = Axial Dispersion Coefficient,
$k_f$ = Film Mass Transfer Coefficient,
$D_{00}$ = Brownian Diffusivity,
$D_p$ = Intrinsic Pore Diffusivity.

TABLE 10

Measured and estimated operating conditions for the online decoupled regeneration SMB experiment.

Feed Concentration (g/L)

| | |
|---|---|
| Sodium chloride | 5.84 |
| Xylose | 9.86 |
| Sulfuric acid | 20.83 |

Zone flow rates (mL/min)

| | | |
|---|---|---|
| Zone I (washing zone) | Cycle 1–12 | ~19.0 |
| | Cycle 13–65 | ~29.3 |
| Zone II (regeneration zone) | | 5.75 ± 0.24 |
| Zone III | | ~19.40 |
| Zone IV | | ~17.50 ± 0.02 |
| Zone V | | ~18.61 ± 0.19 |
| Zone VI | | ~17.03 |

Inlet and outlet flow rates (mL/min)

| | | |
|---|---|---|
| Feed | | ~1.00 |
| Raffinate | | 1.58 ± 0.19 |
| Desorbent | | ~2.37 |
| Extract | | 1.90 ± 0.02 |
| Regenerant (NaOH) | | 5.75 ± 0.24 |
| Wash (Water) | Cycle 1–12 | ~19.0 |
| | Cycle 13–65 | ~29.3 |
| Switching time (min) | | 7.09 |
| Periodic regeneration step | | 5 |
| Extract Purity (Xylose) | | 94.6% |
| Extract Yield (Xylose) | | 60.5% |
| Zone II Sulfuric Acid Yield | | 82.2% |
| Zone II Sodium Chloride Yield | | 70.4% |

The feed concentrations were obtained via HPLC analysis.
Yield and purity calculation were based on cycle 50 and 60 assayed concentrations.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

LISTING OF REFERENCES CITED

Abel, S; Mazzoti, M; and Morbidelli, M., Solvent gradient operation of simulated moving beds, *Journal of Chromatography A*, 944 (2002) 23–39.

Antis, D and Seidel-Morgenstern, Application of gradients in the simulated moving bed process, *Chemical Engineering Science*, 56 (2001) 66667–6682.

Beste, Y. A.; Lisso, M.; Wozny, G. and Arlt, W., Optimization of simulated moving bed plants with low efficient stationary phases; Separation of fructose and glucose, *Journal of Chromatography A*, 868 (2000) pp. 169–188.

Cavoy, E.; Deltent, M.-F.; Lehoucq, S. and Miggiano, D., Laboratory-developed simulated moving bed for chiral drug separations; Design of the system and separation of Tramadol enantiomers, *Journal of Chromatography A*, 769 (1997) pp. 49–57.

Ching, C. B.; Chu, K. H.; Hidajat, K. and Ruthven, D. M., Experimental study of a simulated counter-current adsorption system—VII. Effects of non-linear and interacting isotherms, *Chemical Engineering Science*, Vol. 48, No. 7, (1993) pp. 1343–1351.

Chung, S. F. and Wen, C. Y., Longitudinal dispersion of liquid flowing through fixed and fluidized bed, *AICHE Journal*, Vol. 14, (1968) pp. 847.

Guest, D. W., Evaluation of simulated moving bed chromatography for pharmaceutical process development, *Journal of Chromatography A*, 760 (1997) pp. 159–162.

Juza, M., Development of a high performance liquid chromatographic simulated moving bed separation from an industrial perspective, *Journal of Chromatography A*, 865 (1999) pp. 35–49.

Juza, M.; Mazzotti, M. and Morbidelli, M., Simulated moving bed chromatography and its application to chrirotechnology, *Trends in Biotechnology* Vol. 18, Issue 3, (2000) pp. 108–118.

Kawase, M.; Suzuki, T. B.; Inoue, K.; Yoshimoto, K. and Hashimoto, K., Increased esterification conversion by application of the simulated moving bed reactor, *Chemical Engineering Science*, Vol. 51, No. 11, (1996) pp. 2971–2976.

Mallmann, T.; Burris, B. D.; Ma, Z. and Wang, N. H. L., Standing wave design of nonlinear SMB systems for fructose purification, *AICHE Journal*, Vol. 44, No. 12, (1998) pp. 2628–2646.

Mazzoti, M; Storti, G; and Morbidelli, M., Supercrtical fluid simulated moving bed chromatography, *Journal of Chromatography A*, 786 (1997) 309–320

Migliorini, C; Wendlinger M; and Mazzoti, M., Temperature gradient operation of a simulated moving bed unit, *Industrial Engineering Chemical Research*, 40 (2001) 2606–2617

Miller, L.; Orihuela, C.; Fronek, R.; Honda, D. and Dapremont, O., Chromatographic resolution of the enantiomers of a pharmaceutical intermediate from the milligram to the kilogram scale, *Journal of Chromatography A*, 849 (1999) pp. 309–317.

Nagamatsu, S.; Murazumi, K. and Makino, S., Chiral separation of a pharmaceutical intermediate by a simulated moving bed process, *Journal of Chromatography A*, 832 (1999) pp. 55–65.

Navarro, A.; Caruel, H.; Rigal, L. and Phemius, P., Continuous chromatographic separation process: Simulated moving bed allowing simultaneous withdrawal of three fractions, *Journal of Chromatography A*, 770 (1997) pp. 39–50.

Pais, L. S.; Loureiro, J. M. and Rodrigues, A. E., Separation of 1,1'-bi-2-naphthol enantiomers by continuous chromatography in simulated moving bed, *Chemical Engineering Science*, Vol. 52, No. 2, (1997) pp. 245–257.

Pais, L. S.; Loureiro, J. M. and Rodrigues, A. E., Separation of enantiomers of a chiral epoxide by simulated moving bed chromatography, *Journal of Chromatography A*, 827 (1998) pp. 215–233.

Storti, G.; Mazotti, M.; Furlan, L. T.; Morbidelli, M. and Carra, S., Performance of a 6-port simulated moving bed pilot plant for vapor-phase adsorption separations, *Separation Science and Technology*, Vol. 27, No. 14, (1992) pp. 1889–1916.

Wilson, E. J. and Geankoplis, C. J., Liquid mass transfer at very low Reynolds Numbers in packed beds, *Industrial and Engineering Chemistry Fundamentals*, Vol. 5 (1966) pp. 9.

Wu, D.-J.; Xie, Y.; Ma, Z. and Wang, N.-H. L., Design of simulated moving bed chromatography for amino acid separations, *Industrial Engineering and Chemical Research*, 37 (1998) pp. 4023–4035.

Xie, Y., Separation of two amino acids using SMB chromatography, *MS Thesis*, Purdue University, (1998).

Xie, Y., Design, modeling and analysis of a continuous separation process for purification of adipoyl-7-ADCA from fermentation broth, *PhD Dissertation*, Purdue University, (2001).

Xie, Y.; Mun, S.; Kim, J. and Wang, N-H. L. Standing wave design and experimental validation of a tandem simulated moving bed process for insulin purification, Biotechnology Progress, Accepted for publication (2002).

What is claimed is:

1. A distributed valve simulated moving bed comprising:
   a) a series of sequential SMB columns; and
   b) a series of sequential junctions interposed between said SMB columns; wherein:
   c) said sequential junctions comprise one or more zone bypass lines plumbed to deliver a process stream to a succeeding column without interruption;
   d) said sequential junctions further comprise one or more open or closed input/output lines plumbed to receive a process stream from a preceding column and to deliver a modified process stream to a succeeding column;
   e) one but only one of said zone bypass lines and input/output lines is active during a particular step in each of the junctions; and
   f) the zone bypass line or input/output line that is active in a selected junction corresponds to the location of the junction in the SMB during a particular step.

2. The simulated moving bed of claim 1 wherein one or more open and/or closed input/output lines are plumbed:
   a) to receive desorbent, feed, regenerant, or bypass; and/or
   b) to withdraw raffinate, extract, waste, or bypass.

3. The simulated moving bed of claim 1 wherein:
   a) the number of zone bypass lines in each junction corresponds to the number of inter-zone junctions in the SMB; and
   b) the number of input/output lines in each junction corresponds to the number of zones in the SMB.

4. The simulated moving bed of claim 1 wherein said zone bypass lines and input/output lines are ordered, in a manner corresponding to the sequence of functions observed by the junctions in the SMB.

5. The simulated moving bed of claim 1 wherein:
   a) each of said junctions comprises two opposing SD rotary valves joined by said zone bypass lines and input/output lines; and b) the SD rotary valves are aligned and controlled to provide sequential activation of zone bypass lines and input/output lines with each switch observed by the SMB.

6. The simulated moving bed of claim 1 wherein:
a) each of said junctions comprises one ST rotary valve;
b) said ST rotary valve comprises process lines corresponding to said zone bypass lines and input/output lines; and
c) said zone bypass lines and input/output lines are ordered, in a manner corresponding to the sequence of functions observed by the junctions in the SMB.

7. The simulated moving bed of claim 1 further comprising:
a) a feed distribution manifold;
b) a desorbent distribution manifold;
c) a raffinate consolidation manifold; and
d) an extract consolidation manifold.

8. The simulated moving bed of claim 1 wherein one or more of said input/output lines are open lines.

9. The simulated moving bed of claim 1 comprising four separation zones in a closed loop, wherein:
a) each junction comprises a desorbent input/output line, an extract input/output line, a feed input/output line, and a raffinate input/output line;
b) said desorbent and feed input/output lines comprise an external constant speed input pump; and
c) said raffinate and extract input/output lines comprise an internal constant speed recirculation pump.

10. The simulated moving bed of claim 1 in the form of an open loop wherein:
a) one of the input/output lines is plumbed to deliver a modified process stream consisting entirely of eluent to a succeeding column; and
b) one of the input/output lines is plumbed to withdraw the entire process stream from the preceding column and to return a modified process stream consisting of nothing to the succeeding column.

11. The simulated moving bed of claim 10 further comprising an introduction junction immediately before the first column, and a withdrawal junction immediately after the last column, wherein the introduction junction is not plumbed to receive process stream from a preceding column, and the withdrawal junction is not plumbed to deliver process stream to a succeeding column.

12. The simulated moving bed of claim 1 further comprising a decoupled regeneration zone.

13. The simulated moving bed of claim 1 wherein the zone length varies during operation.

14. A method of separating components in a multi-component mixture comprising:
a) providing:
  i) a series of sequential SMB columns; and
  ii) a series of sequential junctions interposed between said SMB columns;
wherein:
  (1) said sequential junctions comprise one or more zone bypass lines plumbed to deliver a process stream to a succeeding column without interruption;
  (2) said sequential junctions further comprise one or more open or closed input/output lines plumbed to receive a process stream from a preceding column and to deliver a modified process stream to a succeeding column;
b) operating said SMB so that:
  i) one but only one of said zone bypass lines and input/output lines is active during a particular step in each of the junctions; and
  ii) the zone bypass line or input/output line that is active in a selected junction corresponds to the location of the junction in the SMB during a particular step.

15. The method of claim 14 wherein said zone bypass lines and input/output lines are ordered in a manner corresponding to the sequence of functions observed by the junctions in the SMB, further comprising sequentially advancing the active line in each junction with each switch of the SMB.

* * * * *